United States Patent
Mamo

(10) Patent No.: US 8,372,326 B2
(45) Date of Patent: *Feb. 12, 2013

(54) PRESSURE COMPENSATED NON-CLOGGING DRIP EMITTER

(75) Inventor: Shay Mamo, San Diego, CA (US)

(73) Assignee: D.R.T.S. Enterprises Ltd., San Diego, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 12/434,565

(22) Filed: May 1, 2009

(65) Prior Publication Data

US 2010/0096479 A1    Apr. 22, 2010

Related U.S. Application Data

(63) Continuation-in-part of application No. 12/254,761, filed on Oct. 20, 2008, now Pat. No. 7,988,076.

(51) Int. Cl.
B29C 45/16    (2006.01)

(52) U.S. Cl. .................. 264/255; 264/260; 264/265

(58) Field of Classification Search .................. 264/255, 264/259, 260, 265
See application file for complete search history.

(56) References Cited

U.S. PATENT DOCUMENTS

| | | | |
|---|---|---|---|
| 3,856,333 A | 12/1974 | Cox | |
| 3,981,452 A | 9/1976 | Eckstein | |
| 4,210,287 A | 7/1980 | Mehoudar | |
| 4,385,025 A * | 5/1983 | Salerno et al. ................. | 264/255 |
| 4,687,143 A | 8/1987 | Gorney et al. | |
| 4,824,025 A | 4/1989 | Miller | |
| 5,200,132 A | 4/1993 | Shfaram et al. | |
| 5,203,503 A | 4/1993 | Cohen | |
| 5,330,107 A | 7/1994 | Karathanos | |
| 5,531,381 A | 7/1996 | Ruttenberg | |
| 5,586,727 A | 12/1996 | Shekalim | |
| 5,615,838 A | 4/1997 | Eckstein et al. | |
| 5,636,797 A | 6/1997 | Cohen | |
| 5,641,113 A | 6/1997 | Somaki et al. | |
| 5,814,252 A * | 9/1998 | Gouldson et al. ............ | 264/40.5 |
| 6,027,048 A | 2/2000 | Mehoudar | |
| 6,082,632 A * | 7/2000 | Clark et al. ................... | 239/205 |
| 6,206,305 B1 | 3/2001 | Mehoudar | |
| 6,403,013 B1 | 6/2002 | Man | |
| 6,464,152 B1 | 10/2002 | Bolinis et al. | |

(Continued)

FOREIGN PATENT DOCUMENTS

| | | |
|---|---|---|
| IT | 1255120 | 4/1992 |
| JP | 2000 228417 | 8/2000 |
| WO | WO 02/15670 | 2/2002 |
| WO | 2006/038246 | 4/2006 |

OTHER PUBLICATIONS

International Preliminary Report on Patentability dated Nov. 10, 2011. (6 pages).

(Continued)

*Primary Examiner* — Jill Heitbrink

(74) *Attorney, Agent, or Firm* — ARC IP Law, PC; Joseph J. Mayo

(57) ABSTRACT

A drip emitter that utilizes one or more filters and one or more labyrinths wherein the labyrinth couples the filter(s) to one or more water retainment valves that leads to at least one pool. Prevents clogging by eliminating air into the labyrinth via a water retainment valve that is situated after at least an initial portion of a labyrinth within the drip emitter. Includes non-drain, anti-siphon and ventable versions. Includes a method of two shot injection molding for embodiments of the drip emitter that include non-drain, anti-siphon and ventable variants.

8 Claims, 64 Drawing Sheets

U.S. PATENT DOCUMENTS

| | | |
|---|---|---|
| 6,568,607 B2 | 5/2003 | Boswell et al. |
| 7,108,205 B1 | 9/2006 | Hashimshony et al. |
| 7,681,810 B2 | 3/2010 | Keren |
| 2002/0064935 A1 | 5/2002 | Honda |
| 2005/0224962 A1 | 10/2005 | Akamatsu et al. |
| 2006/0163388 A1 | 7/2006 | Mari |
| 2006/0255186 A1 | 11/2006 | Ruskin |

OTHER PUBLICATIONS

Internationai Search Report and Written Opinion for PCT Application No. PCT/US09/61090, dated Jan. 13, 2010. 6 pages.

\* cited by examiner

A. When pipe is under very strong vacuum pressure, air can flow backwards through the emitter.
B. Under moderate or light vacuum pressure, the valve is closed until the opening threshold is reached.
C. The valve opens when the pressure in the pipe becomes positive.
D. The water flow is pressure compensated so that flow is constant over a range of operating pressure.

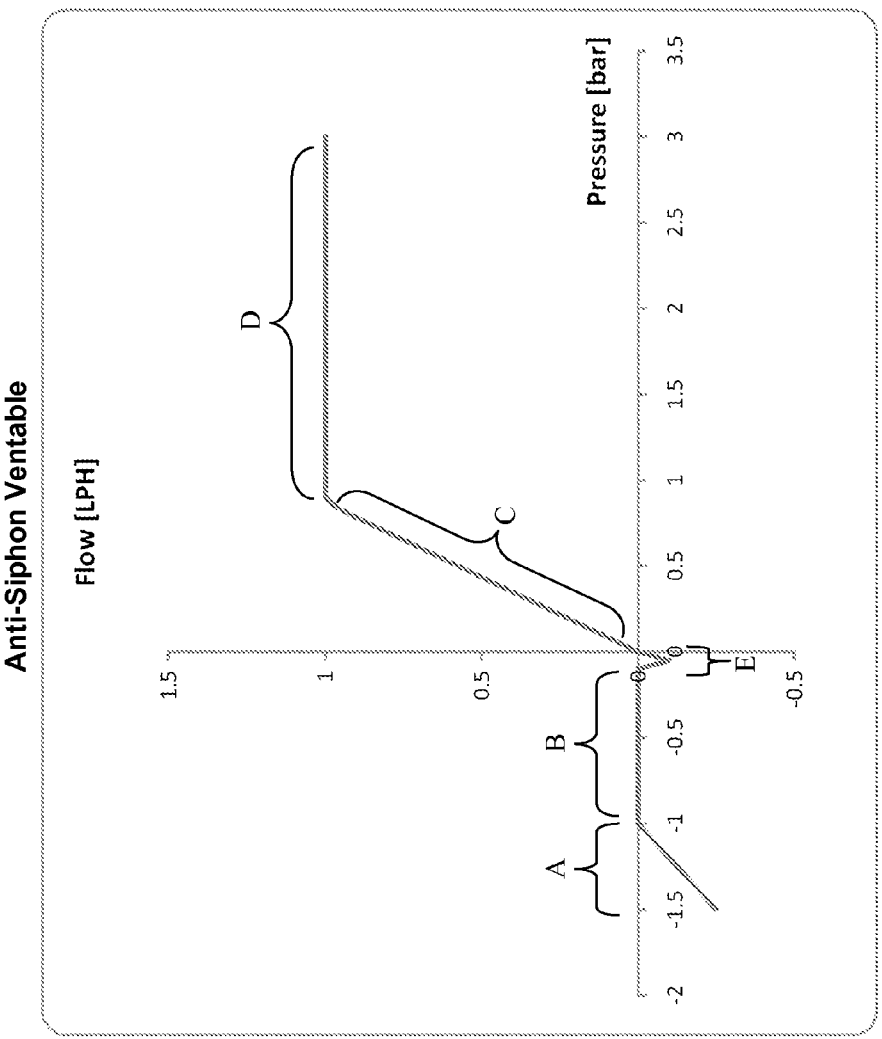

Figure 32

A. When pipe is under very strong vacuum pressure, air can flow backwards through the emitter.
B. Under moderate vacuum pressure, the valve is closed until the opening threshold is reached.
C. The valve is open when the pressure in the pipe is positive.
D. The water flow is pressure compensated so that flow is constant over a range of operating pressure.
E. Under very small vacuum pressure the valve is open and water flows.

PRESSURE COMPENSATED NON-CLOGGING DRIP EMITTER

This application is a continuation in part of U.S. patent application Ser. No. 12/254,761 filed Oct. 20, 2008, now U.S. Pat. No. 7,988,076 the specification of which is hereby incorporated herein by reference.

BACKGROUND OF THE INVENTION

1. Field of the Invention

Embodiments of the invention described herein pertain to the field of irrigation apparatus. More particularly, but not by way of limitation, one or more embodiments of the invention enable a pressure compensated non-clogging drip emitter.

2. Description of the Related Art

There are multiple types of irrigation drippers. Simple drippers exist that are inserted serially along pipe, either by forcing a hole into the pipe and placing the dripper on the outside of the pipe, or by cutting the pipe and inserting the dripper in line with the pipe. These systems require great amounts of labor when providing a watering system for a large agricultural area for example.

Other types of drippers include drip emitters that are inserted into pipe, generally when the pipe is extruded. This type of dripper system enables rapid deployment of great lengths of pipe, i.e., dripper line, wherein the drippers may be ordered for certain distances along the pipe for example. There are many types of emitters that may be inserted into the pipe including non-pressure compensated drippers that may provide more flow in lower areas of an agricultural drip irrigated area.

Other types of emitters include pressure compensated drip emitters that provide compensated drip volumes regardless of the depth or height or pressure difference in an agricultural drip irrigated area. In addition, other features of drip emitters include "non-drain" capabilities that retain water in the pipe when the pressure in the pipe falls beneath a threshold. Non-drain drip emitters generally include a valve that does not allow for water to flow from the drip emitter until a certain pressure difference is reached with respect to internal pipe pressure versus atmospheric pressure. Such a valve may or may not include a check valve for instance. Check valves allow flow in only one direction, for example when the internal water pressure in the pipe exceeds a pressure difference with respect to atmospheric pressure. Non-drain drippers without check valves are failing after 1 year in the field and the industry is moving towards anti-siphon valve based drip emitters that inhibit backflow of air or water or mud into the pipe under negative pressure, thus inhibiting any outflow from lower elevation emitters as well as the higher elevation emitters inhibit backflow and hence prevent siphoning. Anti-siphon valves are implementations of check valves that have also heretofore been placed before the labyrinth section to keep water and air from entering the pipe.

Check valves heretofore have only been placed before labyrinth sections within drip emitters. This leaves the labyrinth exposed to air and potential clogs. This pre-labyrinth check valve placement is problematic in that air can enter the labyrinth and cause a clog in the labyrinth section. When air enters the labyrinth, the water evaporates. When air mixes with water that has suspended iron, the suspended iron can solidify and cause a clog. In addition, mud can enter the labyrinth with no valve to prevent backflow into the drip emitter.

The filter on cylindrical drippers fitted with non-drain or anti-siphon mechanisms before the labyrinth have traditionally been small as they must be smaller than the size of the diaphragm used to create the valve mechanism. A small filter can easily clog. Hence, not only do current non-drain and anti-siphon drip emitters clog due to problems related to material other than water entering the labyrinth, but they also clog due to the small size of the filters that have been used before the labyrinth in the flow path of water for example.

Pipes fitted with non-drain elements are very difficult to evacuate as they do not allow air into the pipe through the drip emitters when under a vacuum or low pressure. When filled with water, an irrigation pipe is very heavy and is not able to be rolled up for example when certain types of crops have been harvested and the pipe is to be stored.

Currently known drip emitters may clog over time for a variety of other reasons as well. Many of the reasons for clogging in currently known drip emitters are related to or a result of non-turbulent pathways, i.e., laminar transfer zones or any path of water flow that is straight enough to allow sediment to settle. For example, between the inner portion of the emitter to the pool area of the emitter, if a transfer zone is formed as a straight line, for example across a mold joint, sediment accumulates in the non-turbulent zone over time and eventually forms a clog as sediment settles. In addition, drip emitters include a filter tend to clog when the emitter is rotated so as to locate the filter downward wherein sediment settles, which clogs the filter. In addition, emitters that utilize only one hole may clog if covered by soil for a rock for example. In these situations, a second hole is not utilized to provide a level of redundancy.

For at least the limitations described above there is a need for a pressure compensated non-clogging drip emitter.

BRIEF SUMMARY OF THE INVENTION

One or more embodiments of the invention enable a pressure compensated non-clogging drip emitter. Embodiments include an emitter body having an inner surface, an outer surface, a first end and a second end, a filter, a pool coupled with the outer surface wherein the pool is configured to hold water filtered by the filter when the emitter body is enclosed in a pipe, a labyrinth coupled with the outer surface wherein the labyrinth allows the water to flow from the filter to the pool through a water flow path and, a water retainment valve situated after an initial portion of the labyrinth and in the water flow path. The more of the labyrinth that is sealed to air by the water retainment valve, the more resistant to clogging the drip emitter embodiment is. For example, mud cannot flow back into the drip emitter, and air cannot creep into the labyrinth, and hence water that contains suspended iron does not form rust. Hence, the protected internal components of the drip emitter are protected from the elements, which thus prevents clogging.

The emitter body may be formed as a flat object, or a cylindrical arc of less than 360 degrees, or a cylindrical arc of a full 360 degrees or any other shape that may fit inside a pipe for example.

The water retainment valve may be constructed in a manner or otherwise configured to either allow no backflow of air or water, or allow the backflow of air or water into the drip emitter when a pressure internal to the drip emitter is below a threshold pressure. For example, the water retainment valve may be configured with flaps. Depending on the configuration of the flaps, the valve may be non-drainable, or conversely, ventable in that under low pressures or a vacuum or negative pressure, the flaps may for example change direction to allow airflow into the drip emitter and pipe. In ventable embodiments, the flaps may be configured to point under no pressure in a direction of normal water flow under positive pressure with respect to internal pipe pressure and external air pressure. For non-drain embodiments, when the pressure is below a threshold then the water retainment valve ceases to allow water to flow. Ventable embodiments allow for the enclosing pipe to be rolled up for example while non-drain embodiments do not allow air into the pipe and hence do not allow for easily rolling up the pipe. Anti-siphon embodiments may be implemented similar to ventable embodiments, with longer flaps that are unable to bend back in towards the labyrinth for example.

Embodiments of the invention may be configured with a pressure compensating chamber that is adapted to allow pressure from the water in the emitter to limit a compressible element that in effect controls the output pressure and/or flow of water from the emitter. In one or more embodiments of the invention, the pressure compensation chamber is formed together with the water retainment valve in an integrated unit although this is not required.

An embodiment of the method of producing the drip emitter includes selecting a first material for injection molding for an emitter body, selecting a second material for injection molding wherein said second material comprises an elastomeric material to effect regulation of the drip emitter, injecting an injection mold with a said first material and said second material in separate shots in a single mold to form the drip emitter, and, cross-linking said second material to increase elasticity of said second material after injection but before inserting said drip emitter into a pipe. The method may also include forming a water retainment valve with said second material in the single mold, forming a ventable water retainment valve with said second material in the single mold, forming a mechanical engagement between said first material and said second material, forming a mechanical engagement between said first material and said second material wherein said mechanical engagement comprises at least one interlocking element formed into said first material and corresponding at least one interlocking element formed into said second material. In addition, the method for producing the drip emitter may include forming a water retainment valve that is configured to hinder or allow no backflow of air or water into the drip emitter when a pressure internal to the drip emitter is below the pressure external to the pipe.

Embodiments of the invention may be manufactured in a novel manner by injecting both the emitter and pressure compensating diaphragm and/or non-drain valve within an injection mold, for example using multiple shots of different material into the mold. In one or more embodiments, a pliable material is utilized for the pressure compensating component and/or ventable valve while a less pliable material for example a material that does not flex as much is utilized for the emitter body.

In one or more embodiments, after injection molding but before insertion into the pipe, cross-linking may be performed to enable the elastomer to retain shape and elasticity characteristics over time. This may be done using UV light, hot water, steam, beta radiation or any other technology that allows the materials to cross-link. Typically, cross-linked materials do not bond with polyethylene, so during injection cross-linking is undesirable since the elastomer will have to bond with PE.

One or more embodiments of the invention may be configured to restrict water flow, wherein the water retainment valve is alternately opened and closed under normal operation for example due to the Bernoulli effect to provide restricted water flow. Embodiments of the invention may be utilized in restricting or alternately open/close configurations for low flow level implementations. If for example the instantaneous flow from a dripper is 4 liters per hour with a pressure that is changing from 0 to 15 psi intermittently then the average flow might be 0.5 liters per hour or lower. This allows for use of 1) longer laterals of pipe because the drippers are not all flowing at the same time so there is less pressure loss in the pipe, 2) larger labyrinths for low flows (larger labyrinths clog less), 3) reduction in pumping costs and 4) extremely low flows become possible. For example, in embodiments that employ a water retainment valve after the labyrinth, this restricting effect occurs since the water pressure at the water retainment valve is the pressure after the labyrinth and compensation chamber and is much lower than pipe pressure and closer to atmospheric pressure (pressure outside the pipe). Hence, if the water pressure at the water retainment valve is close to the threshold pressure the flaps crack open and allow flow through the valve, however the Bernoulli principle states that as velocity of the water increases, when the flow increases from stagnate velocity $V=0$ to flow $V>0$, the pressure decreases. When the pressure has decreased below the threshold pressure the flaps close until the water is stagnant and the pressure quickly builds towards pipe pressure and exceeds the threshold, therein opening the water retainment valve. This cycle keeps repeating within a pressure range.

In non-drain drip emitters there are two threshold pressures of importance. As water fills an empty pipe and the pressure raises the drip emitters allow water to flow at the opening pressure threshold. When the pump that pressurizes water in the pipe is turned off, the drip emitters continue to allow water to flow until the closing pressure threshold is met and the water ceases flowing. It is desirable to have the closing pressure be high, however in non-drain drippers that exist today the closing pressure is lower than the opening pressure. With embodiments of the invention that make use of flaps, and under restricted pressure ranges, the water retainment valve is continuously alternating between a closed and open state during normal operation and the closing pressure is higher and closer or equal to the opening pressure.

Embodiments of the invention or method of producing embodiments of the invention may optionally utilize an inwardly projecting filter prevent clogging when the emitter oriented rotationally downward in the field as the filter is not a potential well and hence sediment does not drop into it. In addition, inwardly projecting filter embodiments provide a snorkel effect that enables faster moving and cleaner water to enter the emitter via the filter, hence eliminating the potential to clog in a second manner. Thus inwardly projecting filter embodiments eliminate clogs in two ways, by avoiding sediment with a height offset and avoiding sediment by selecting faster moving water away from the pipe outer surface. An emitter may also utilize more than one filter in a redundant configuration to either supply both pools on each side of the emitter or alternatively to supply an associated pool in a one-to-one manner.

Embodiments of the invention may further include a pool coupled with the outer cylindrical surface wherein the pool is configured to hold water filtered by the filter or inwardly offset filter when the hollow cylindrical emitter body is enclosed in a pipe. Embodiments further include a labyrinth coupled with the outer cylindrical surface wherein the labyrinth may optionally maximize use of turbulent transfer zones, at least after water enters the labyrinth, and wherein the labyrinth allows the water to flow from the filter or filter to the pool. Through the use of turbulent transfer zones once the water enters the labyrinth, sediment is continuously forced through the labyrinth and has no location to settle and hence the labyrinth minimizes the potential to clog. In other words, laminar flow transfer zones are avoided as these type of "straight" paths tend to clog over time with sediments. By utilizing a filter or an inwardly offset filter and a labyrinth that avoids laminar flow zones, embodiments of the invention so configured minimize the potential to clog in multiple ways.

Once an embodiment of the emitter is enclosed in a pipe, the pool is thus sealed, for example via a wall at one end of the emitter and a side of the labyrinth, for example when the labyrinth extends outwardly from the outer cylindrical surface of the emitter. The pool is tapped via one or more hole(s) in the enclosing pipe to allow for the water running in the inner portion of the pipe and inner portion of the emitter to flow through the filter and labyrinth to the pool and out the hole at a rate that is controlled by the particular shape and size of the labyrinth for example.

In one or more embodiment of the invention, a symmetrical embodiment may be utilized that provides two pools, two labyrinths and optionally two pressure compensation and/or two water retainment valves. This embodiment provides a robust redundant embodiment that continues to work even if one labyrinth were to clog, or if one hole into the pipe associated with a particular emitter were to be externally plugged, buried or blocked. Several embodiments of redundant configurations may be formed that include a two pool embodiment with one or more labyrinths, i.e., one labyrinth with a "T" or fork section, or two labyrinths, each flowing to a separate pool. Alternatively, the embodiment can be doubled to form more than one filter or inwardly offset filter, for example offset rotationally by 180 degrees, with separate labyrinth(s) and pool(s) coupled therewith for even more redundancy.

BRIEF DESCRIPTION OF THE DRAWINGS

The above and other aspects, features and advantages of the invention will be more apparent from the following more particular description thereof, presented in conjunction with the following drawings wherein:

FIG. 32 is a graph of flow versus pressure in ventable and anti-siphon embodiments of the water retainment valve with flaps that are not fully closed at zero pressure difference.

DETAILED DESCRIPTION OF THE INVENTION

A pressure compensated non-clogging drip emitter will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
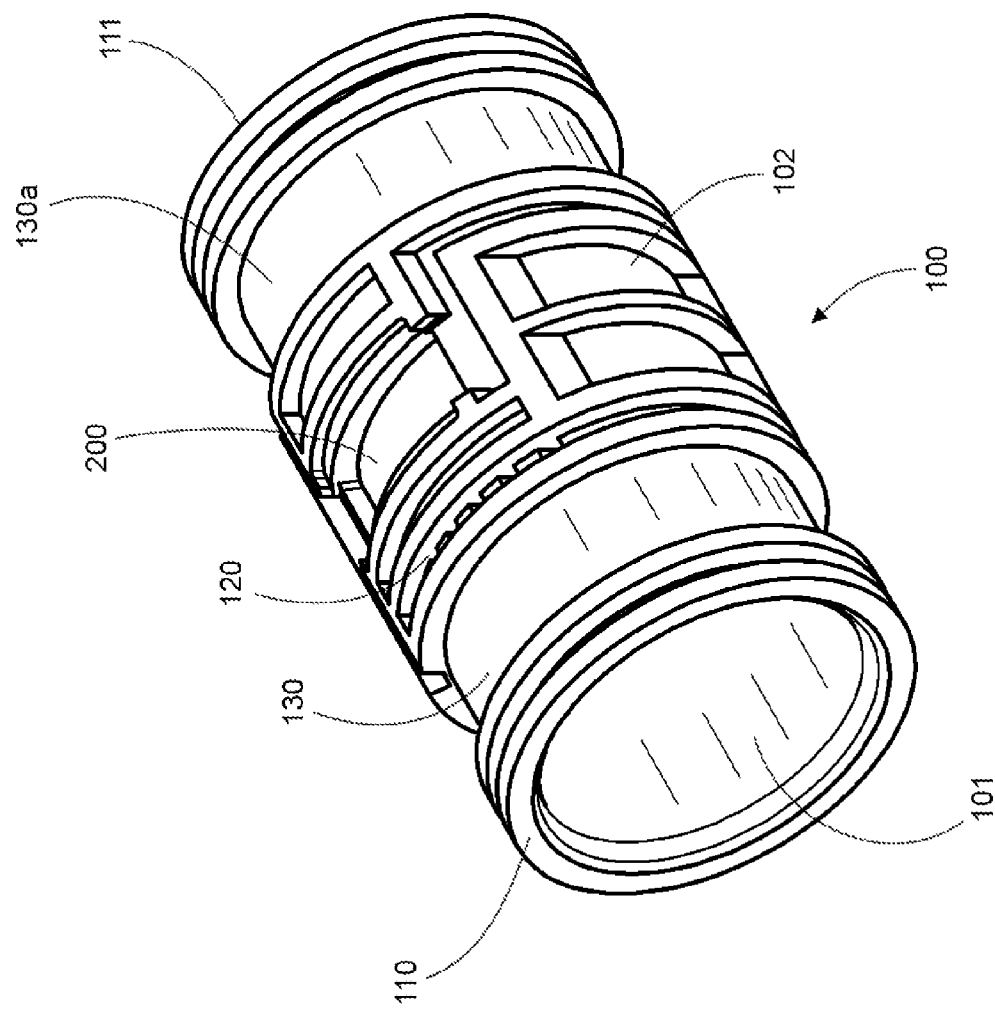
FIG. 1 is a perspective view of an embodiment of the drip emitter.

FIG. 1 is a perspective view of an embodiment of drip emitter 100. Embodiments include an emitter body having inner surface 101, outer surface 102 that forms the floor of the emitter working elements, first end 110 and second end 111. The emitter of FIG. 1 is inserted into a pipe or hose as is shown as a shaded tube in FIG. 2 wherein holes are created in the hose to allow water flowing from the inside of the pipe, and hence inside of inner surface 101 through filter 120, (into labyrinth entry 301, through labyrinth 140, through labyrinth transfer zone location 141, to labyrinth exit 142, to channel 310, to water retainment valve 281 for example as per FIGS. 3-6) and into pools 130 and 130a and out of holes 202 and 202a respectively (see FIG. 2). Embodiments provide pool 130 formed at the deepest offset by outer cylindrical surface 102, wherein pool 130 is configured to hold water filtered by filter 120. Water retainment valve 281 protects labyrinth 140 from the elements by preventing the backflow of air or water or mud for example into the drip emitter. Ventable embodiments of water retainment valve 281 allow for draining water from, and rolling of an enclosing pipe by lowering the internal pressure within the enclosing pipe (as per FIG. 2) to a pressure below a backflow threshold pressure. This allows air to enter water retainment valve 281 which enters the labyrinth and hence enters the pipe through the reverse path of normal water flow.

Figure 2:
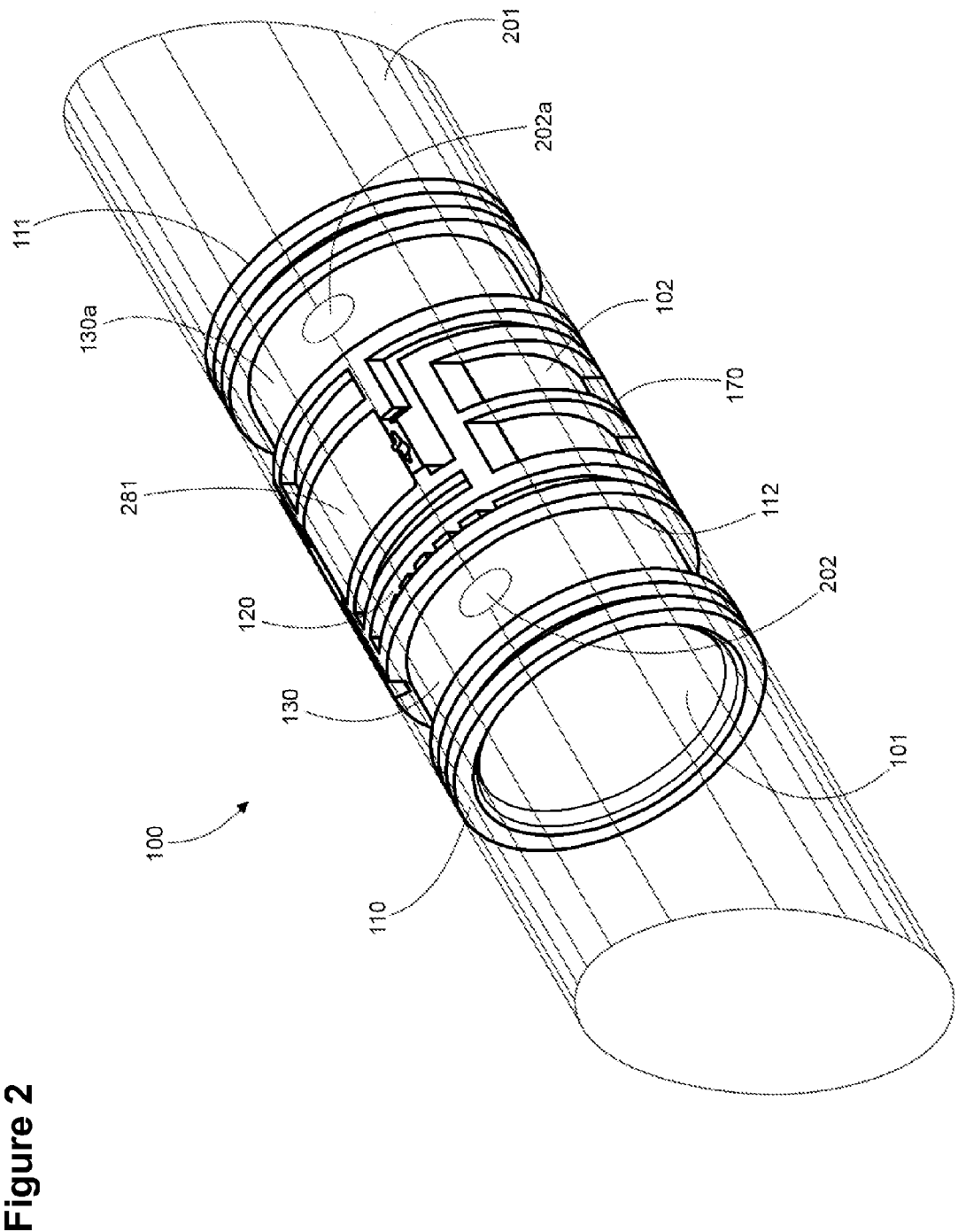
FIG. 2 is a perspective view of an embodiment of the drip emitter shown as situated inside a pipe or hose.
Figure 3:
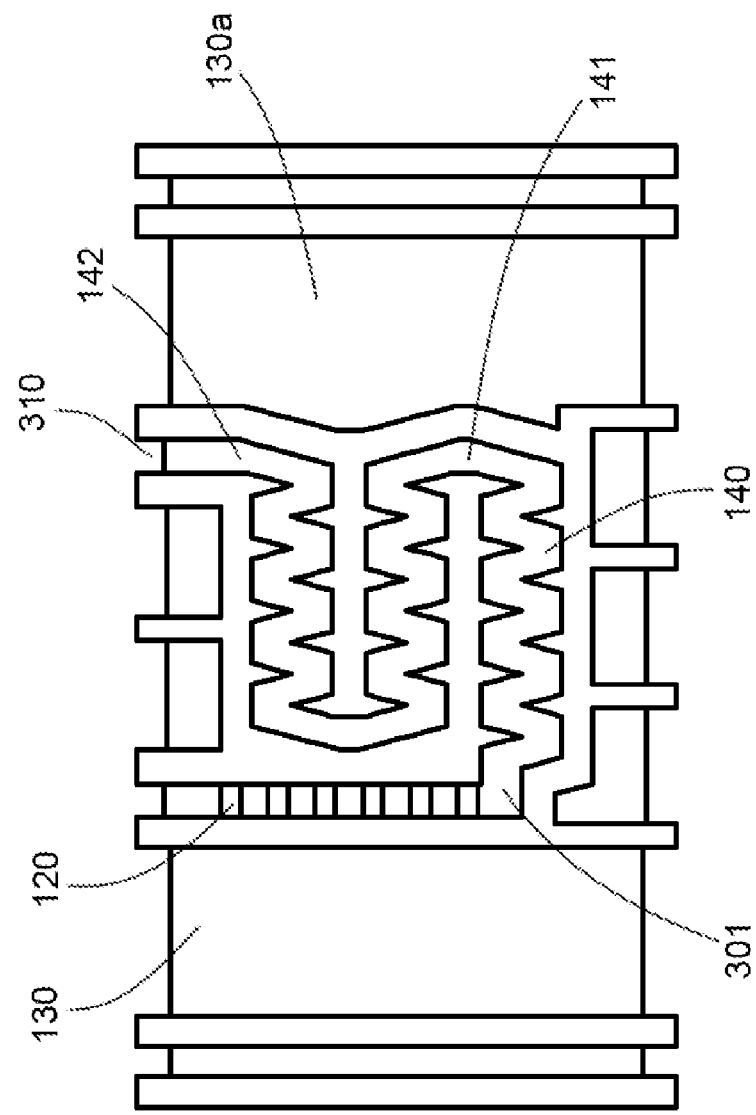
FIG. 3 is a bottom view of an embodiment of the drip emitter.

Embodiments further include labyrinth 140 coupled with the outer cylindrical surface wherein labyrinth 140 may utilize turbulent transfer zones once water enters the labyrinth and wherein labyrinth 140 allows the water to flow from inwardly offset filter 120 to pool 130. As shown in FIGS. 1-3, labyrinth 140 includes teeth that point inwardly into the path of water flow, wherein the teeth disrupt the flow of water through labyrinth 140 and provide turbulent transfer zones throughout labyrinth 140. Any shape may be utilized to create turbulent transfer zones, including but not limited to teeth, or any other geometric shape such as square waves, saw tooth shapes, or any other shape that provides for non-linear or non-laminar water flow.

Once an embodiment of the emitter is enclosed in a pipe, pool 130 is thus sealed, for example via the wall at first end 110 of the emitter and side 112 of the labyrinth/filter section. The "depth" of the pool 130 may be any depth that allows for the desired amount of water to flow through the particular embodiment. For example, when labyrinth 140 extends outwardly from the outer cylindrical surface of the emitter by a desired distance, this distance sets the depth of the path of the water through the labyrinth. By configuring the labyrinth with the desired number of turbulent features, for example teeth and setting the width of the water path through the labyrinth, any water flow amount can be easily configured for the desired product implementation. Pool 130 is tapped via hole 202 in the enclosing pipe to allow for the water running in the inner portion of the pipe and inner portion of the emitter to flow through inwardly offset filter 120 and labyrinth 140 to pool 130 and out hole 202. In other words, the rate of water flow is controlled by the particular shape and size of the labyrinth for example the length, cross-sectional area, number of teeth, length of teeth of the turbulent zones. Grid 170 is formed to minimize the amount of plastic for example utilized in each emitter, and provides a higher coefficient of static friction between the enclosing pipe and is optional in that it does not form a part of the water flow mechanism of embodiments of the invention.

One or more embodiments of the invention provide an elongated filter as shown in FIGS. 1-3, that is aligned lengthwise along the axis of the cylinder forming the emitter, for example lengthwise parallel along the axis of the cylinder of the emitter. The filter inward offset can be any depth greater than or equal to 0 mm from the inner diameter of the drip emitter inner surface 101 and the ends of the filter may be angled to provide for a more streamlined flow of water past the filter for example to aid in the snorkel effect of taking in faster moving water for embodiments having a filter inward offset greater than 0 mm. In one or more embodiment of the invention, a symmetrical embodiment may be utilized that provides two pools, i.e., 130, 130a as well as two labyrinths and/or two water retainment valves. This embodiment or any embodiments having more than two labyrinths and/or water retainment valves is in keeping with the spirit of the invention and is not shown for brevity. An embodiment of a robust implementation is shown in the parent application to this application which has been incorporated by reference above. Use of multiple redundant components within a single drip emitter provides a robust redundant embodiment that continues to work even if one labyrinth were to clog, or if one hole into the pipe associated with a particular emitter were to be externally plugged, buried or blocked. The labyrinth may be coupled with the emitter by forming the emitter via injection molding so that the labyrinth extends outwardly from the outer cylindrical surface of the emitter. In this embodiment, water is sealed on the bottom by the outer cylindrical surface of the emitter, i.e., the floor of the labyrinth, and is further sealed by the outwardly extending walls of the turbulent zones for example. In addition, water is sealed by the inner surface of the enclosing pipe into which the emitter is placed. The exit from the labyrinth allows water to flow into the pool.

FIG. 2 is a perspective view of an embodiment of the shown in enclosing pipe 201 that is shown with holes 202 and 202a to provide exits for drip water. Pipe 201 is shown as a shaded cylindrical cut-away tube and may be formed of any material including but not limited to plastic. Embodiments of the invention may be inserted into pipe 201 using an extrusion process for example. The emitters may be inserted at fixed timing or fixed distance or any other displacement offset depending on the intended use for the implementation. For example, for a drip emitter system to be utilized for trees, the emitters may be introduced into pipe 201 at large intervals with respect to a drip emitter system for a garden having smaller plants.

FIG. 3 is a bottom view of an embodiment of the drip emitter. As shown, water flows out of the page toward the reader from filter 120 through labyrinth entry 301 and into labyrinth 140. The labyrinth may utilize turbulent transfer zones as the water for example travels toward the right in the labyrinth section closest to inwardly offset filter 120, bends at transfer zone location 141 and travels to labyrinth exit 142 into pool 130. From pool 130 water drips from the pipe at hole 202 (see FIG. 2).

Figure 4:
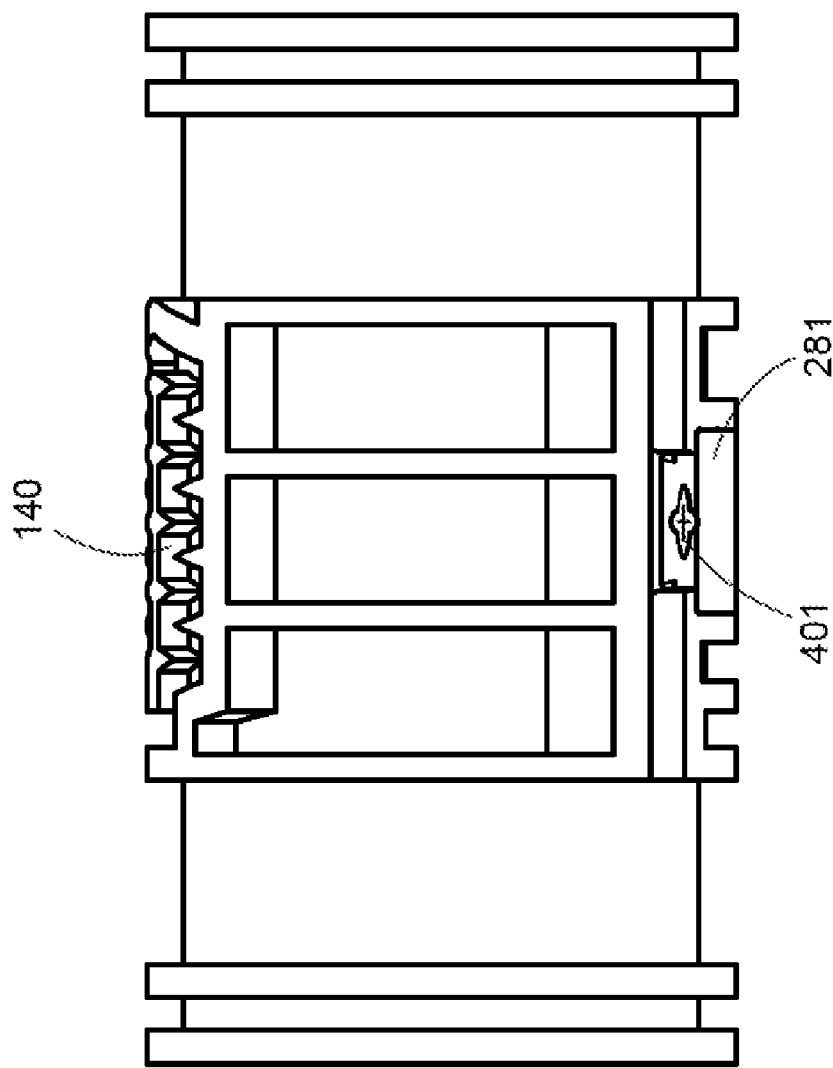
FIG. 4 is a side view of an embodiment of the drip emitter.

FIG. 4 is a side view of an embodiment of the drip emitter. In this view, water retainment valve 281 is shown from the end, wherein the flaps 401 are visible, wherein the flaps may be configured for non-drain or ventable operation based on their shape and orientation. Water retainment valve 281 may also be configured with an integrated pressure compensation valve.

Figure 5:
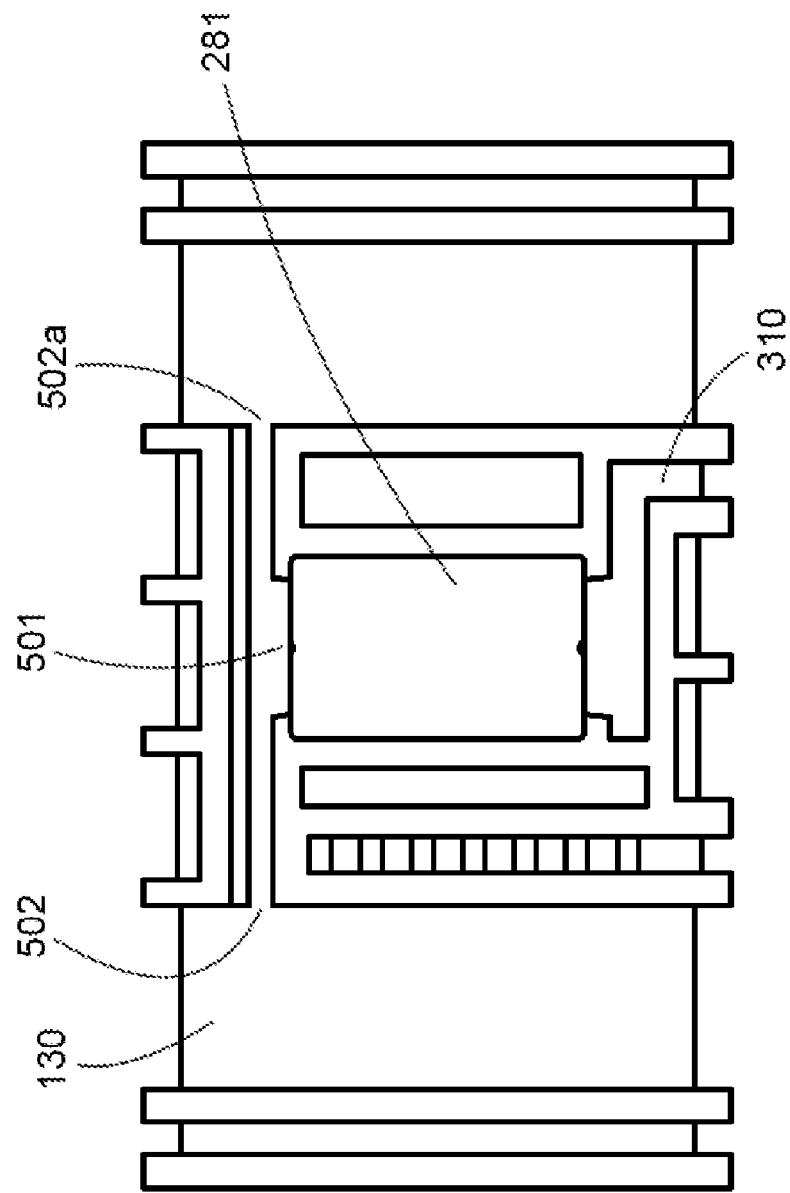
FIG. 5 is a top view of an embodiment of the drip emitter.

FIG. 5 is a top view of an embodiment of the drip emitter. In this view, water retainment valve 281 is seen from the top wherein the water flow path under normal drip emitter irrigation allows water to flow out of the water retainment valve to pool entries 502 and 502a from water retainment valve exit location 501.

Figure 6:
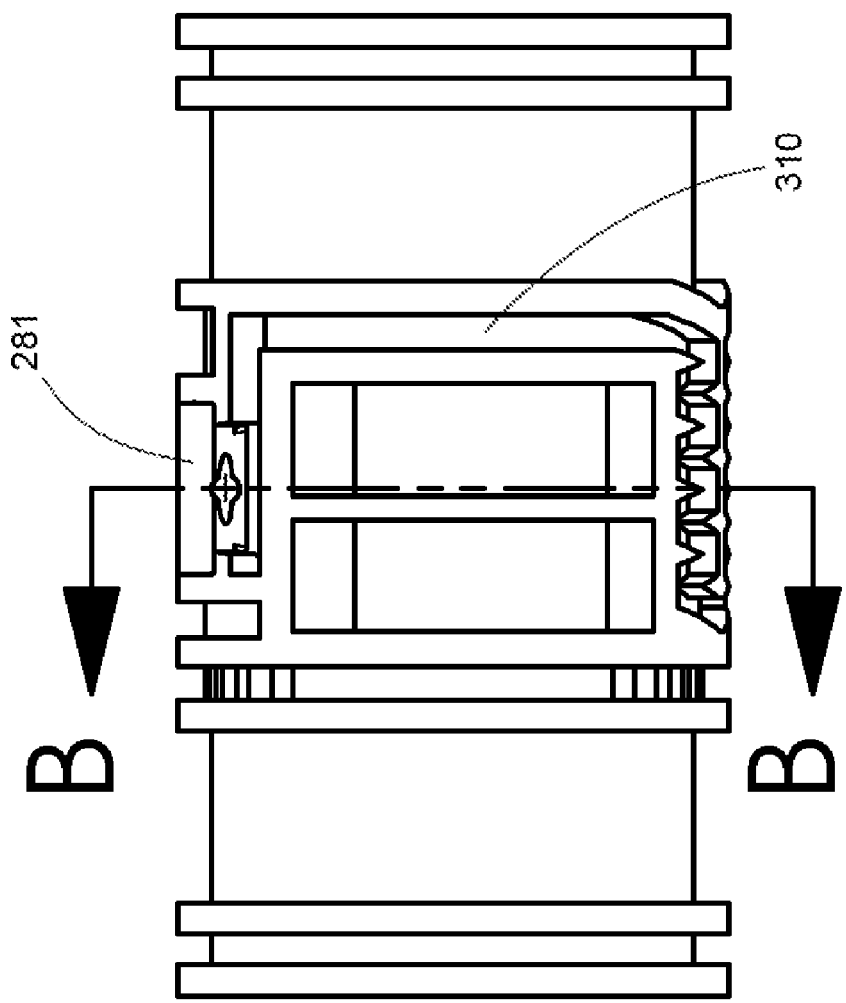
FIG. 6 is a secondary side view of an embodiment of the drip emitter.
Figure 7:
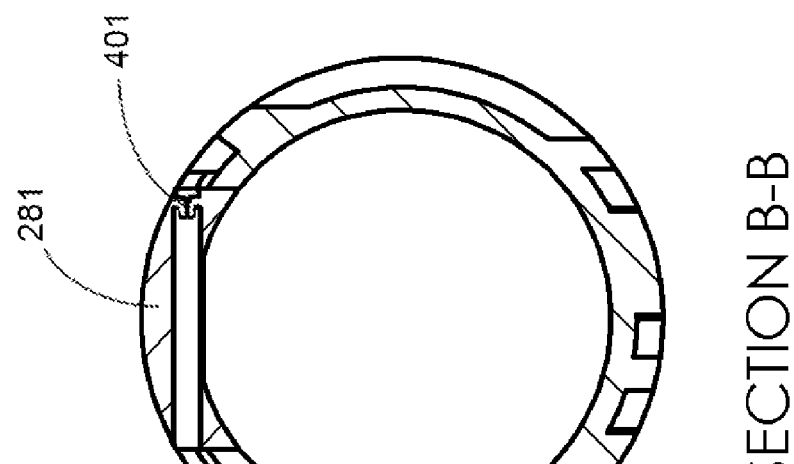
FIG. 7 is a cross-section end view of an embodiment of the drip emitter shown in FIG. 6.

FIG. 6 is a secondary side view of an embodiment of the drip emitter, i.e., opposite side of FIG. 4. FIG. 7 is a cross-section end view of an embodiment of the drip emitter shown in FIG. 6. In this view, cross section of water retainment valve 281 is shown with side view of flaps 401.

Figure 8:
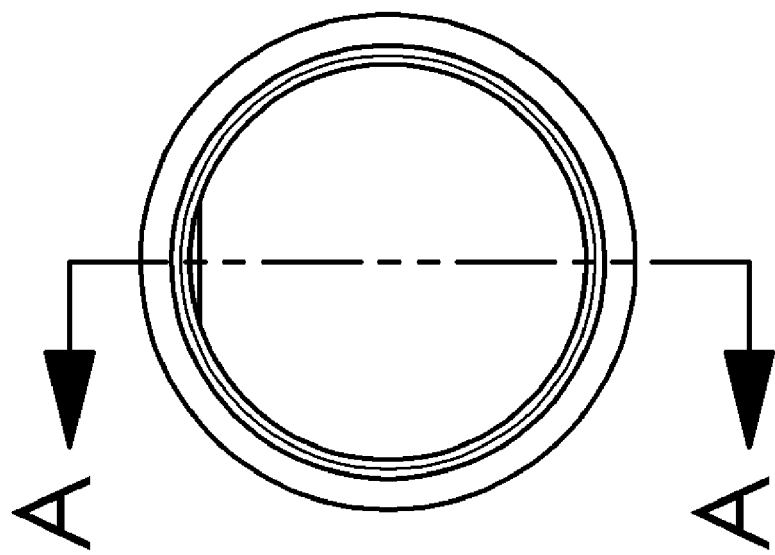
FIG. 8 is an end view of an embodiment of the drip emitter.
Figure 9:
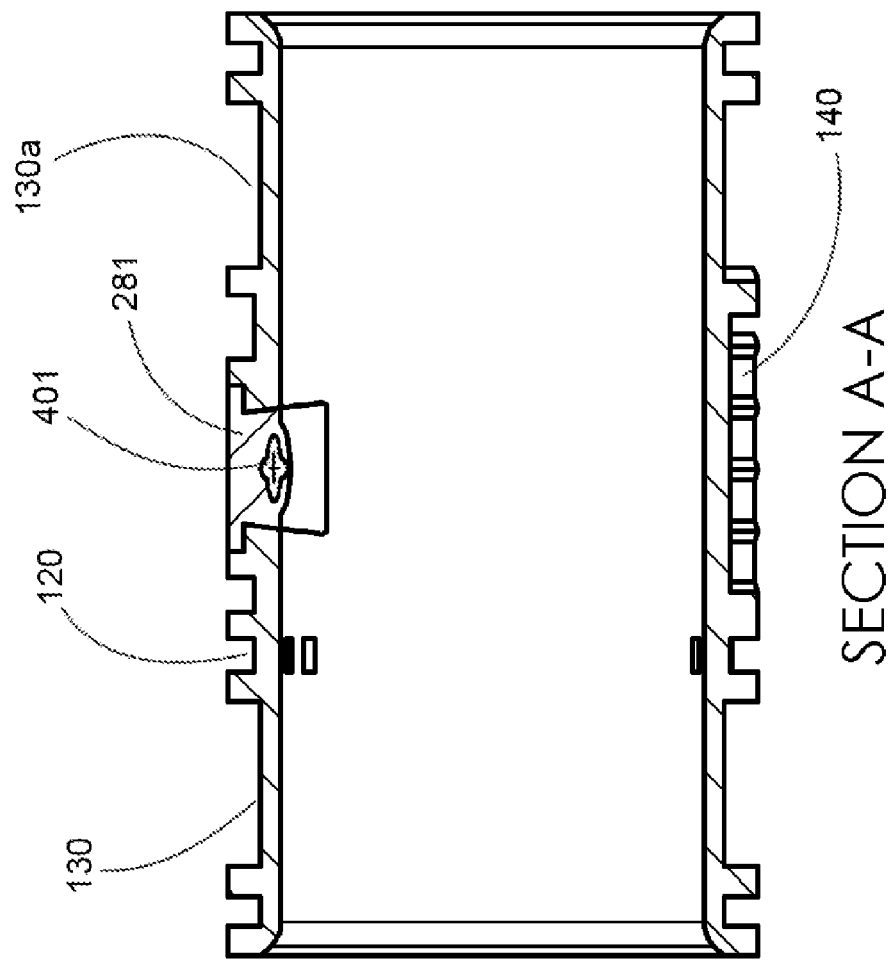
FIG. 9 is a cross-section side view of an embodiment of the drip emitter shown in FIG. 8.

FIG. 8 is an end view of an embodiment of the drip emitter. FIG. 9 is a cross-section side view of an embodiment of the drip emitter shown in FIG. 8. In this view, side cross section of water retainment valve 281 is shown with end view of flaps 401.

Figure 10:
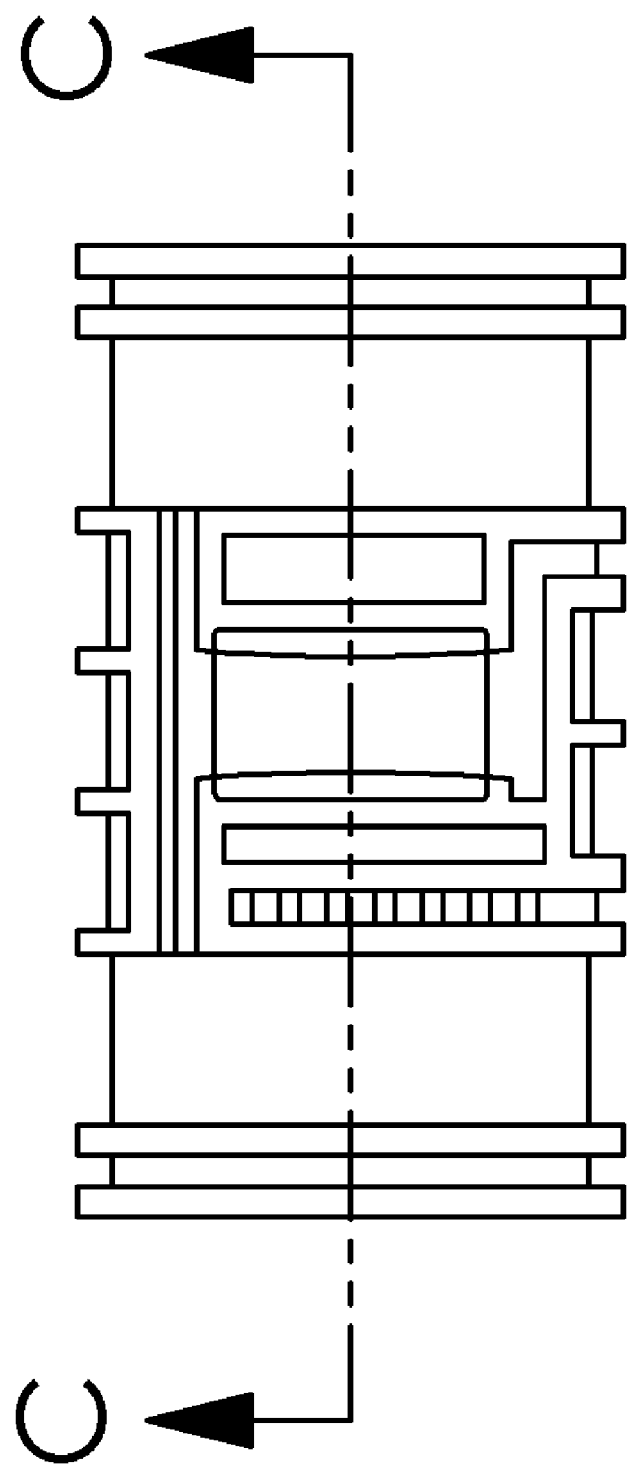
FIG. 10 is a top view of an embodiment of the drip emitter.
Figure 11:
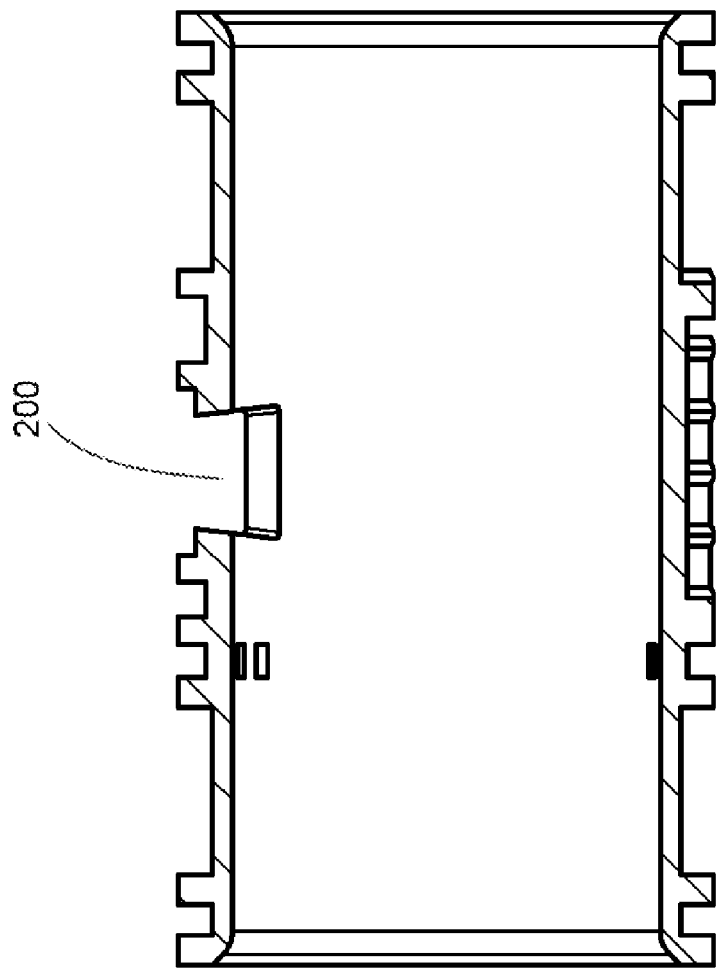
FIG. 11 is a cross-section side view of an embodiment of the drip emitter shown in FIG. 10.

FIG. 10 is a top view of an embodiment of the drip emitter. FIG. 11 is a cross-section side view of an embodiment of the drip emitter shown in FIG. 10. In this view, water retainment valve slot 200 is shown where water retainment valve 281 is placed before enclosing the drip emitter in an enclosing pipe.

Figure 12:
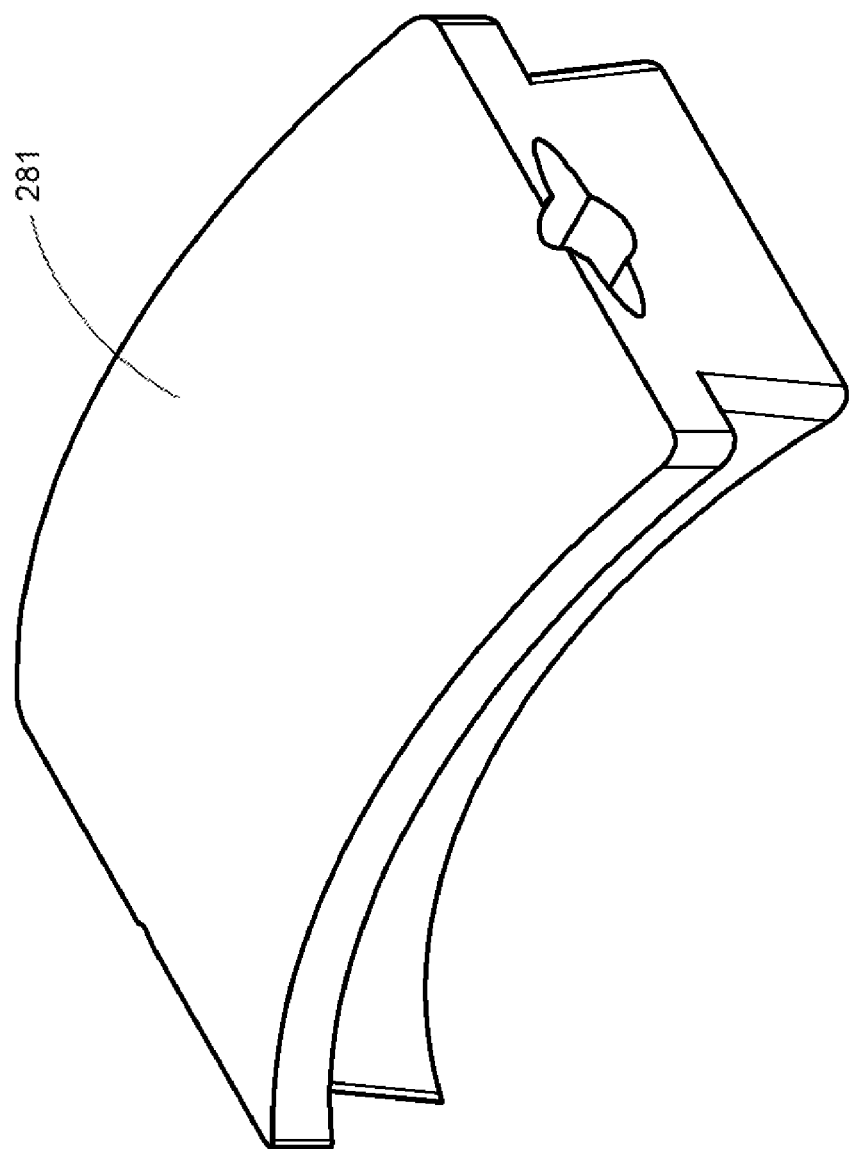
FIG. 12 is perspective view of an embodiment of the water retainment valve.

FIG. 12 is a perspective view of an embodiment of water retainment valve 281, which in this embodiment is a pressure compensated ventable water retainment valve that may be configured as a ventable or non-drain water retainment valve.

Figure 13:
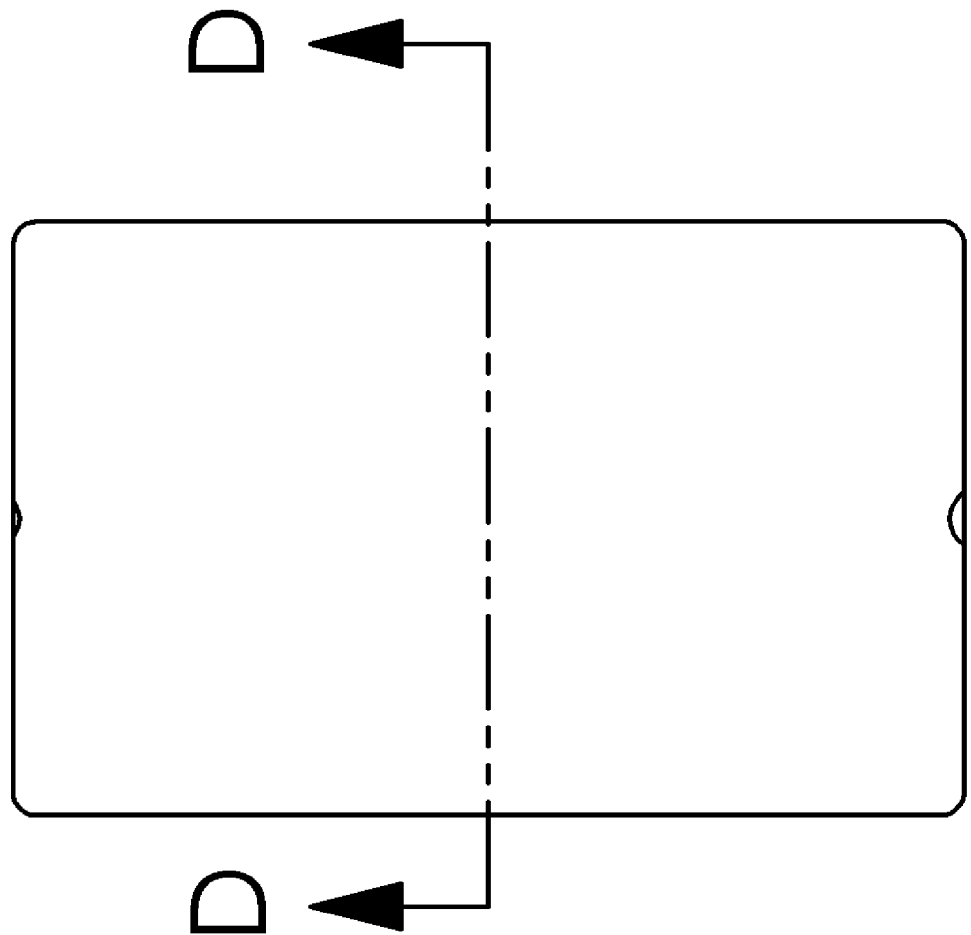
FIG. 13 is a top view of an embodiment of the water retainment valve.
Figure 14:
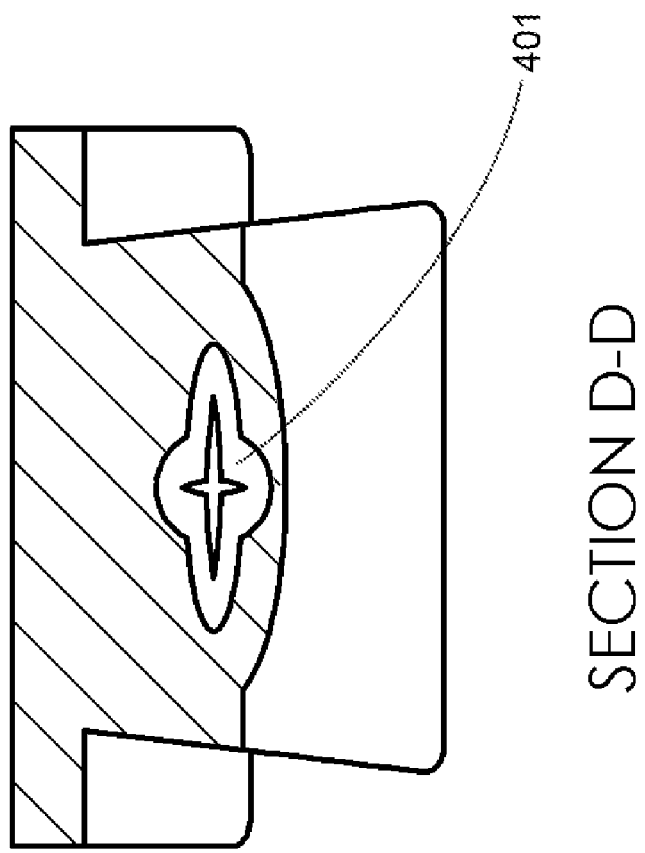
FIG. 14 is a cross-section view of an embodiment of the water retainment valve shown in FIG. 13.

FIG. 13 is a top view of an embodiment of the water retainment valve. FIG. 14 is a cross-section view of an embodiment of the water retainment valve shown in FIG. 13 showing an end view of flaps 401.

Figure 15:
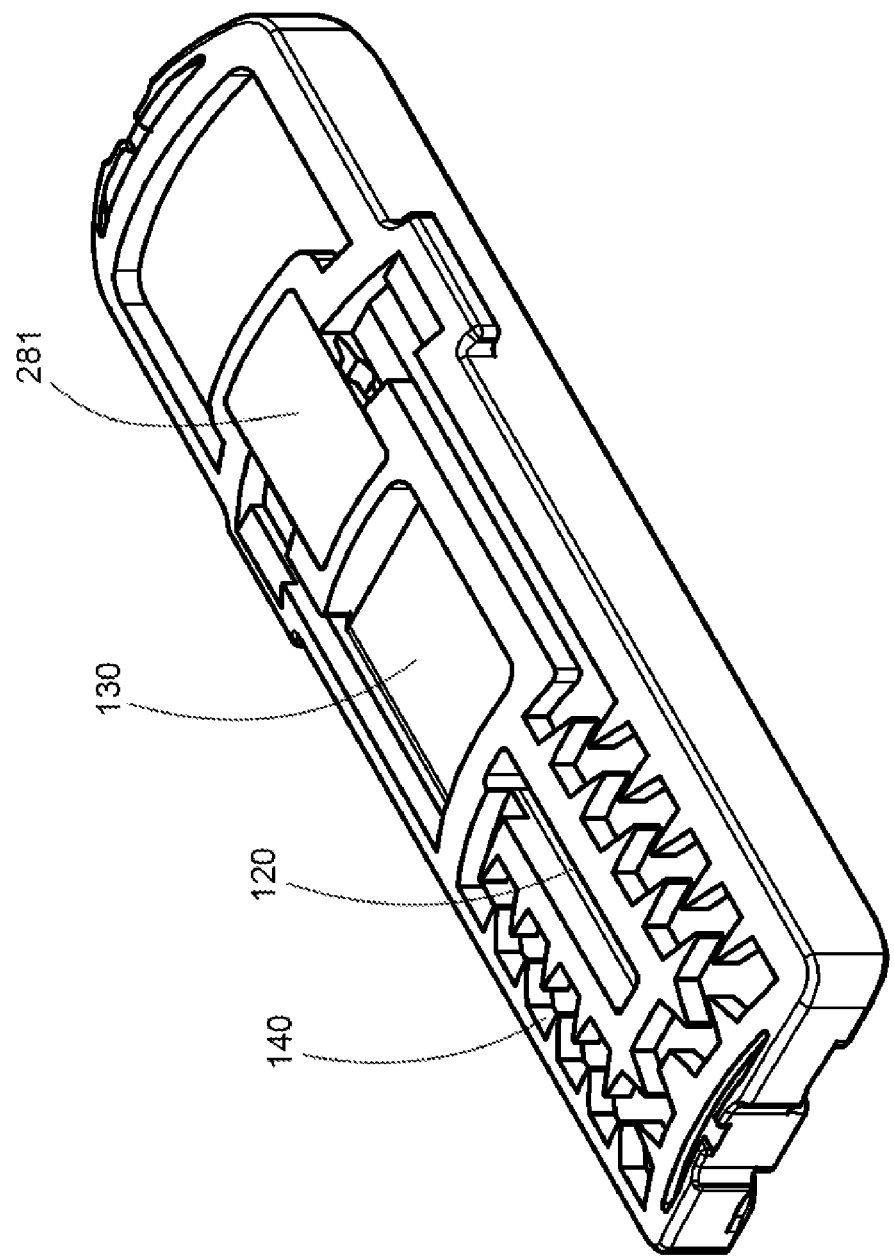
FIG. 15 is a perspective view of a second embodiment of the drip emitter.

FIG. 15 is a perspective view of a second embodiment of the drip emitter. In this semi-cylindrical embodiment, water enters the drip emitter through filter 120, passes into labyrinth 140, through water retainment valve 281 that may also include an integrated pressure compensation member and into pool 130. Placement of the water retainment valve after the initial portion of the labyrinth, or after the end of the labyrinth allows for minimizing the labyrinth to exposure to the elements and prevents clogging.

Figure 16:
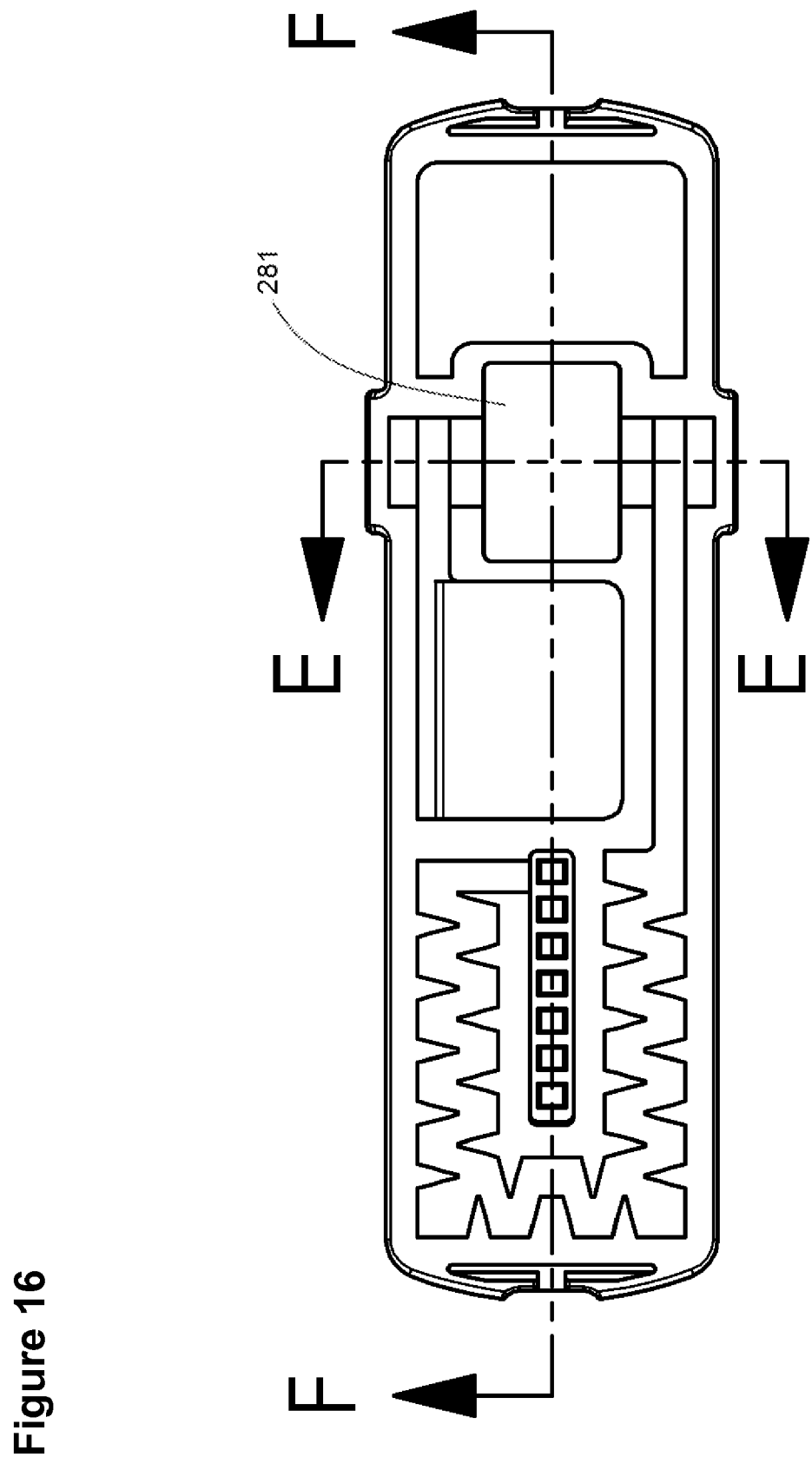
FIG. 16 is a top view of a second embodiment of the drip emitter.
Figure 17:
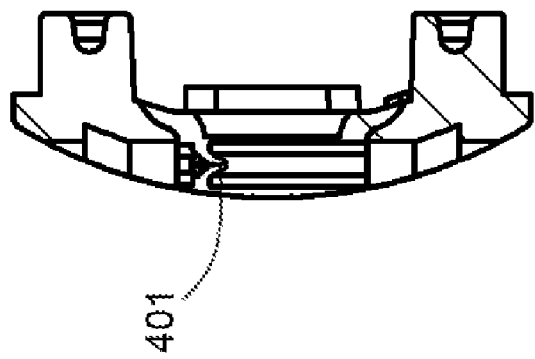
FIG. 17 is a side cross-section view of a second embodiment of the drip emitter shown in FIG. 16.
Figure 18:
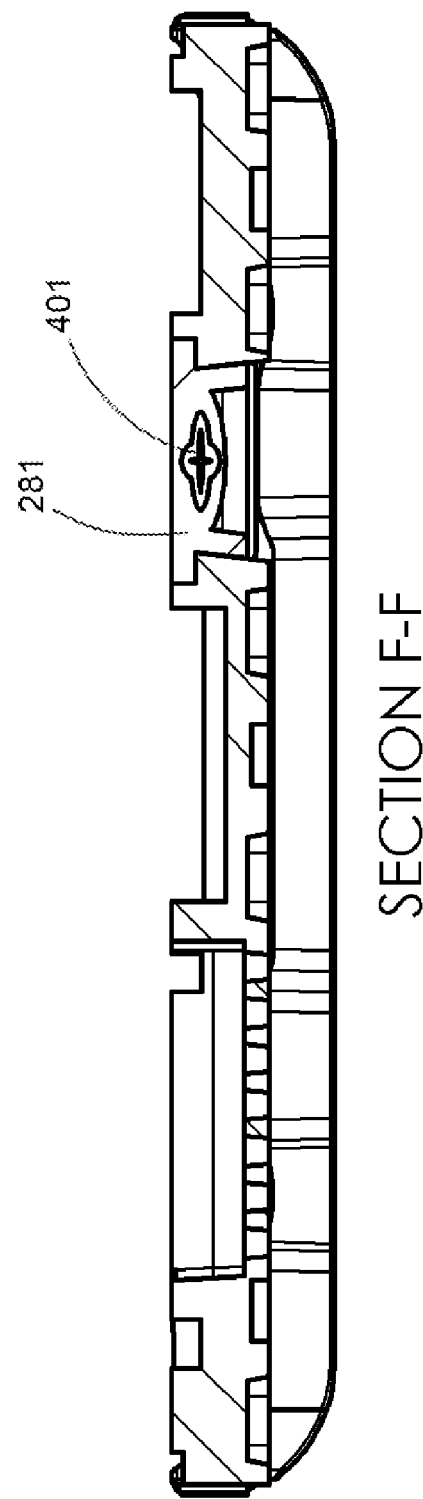
FIG. 18 is an end cross-section view of a second embodiment of the drip emitter shown in FIG. 16.

FIG. 16 is a top view of a second embodiment of the drip emitter. In this view, water retainment valve 281 is shown from the top. FIG. 17 is a side cross-section view of a second embodiment of the drip emitter shown in FIG. 16. In this view flaps 401 are shown from the side. FIG. 18 is an end cross-section view of a second embodiment of the drip emitter shown in FIG. 16. In this view, flaps 401 are seen from the end within water retainment valve 281.

Figure 19:
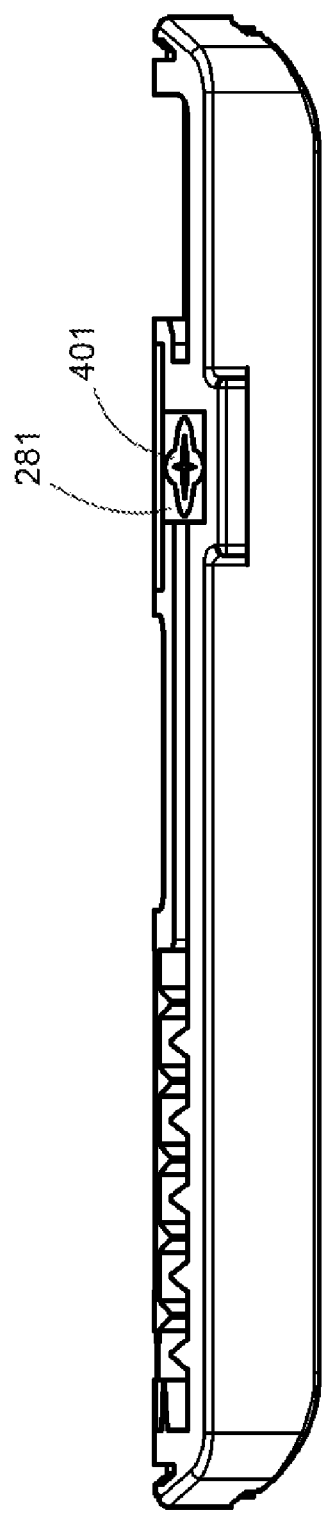
FIG. 19 is a side view of a second embodiment of the drip emitter.

FIG. 19 is a side view of a second embodiment of the drip emitter. In this view, flaps 401 are seen from the end within water retainment valve 281.

Figure 20:
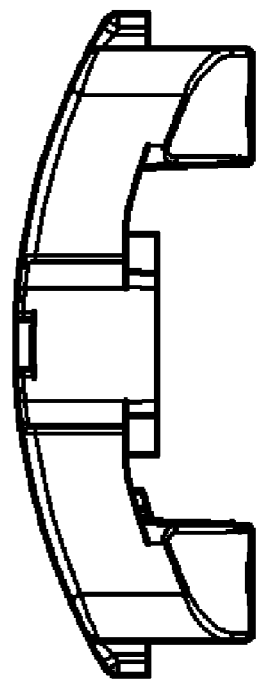
FIG. 20 is an end view of a second embodiment of the drip emitter.

FIG. 20 is end view of a second embodiment of the drip emitter. In this particular embodiment the height of the drip emitter is 3.3 mm. Any depth of drip emitter may be manufactured depending on the implementation requirements.

Figure 21:
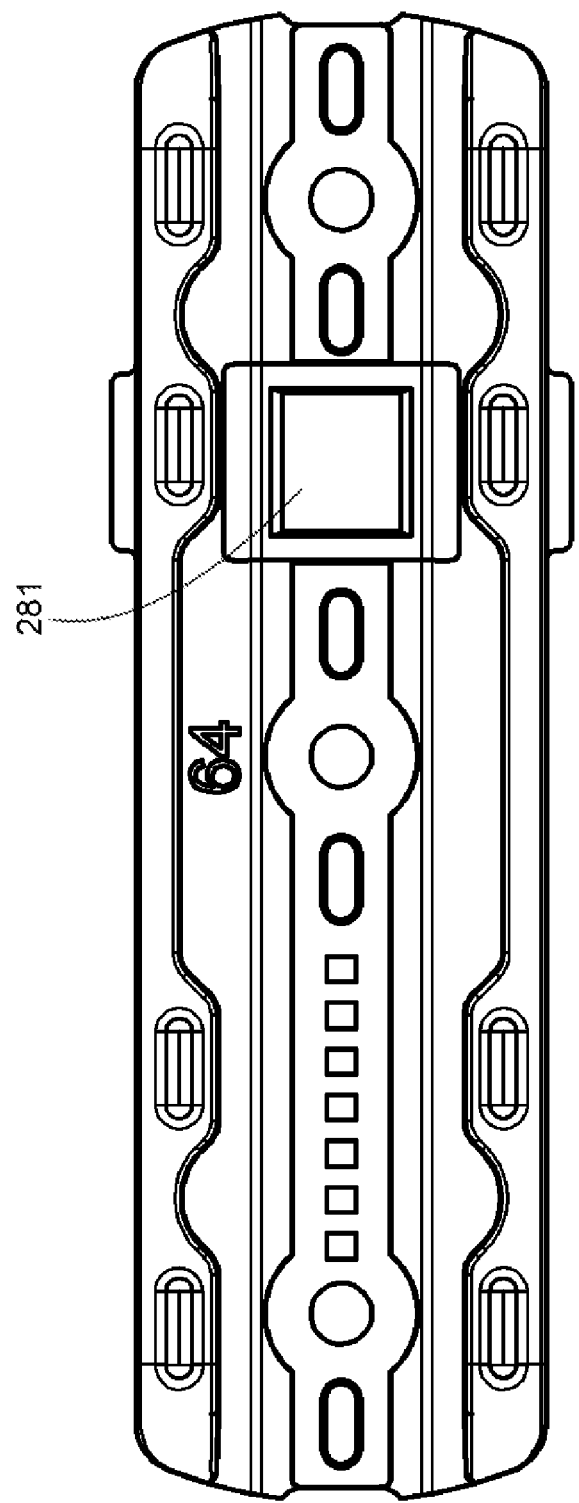
FIG. 21 is a bottom view of a second embodiment of the drip emitter.
Figure 22:
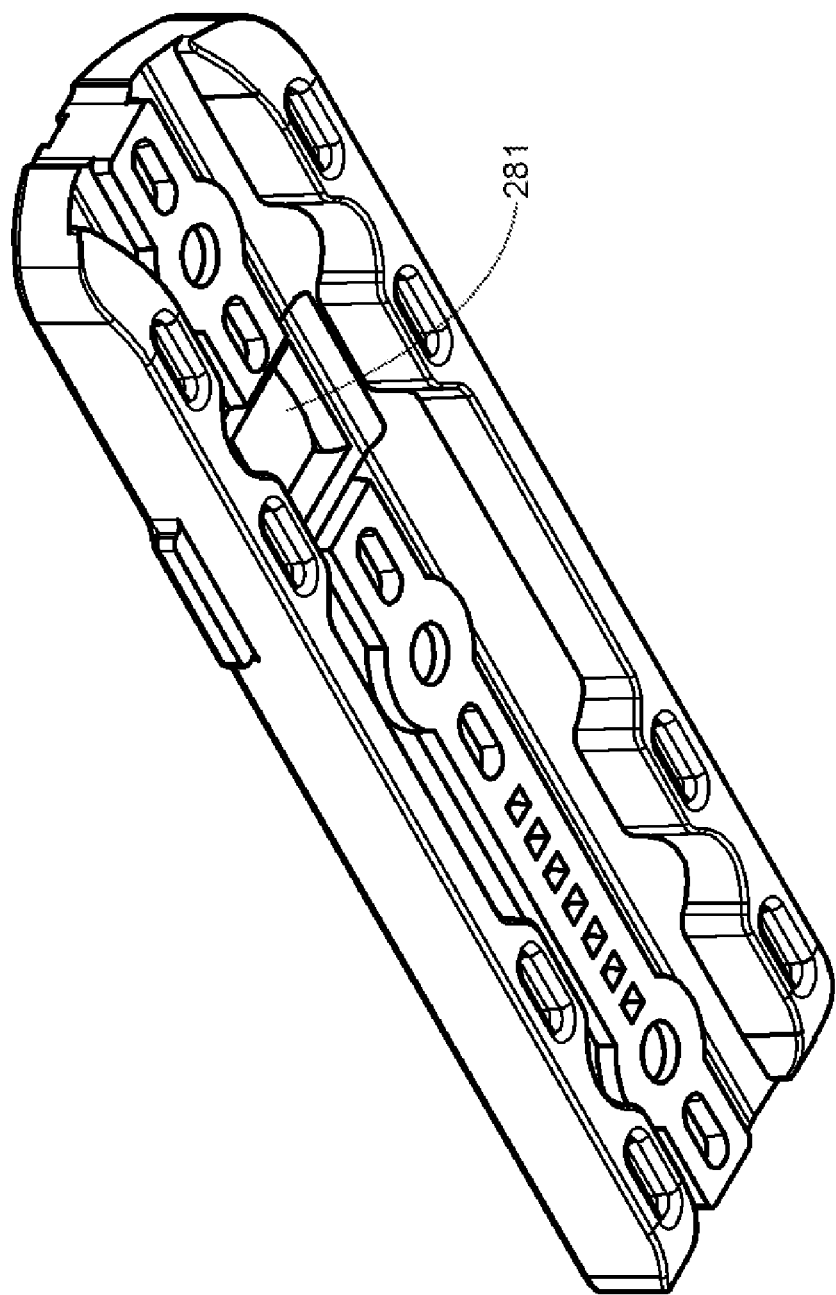
FIG. 22 is a perspective bottom view of a second embodiment of the drip emitter.

FIG. 21 is a bottom view of a second embodiment of the drip emitter. In this view, the drip emitter is shown as 29.8 mm in length and 8.4 mm in width. Any length or width of drip emitter can be manufactured depending on the implementation requirements. FIG. 22 is a perspective bottom view of a second embodiment of the drip emitter.

Figure 23:
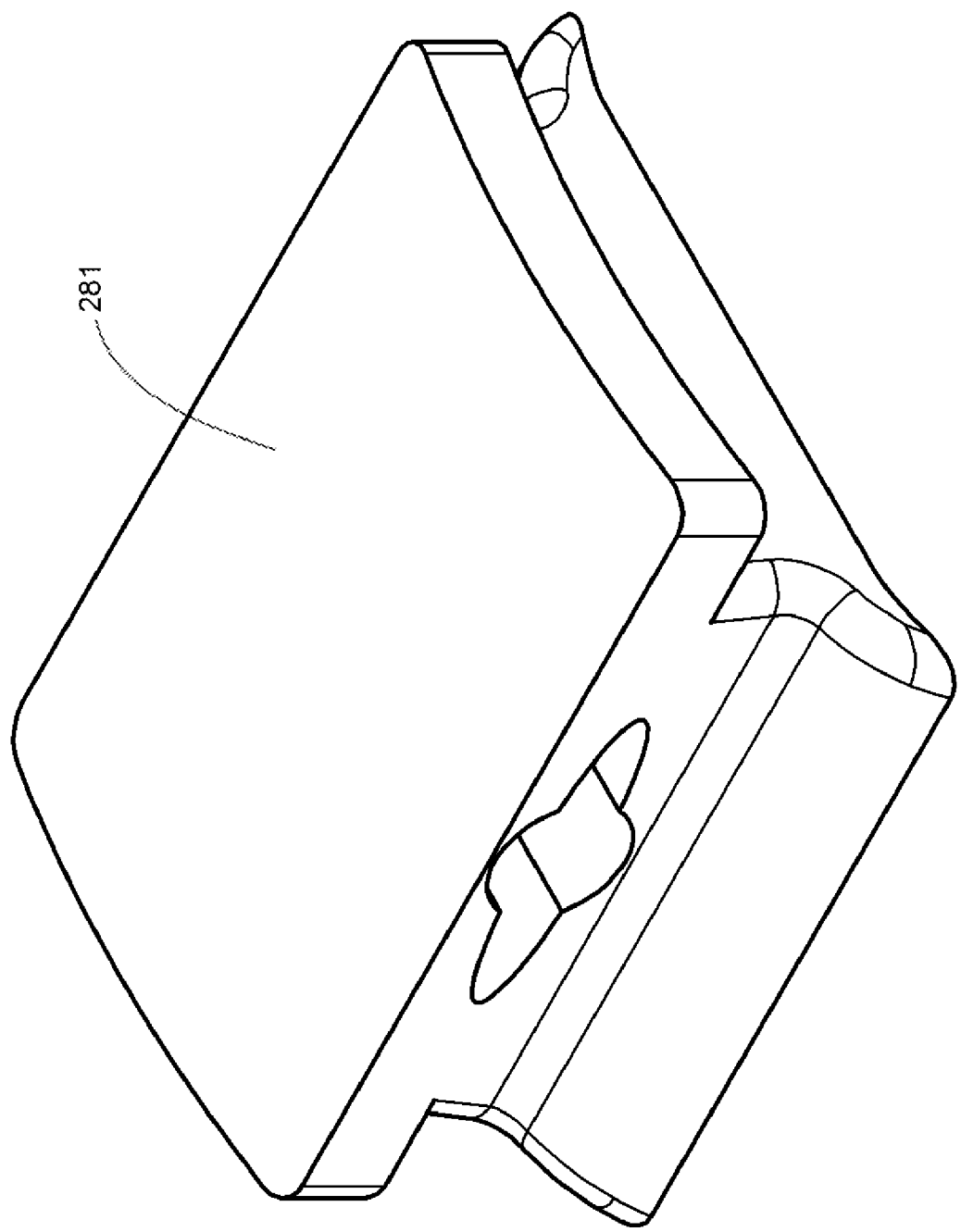
FIG. 23 is a perspective view of a second embodiment of the water retainment valve.
Figure 24:
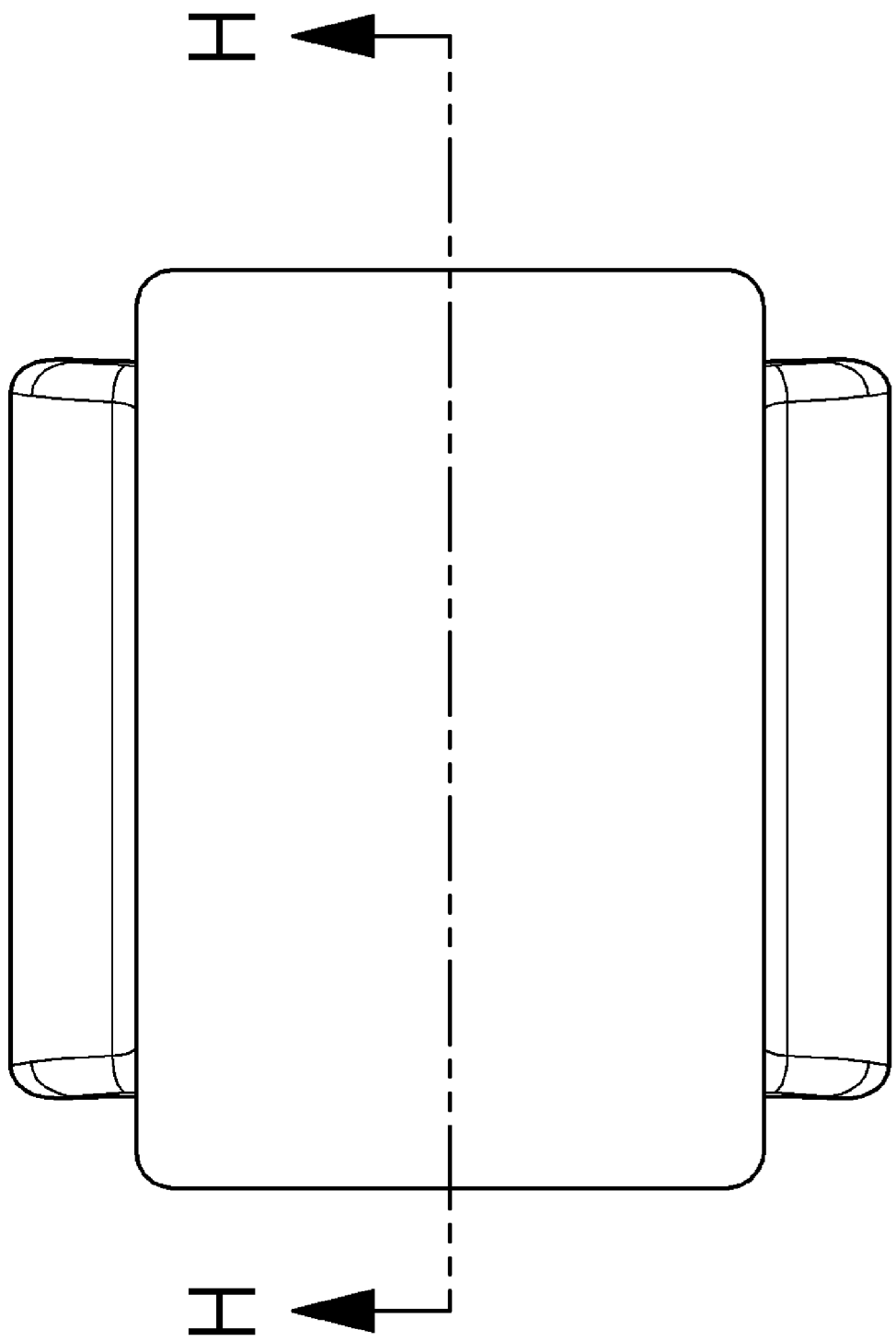
FIG. 24 is a top view of a second embodiment of the water retainment valve.
Figure 25:
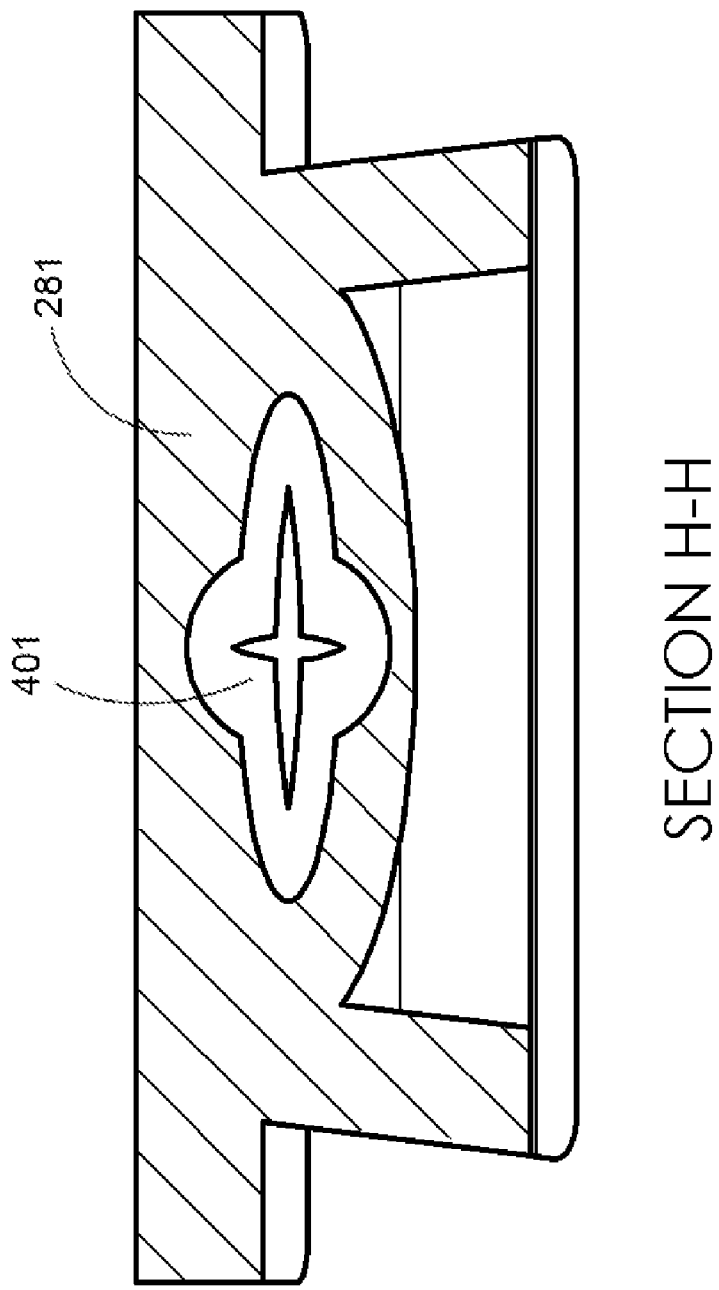
FIG. 25 is an end cross-section view of a second embodiment of the water retainment valve shown in FIG. 24.
Figure 26:
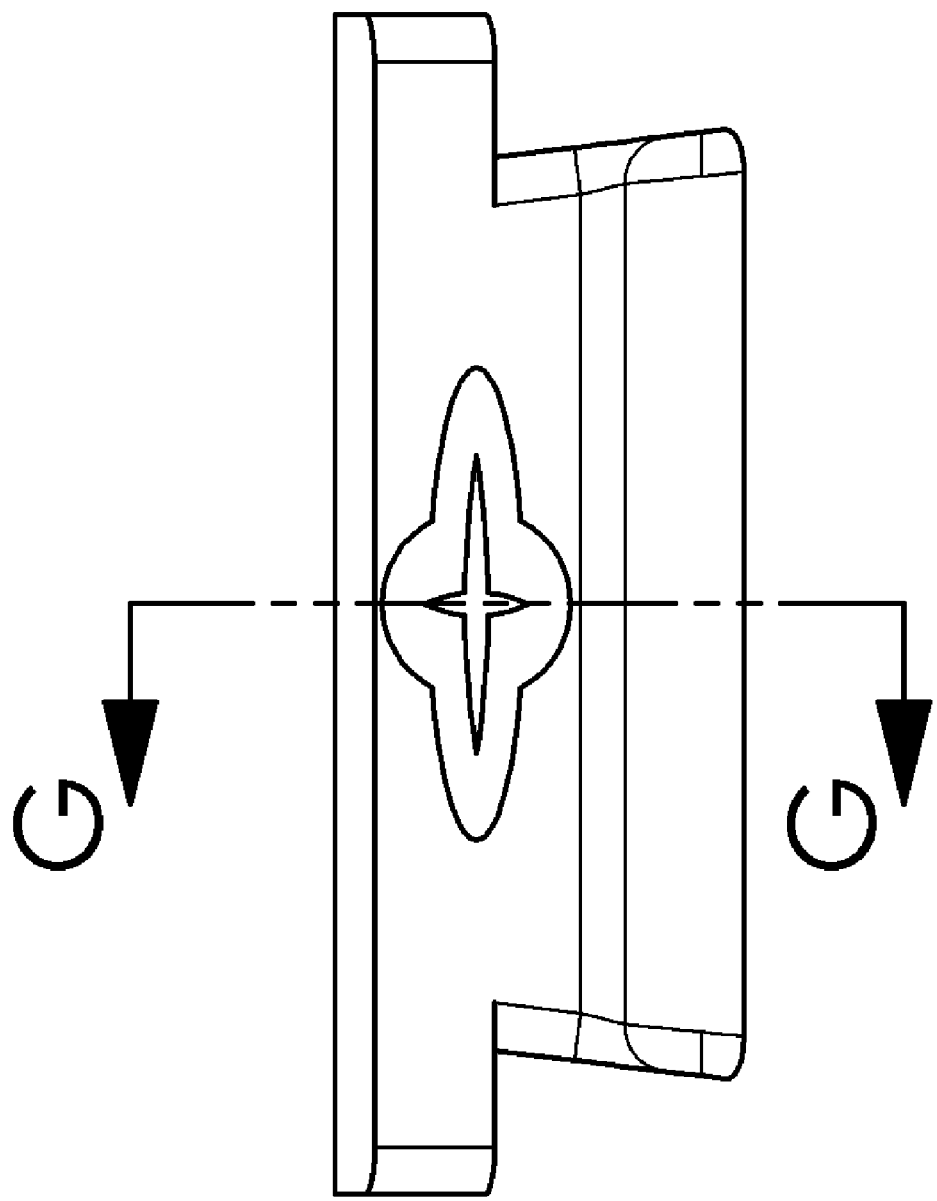
FIG. 26 is end view of a second embodiment of the water retainment valve.
Figure 27:
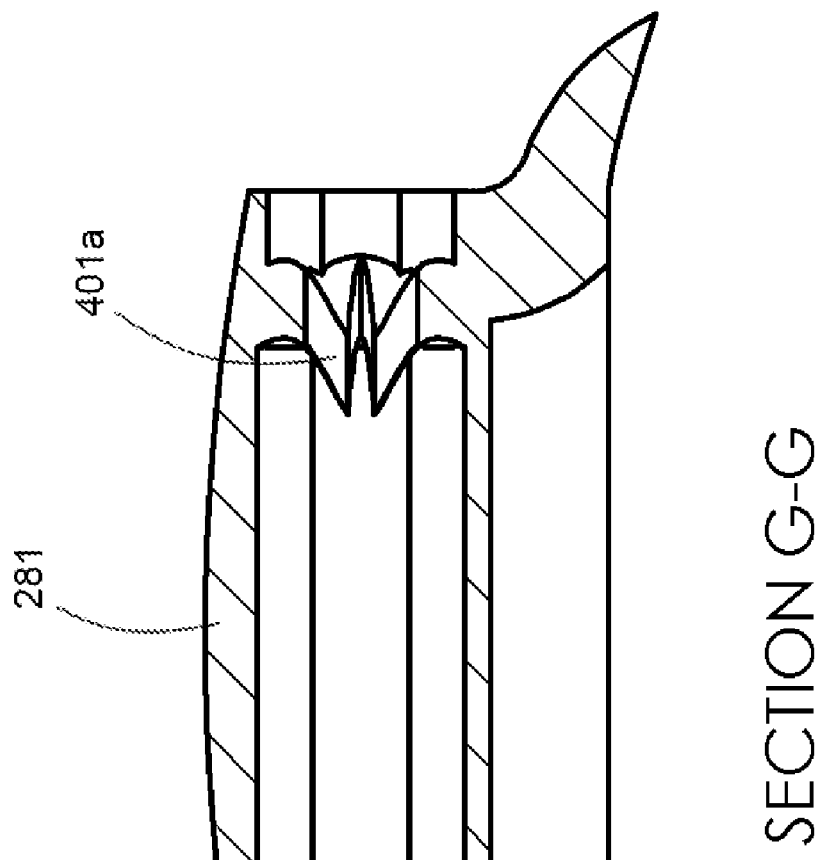
FIG. 27 is a side cross-section view of a second embodiment of the water retainment valve shown in FIG. 26.
Figure 28:
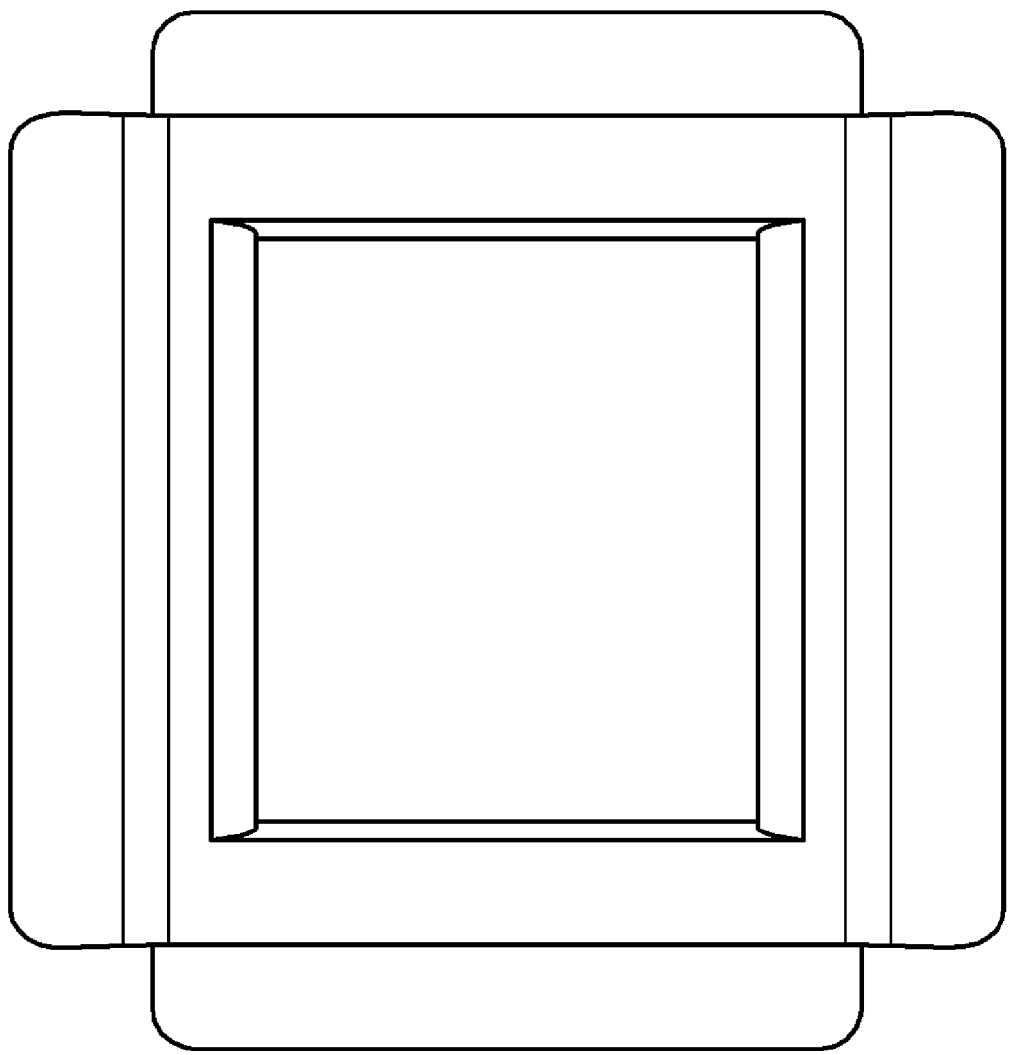
FIG. 28 is a bottom view of a second embodiment of the water retainment valve.

FIG. 23 is a perspective view of a second embodiment of the water retainment valve. FIG. 24 is a top view of a second embodiment of the water retainment valve. FIG. 25 is an end cross-section view of a second embodiment of the water retainment valve shown in FIG. 24. In this embodiment, flaps 401 in water retainment valve 281 are shown from the end. FIG. 26 is end view of a second embodiment of the water retainment valve. FIG. 27 is a side cross-section view of a second embodiment of the water retainment valve shown in FIG. 26. In this embodiment, flaps 401a point inward under no pressure and form a non-drain embodiment of the water retention valve. FIG. 28 is a bottom view of a second embodiment of the water retainment valve.

Figure 29:
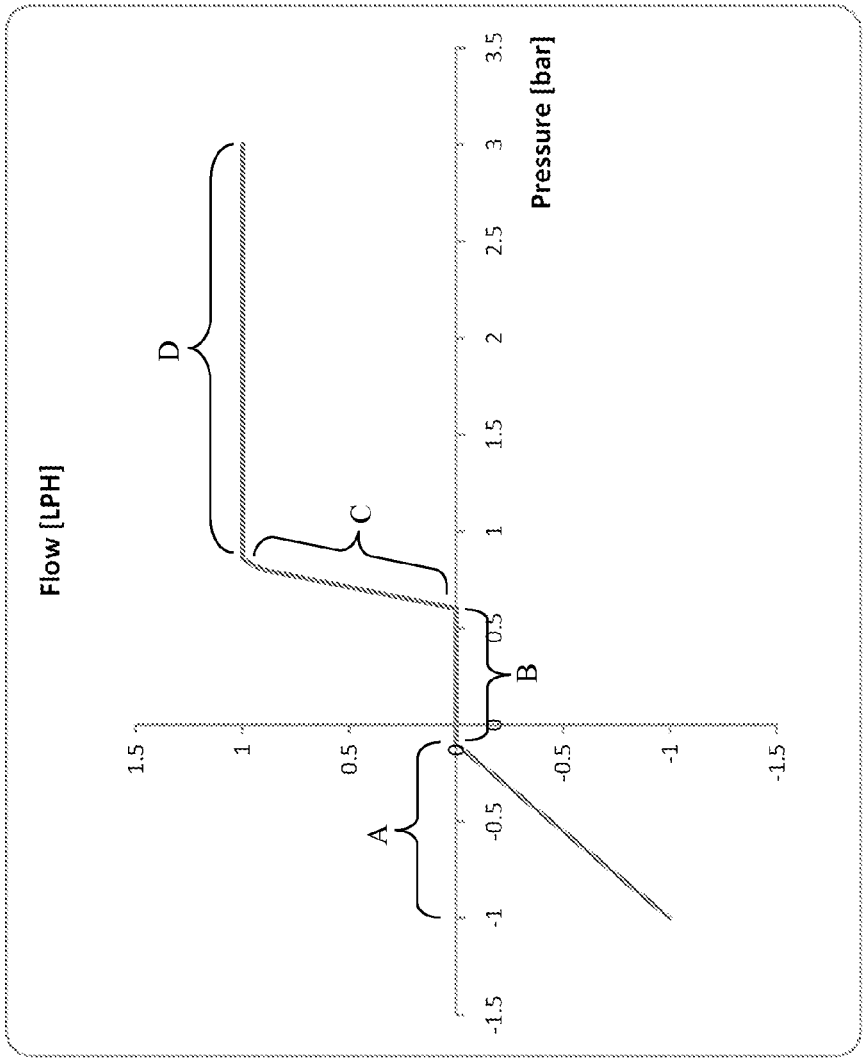
FIG. 29 is a graph of flow versus pressure in a non-drain embodiment of the water retainment valve.

FIG. 29 is a graph of flow versus pressure in a non-drain embodiment of the water retainment valve. In FIG. 29, the water retention valve is constructed with inwardly pointing flaps (against the flow of water in the water path) that touch one another under zero pressure difference. As shown in flow area A, under negative pressure, air can backflow into the drip emitter as the flaps point inward and are easily opened under negative pressure. As shown in flow area B, at a pressure slightly below atmospheric pressure within the drip emitter up until a particular threshold, for example 0.5 atmosphere higher than atmospheric pressure, there it no water flow out of the drip emitter as the inwardly pointing flaps are pressed against one another under the pressure. As shown in flow area C, at above 0.5 atmosphere pressure difference between internal drip emitter and atmospheric pressure, the flaps are forced in the opposite direction along the water flow path and begin to open. As shown in flow area D, once the flaps have fully opened, the water flow rate is limited by the resistance to water flow within the drip emitter water flow path.

Figure 30:
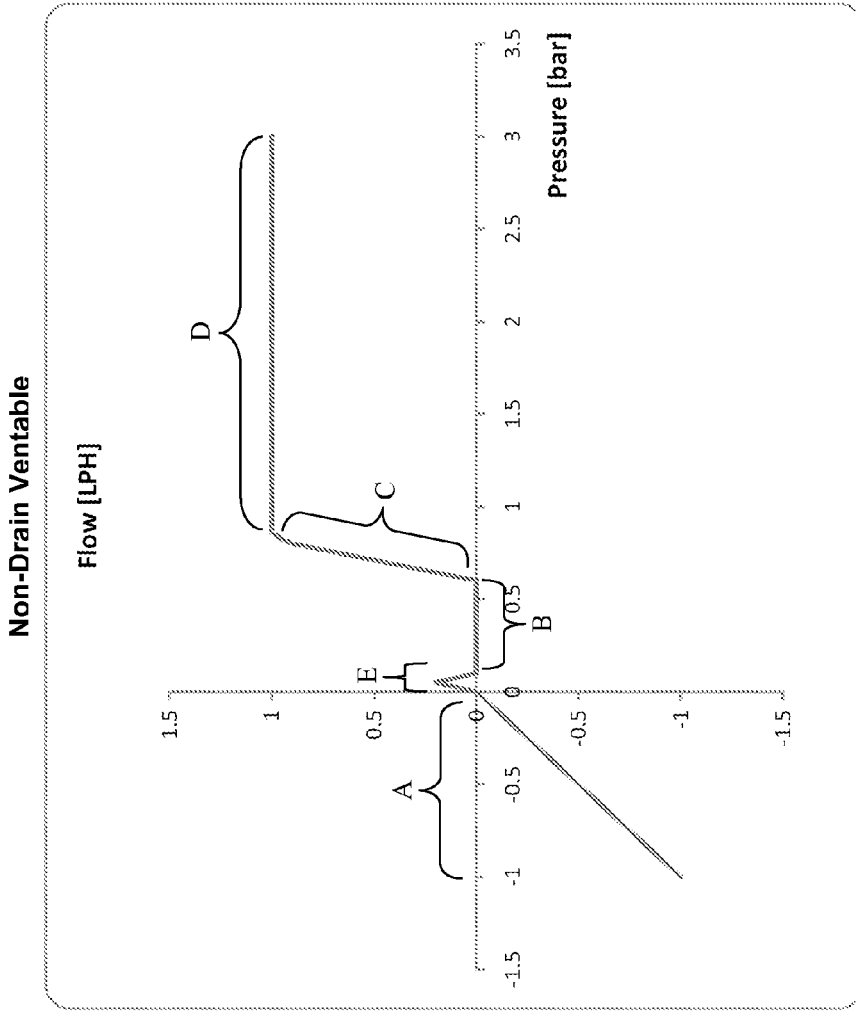
FIG. 30 is a graph of flow versus pressure in a non-drain embodiment of the water retainment valve with flaps that are not fully closed at zero pressure difference.

In FIG. 30, the water retention valve is constructed with inwardly pointing flaps (against the flow of water in the water path) that do not touch one another under zero pressure difference. For example, there is a slight gap between the flaps under no pressure difference between internal and external drip emitter pressure. As shown in flow area A, under negative pressure, air can backflow into the drip emitter as the flaps point inward and are easily opened under negative pressure. As shown in flow area E, water slightly flows through the flaps until the flaps have enough pressure against them, which requires a slight flow of water to press the flaps together. As shown in flow area B, at a pressure slightly above atmospheric pressure within the drip emitter up until a particular threshold, for example 0.5 atmosphere higher than atmospheric pressure, there it no water flow out of the drip emitter as the inwardly pointing flaps are pressed against one another under the pressure. As shown in flow area C, at above 0.5 atmosphere pressure difference between internal drip emitter and atmospheric pressure, the flaps are forced in the opposite direction along the water flow path and begin to open. As shown in flow area D, once the flaps have fully opened, the water flow rate is limited by the resistance to water flow within the drip emitter water flow path.

Figure 31:
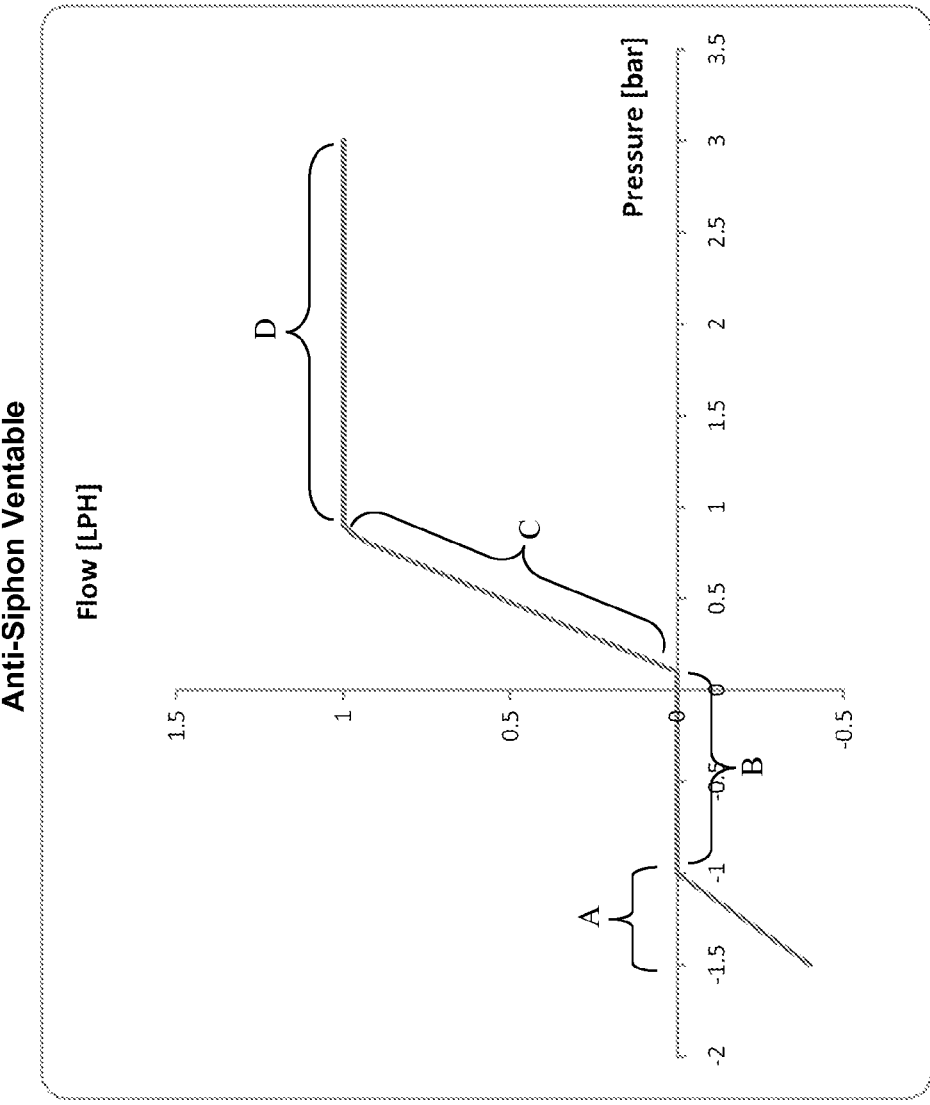
FIG. 31 is a graph of flow versus pressure in ventable and anti-siphon embodiments of the water retainment valve.

FIG. 31 is a graph of flow versus pressure in ventable and anti-siphon embodiments of the water retainment valve. In FIG. 31, the water retention valve is constructed with outwardly pointing flaps (aligned in the direction of the flow of water in the water path when irrigating) that touch one another under zero pressure difference. As shown in flow area A, under negative pressure, air can backflow into the drip emitter as the flaps change direction to point inward and are thus opened under negative pressure. As shown in flow area B, at a negative pressure below atmospheric pressure within the drip emitter up until a particular threshold, for example 0.1 atmosphere higher than atmospheric pressure, there it no water flow out of the drip emitter as the outwardly pointing flaps are pressed against one another. As shown in flow area C, at above for example 0.1 atmosphere pressure difference between internal drip emitter and atmospheric pressure, the flaps are pointed in the direction along the water flow path and begin to open. As shown in flow area D, once the flaps have fully opened, the water flow rate is limited by the resistance to water flow within the drip emitter water flow path.

FIG. 32 is a graph of flow versus pressure in ventable and anti-siphon embodiments of the water retainment valve with flaps that are not fully closed at zero pressure difference. In FIG. 32, the water retention valve is constructed with outwardly pointing flaps (in the direction of the flow of water in the water path during irrigation) that do not touch one another under zero pressure difference. For example, there is a slight gap between the flaps under no pressure difference between internal and external drip emitter pressure. As shown in flow area A, under negative pressure, air can backflow into the drip emitter as the flaps change direction to point inward and are thus opened under negative pressure. As shown in flow area B, at a negative pressure below atmospheric pressure within the drip emitter up until a particular threshold, for example −0.1 atmosphere lower than atmospheric pressure, there it no water flow out of the drip emitter as the outwardly pointing flaps are pressed against one another. As shown in flow area E, air slightly flows through the flaps into the drip emitter until the flaps have enough pressure against them, which requires a slight flow of inward flow of air (or any other matter) to press the flaps together. As shown in flow area C, at above for example 0.0 atmosphere pressure difference between internal drip emitter and atmospheric pressure, the flaps are pointed in the direction along the water flow path and are already slightly open at zero pressure difference. The flaps begin to open more as the pressure difference increases. As shown in flow area D, once the flaps have fully opened, the water flow rate is limited by the resistance to water flow within the drip emitter water flow path.

Figure 33:
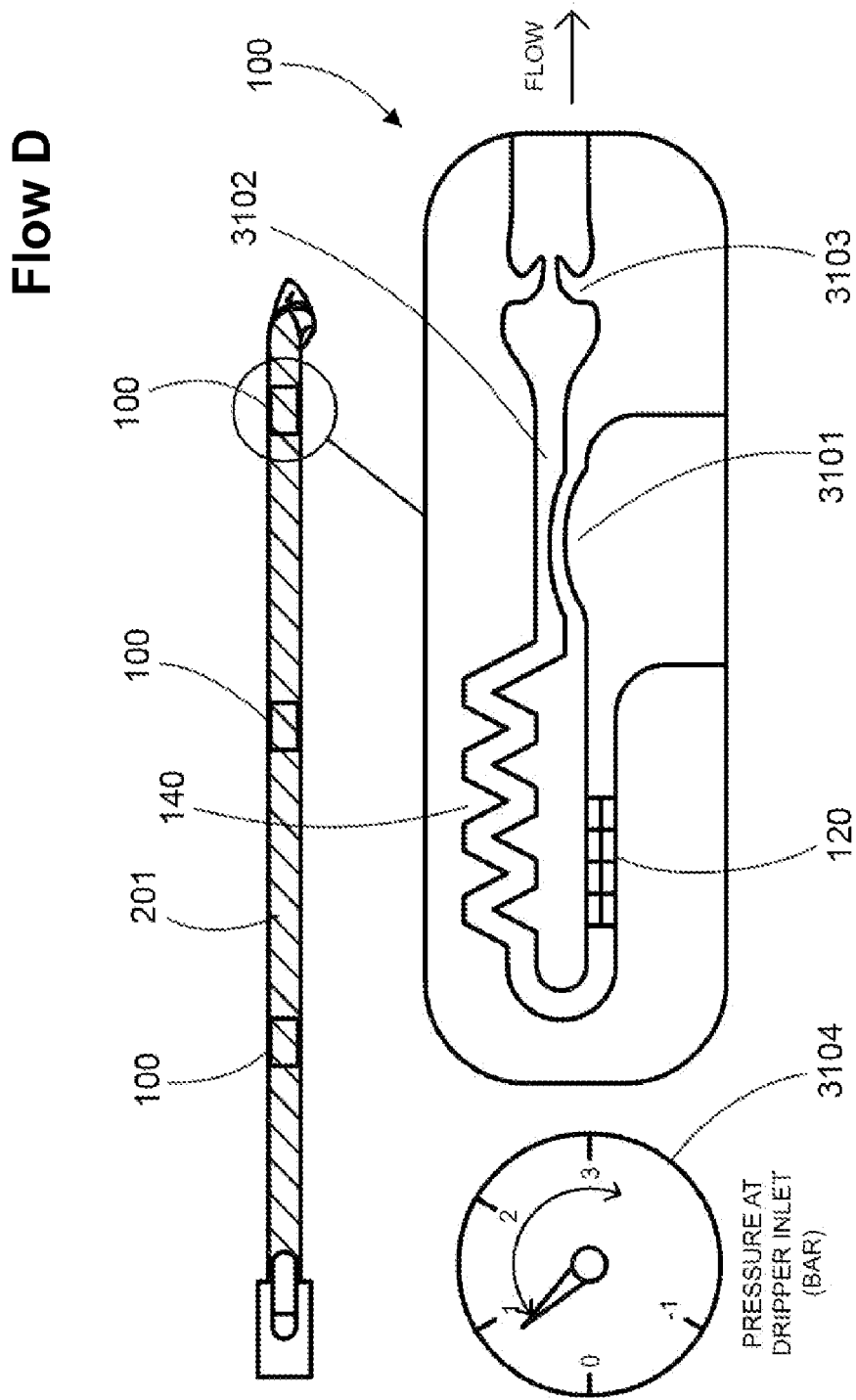
FIG. 33 shows a view of the pressure compensation and ventable valve components at a given pressure range depicted at flow D in FIGS. 29 and 30.

FIG. 33 shows a view of the pressure compensation and ventable valve components at a given pressure range depicted at flow D in FIGS. 29 and 30. In this view, under positive relative pressure as shown at pressure chart 3104, pressure compensation element 3101 bends toward water flow path 3102 which tends to limit the flow of water through water flow path 3102 as the pressure rises. Under normal positive water flow through water flow path 3102, flaps 3103 that form a water retainment valve are open and water flow exits drip emitter 100 to water an agricultural area for example.

Figure 34:
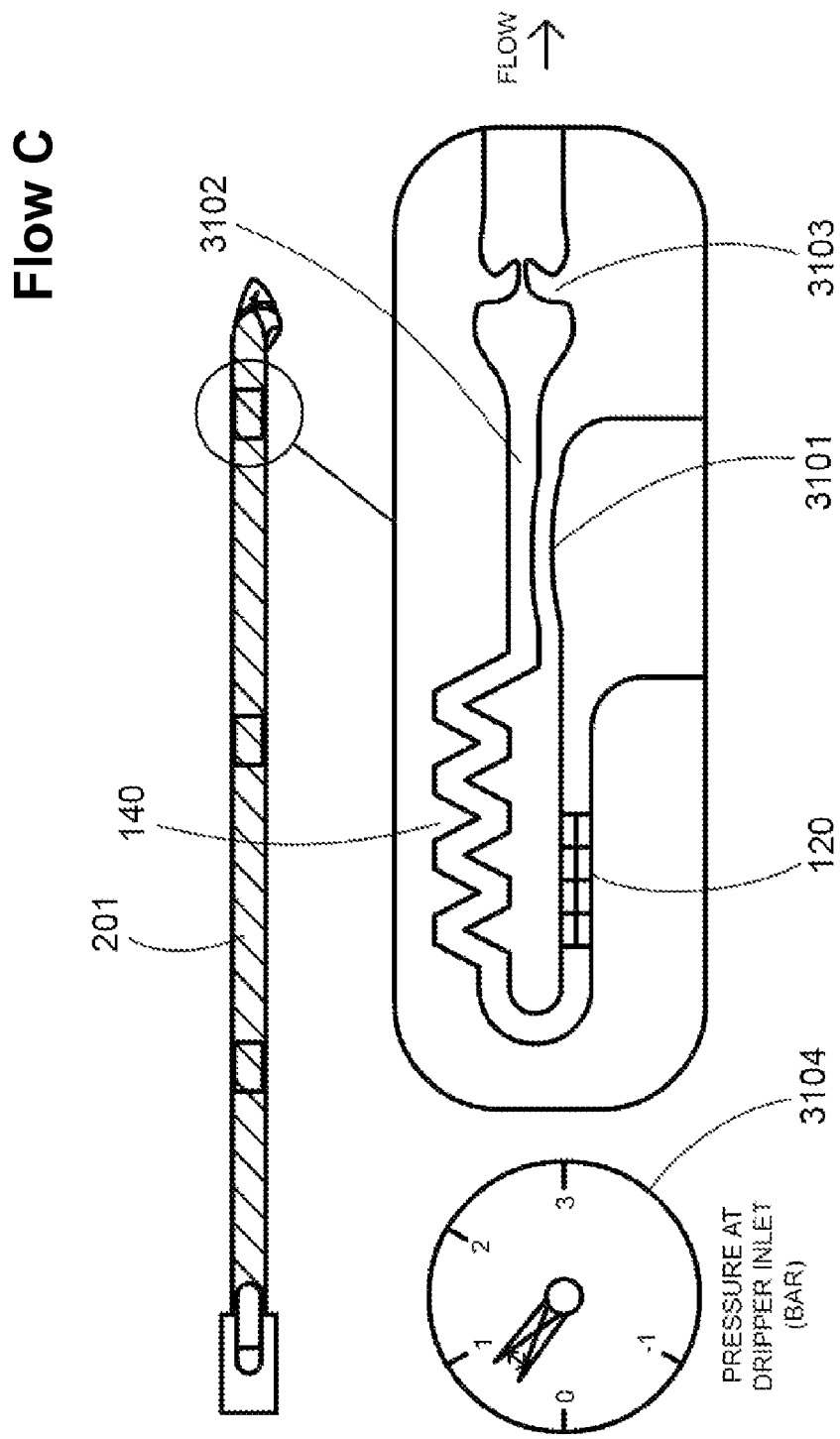
FIG. 34 shows a view of the pressure compensation and ventable valve components at a given pressure range depicted at flow C in FIGS. 29 and 30.

FIG. 34 shows a view of the pressure compensation and ventable valve components at a given pressure range depicted at flow C in FIGS. 29 and 30. In this view, under a positive threshold pressure, positive water flow occurs through drip emitter 100. Pressure compensation element 3101 is not active to the point of limiting the flow out of the drip emitter as the pressure is low enough so that pressure compensation element 3101 does not bend into water flow path 3102. Flaps 3103 are slightly open under this input pressure and a slight flow of water exits the drip emitter.

Figure 35:
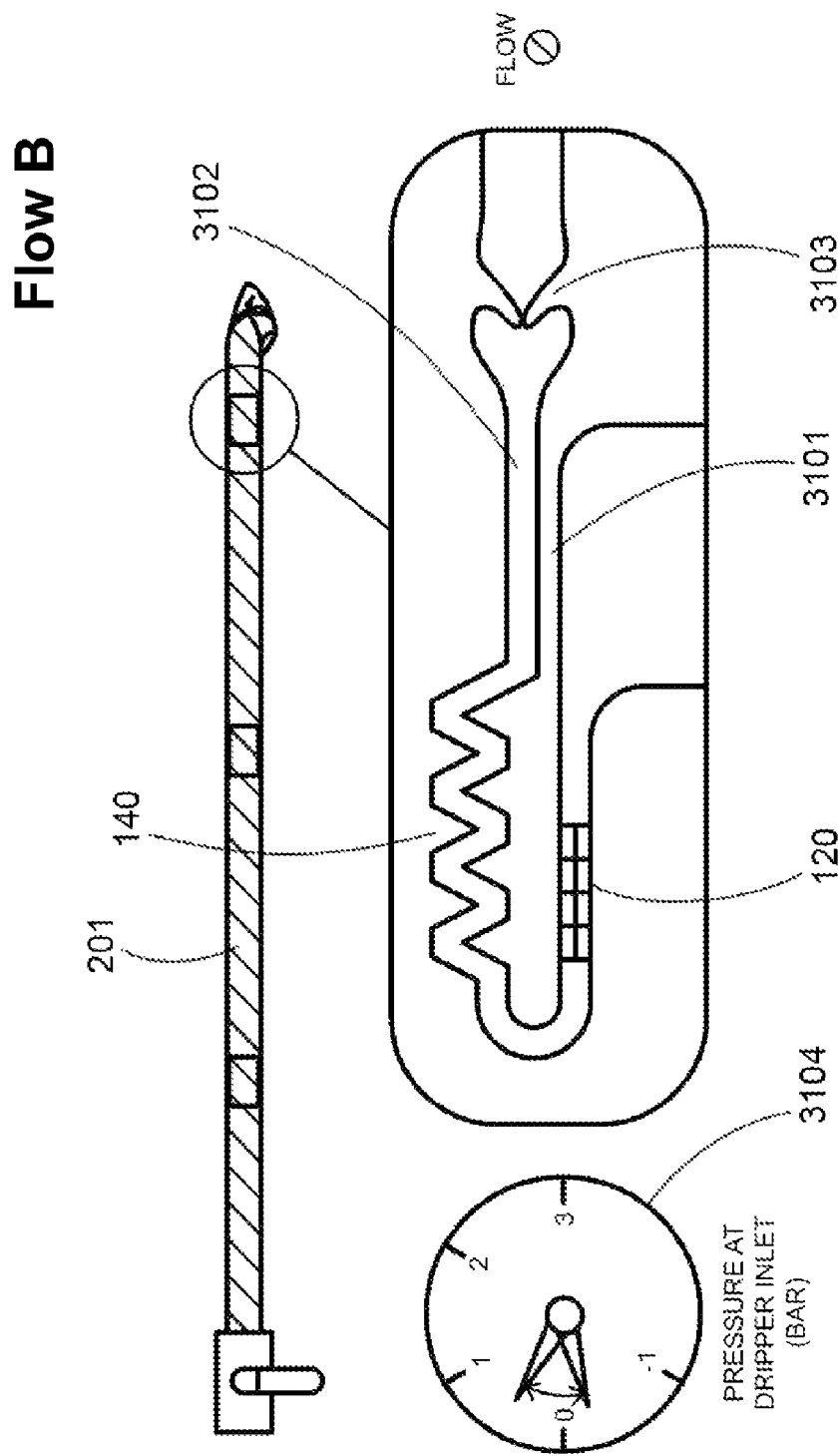
FIG. 35 shows a view of the pressure compensation and ventable valve components at a given pressure range depicted at flow B in FIGS. 29 and 30.

FIG. 35 shows a view of the pressure compensation and ventable valve components at a given pressure range depicted at flow B in FIGS. 29 and 30. In this view, under a small and/or negative pressure, flaps 3103 change direction to point into the drip emitter. Although no flow of air enters the drip emitter, a small increase in negative pressure results in the state shown in FIG. 36.

Figure 36:
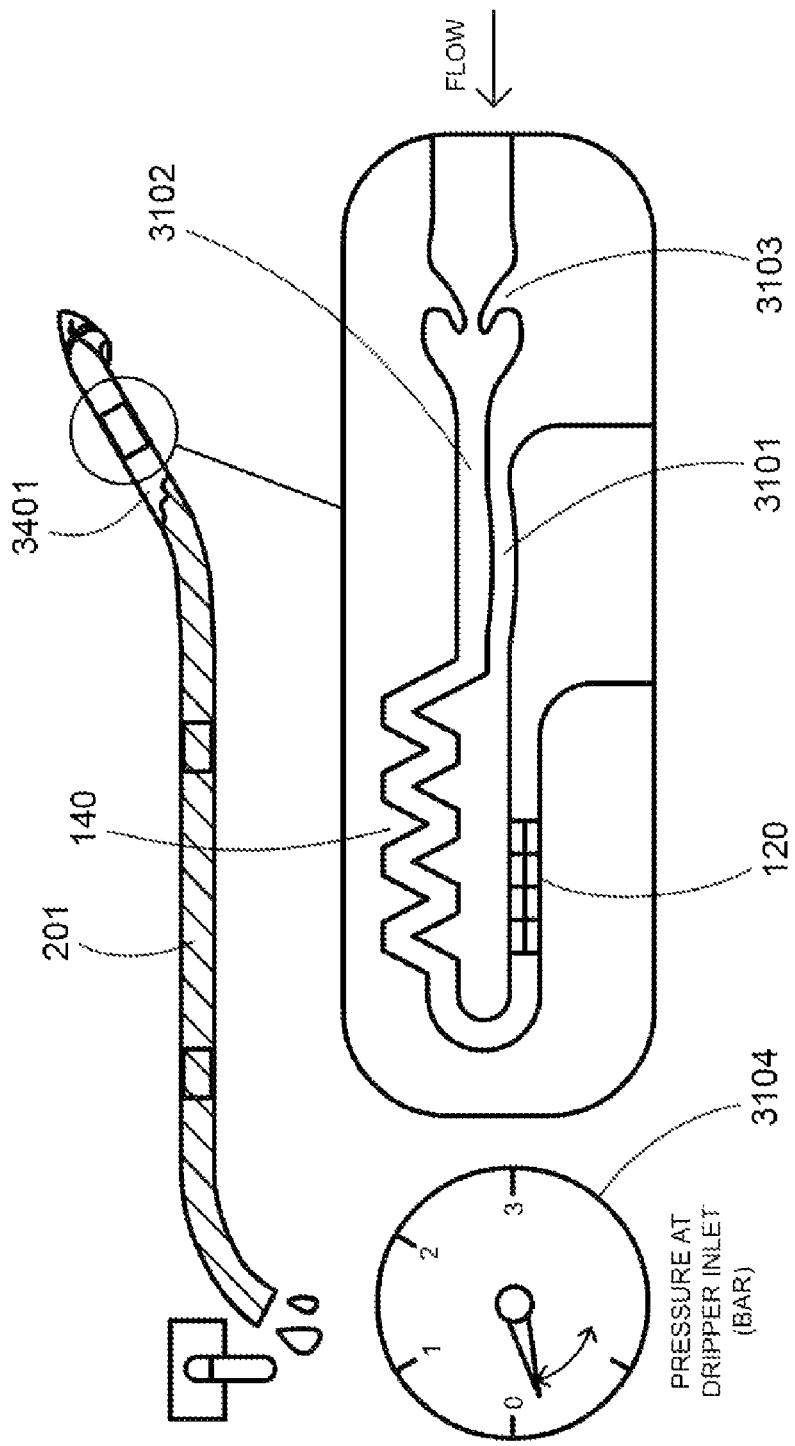
FIG. 36 shows a view of the pressure compensation and ventable valve components at a given pressure range depicted at flow A in FIGS. 29 and 30.

FIG. 36 shows a view of the pressure compensation and ventable valve components at a given pressure range depicted at flow A in FIGS. 29 and 30. In this view, which corresponds to a ventable embodiment which allow for pipe draining and rolling for example, flaps 3103 open as a large enough backflow pressure threshold is applied to the pipe with respect to atmospheric pressure external to the pipe. As flaps 3103 open, air 3401 (or water), enters water flow path 3102, labyrinth 140, filter 120 and pipe 201.

Figure 37:
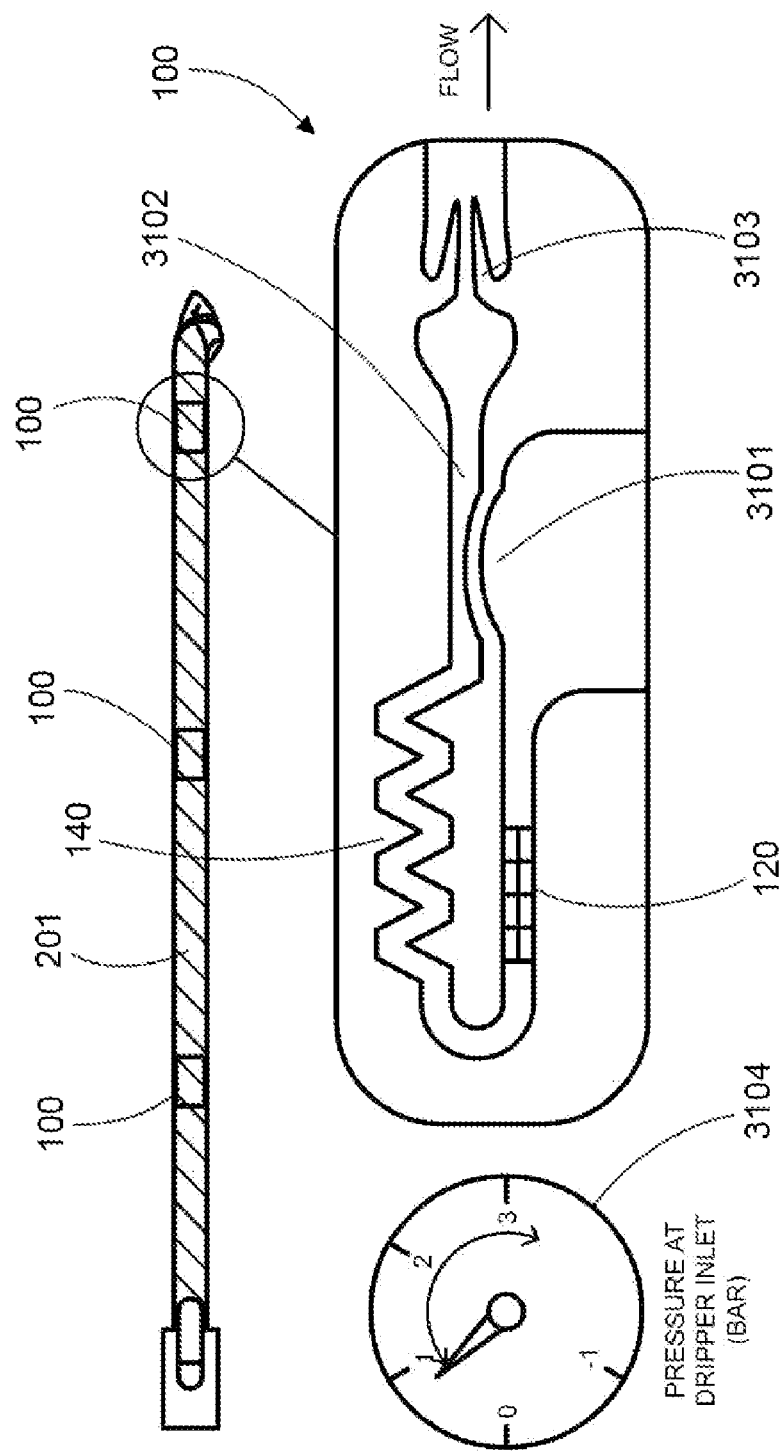
FIG. 37 shows a view of the pressure compensation and ventable valve components at a given pressure range depicted at flow D in FIGS. 31 and 32.

FIG. 37 shows a view of the pressure compensation and ventable valve components at a given pressure range depicted at flow D in FIGS. 31 and 32. In this view, under positive relative pressure as shown at pressure chart 3104, pressure compensation element 3101 bends toward water flow path 3102 which tends to limit the flow of water through water flow path 3102 as the pressure rises. Under normal positive water flow through water flow path 3102, flaps 3103 that form a water retainment valve are open and water flow exits drip emitter 100 to water an agricultural area for example.

Figure 38:
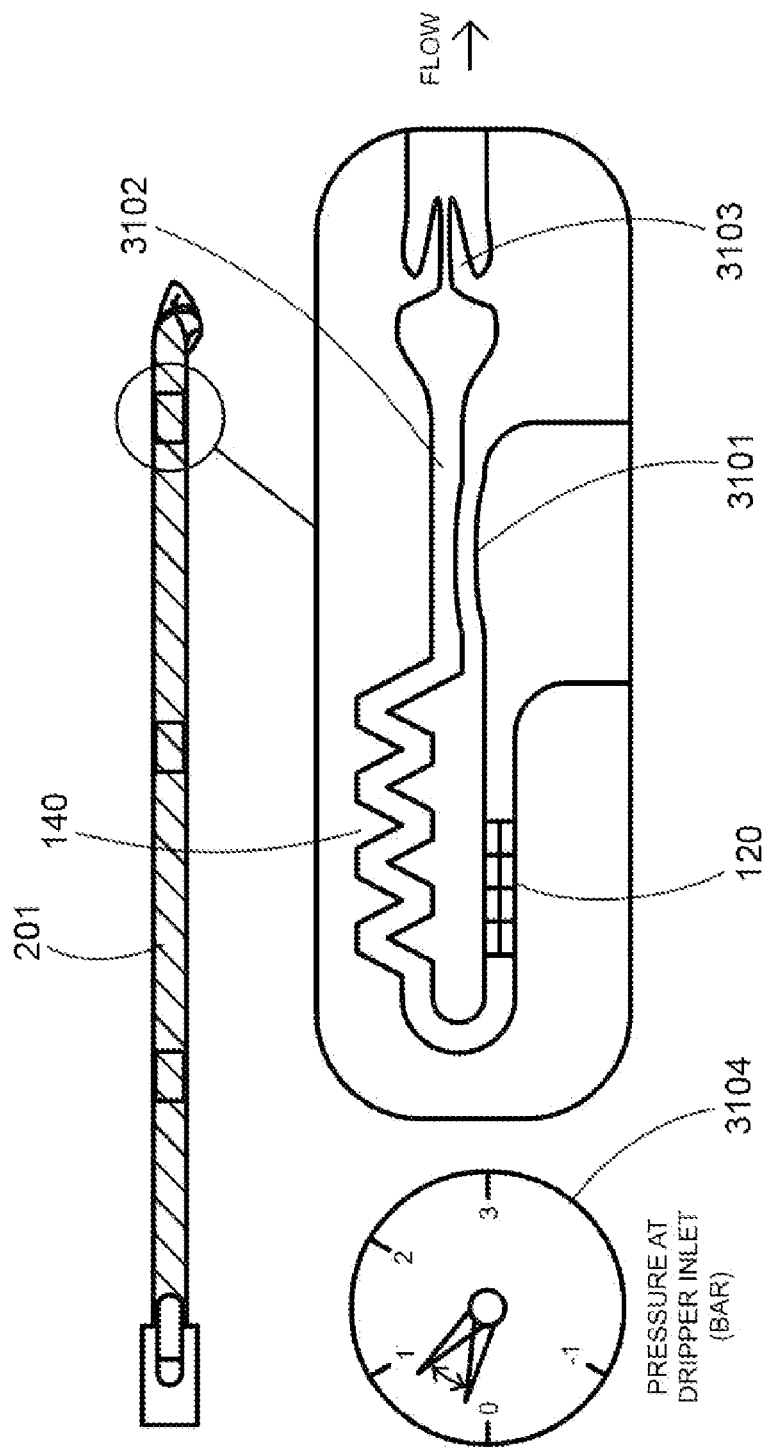
FIG. 38 shows a view of the pressure compensation and ventable valve components at a given pressure range depicted at flow C in FIGS. 31 and 32.

FIG. 38 shows a view of the pressure compensation and ventable valve components at a given pressure range depicted at flow C in FIGS. 31 and 32. In this view, under a positive threshold pressure, positive water flow occurs through drip emitter 100. Pressure compensation element 3101 is not active to the point of limiting the flow out of the drip emitter as the pressure is low enough so that pressure compensation element 3101 does not bend into water flow path 3102. Flaps 3103 are slightly open under this input pressure and a slight flow of water exits the drip emitter.

Figure 39:
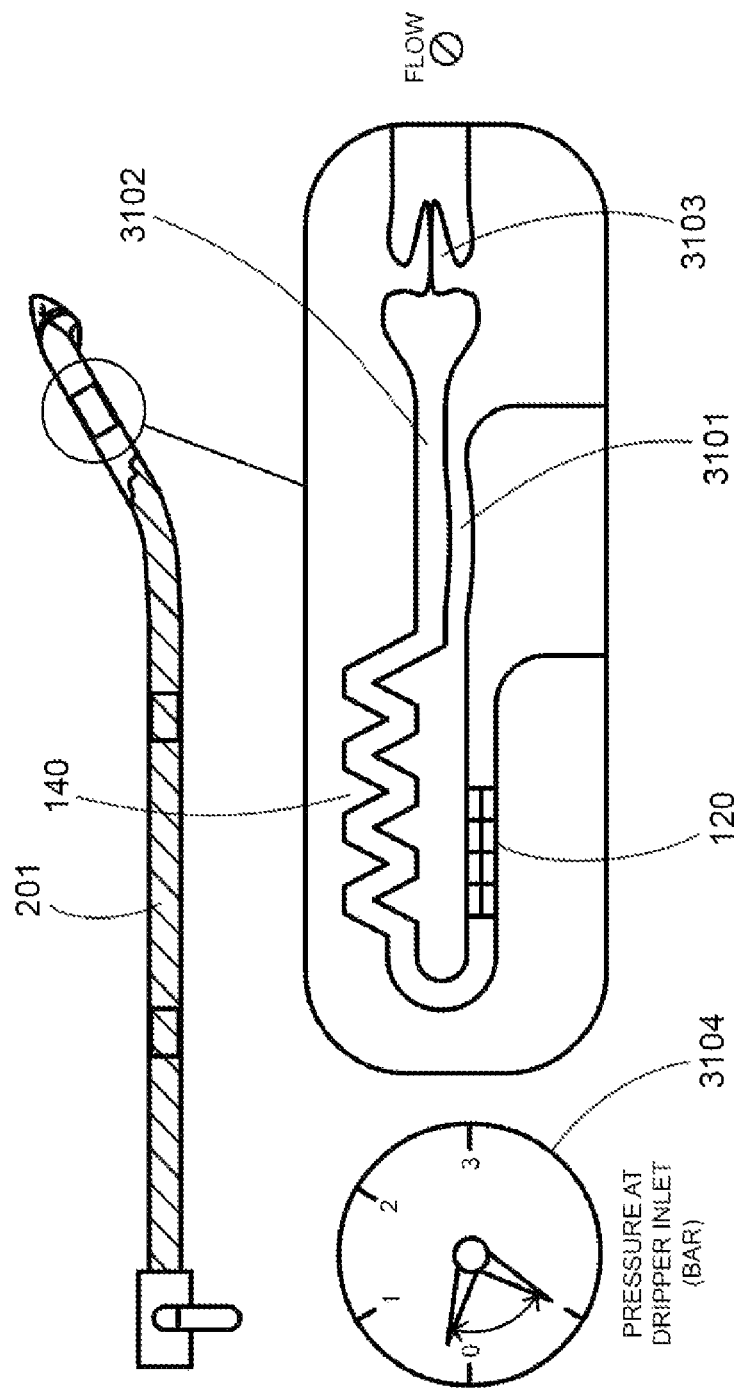
FIG. 39 shows a view of the pressure compensation and ventable valve components at a given pressure range depicted at flow B in FIGS. 31 and 32.

FIG. 39 shows a view of the pressure compensation and ventable valve components at a given pressure range depicted at flow B in FIGS. 31 and 32. In this view, under a small and/or negative pressure, flaps 3103 change direction to point into the drip emitter. Although no flow of air enters the drip emitter, a small increase in negative pressure results in the state shown in FIG. 40.

Figure 40:
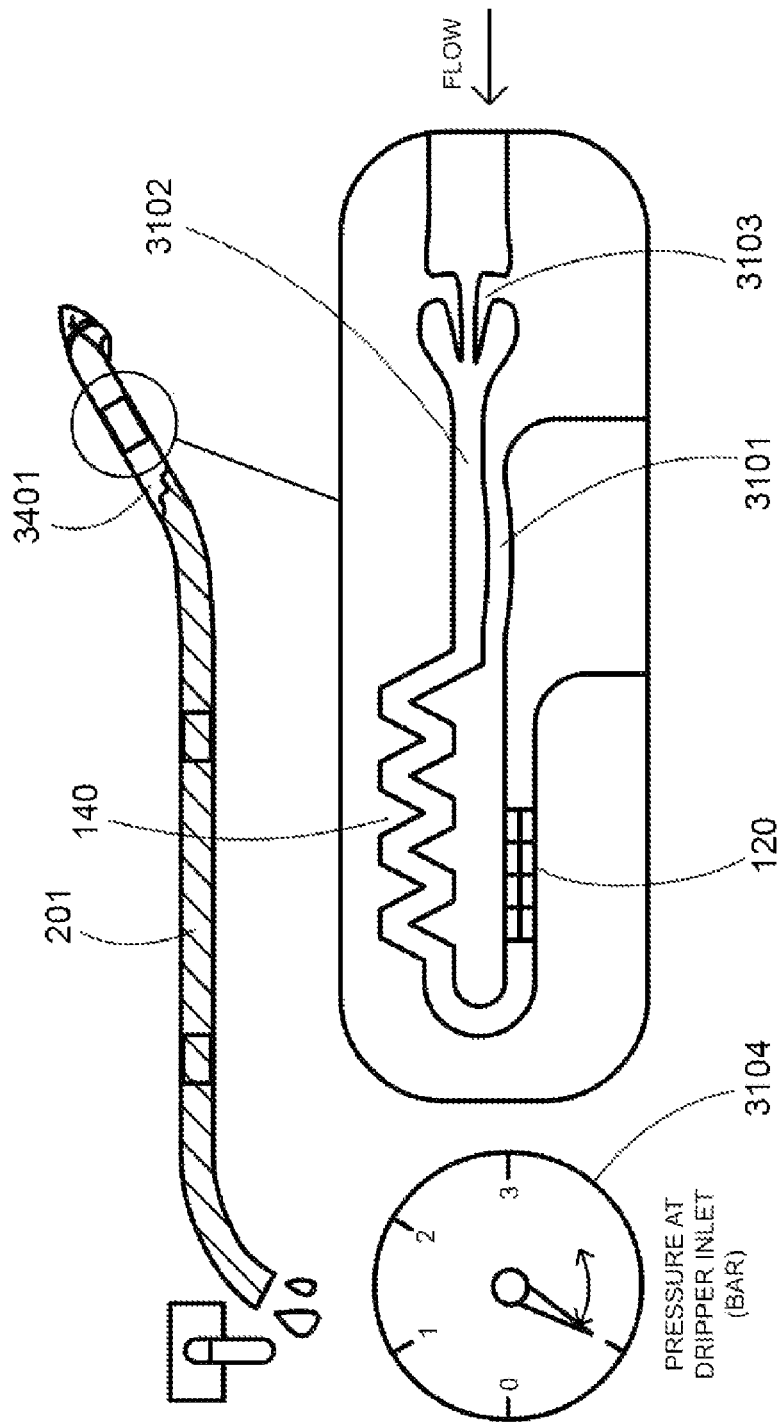
FIG. 40 shows a view of the pressure compensation and ventable valve components at a given pressure range depicted at flow A in FIGS. 31 and 32.

FIG. 40 shows a view of the pressure compensation and ventable valve components at a given pressure range depicted at flow A in FIGS. 31 and 32. In this view, which corresponds to a ventable embodiment which allow for pipe draining and rolling for example, flaps 3103 open as a large enough backflow pressure threshold is applied to the pipe with respect to atmospheric pressure external to the pipe. As flaps 3103 open, air 3401 (or water), enters water flow path 3102, labyrinth 140, filter 120 and pipe 201.

Figure 41:
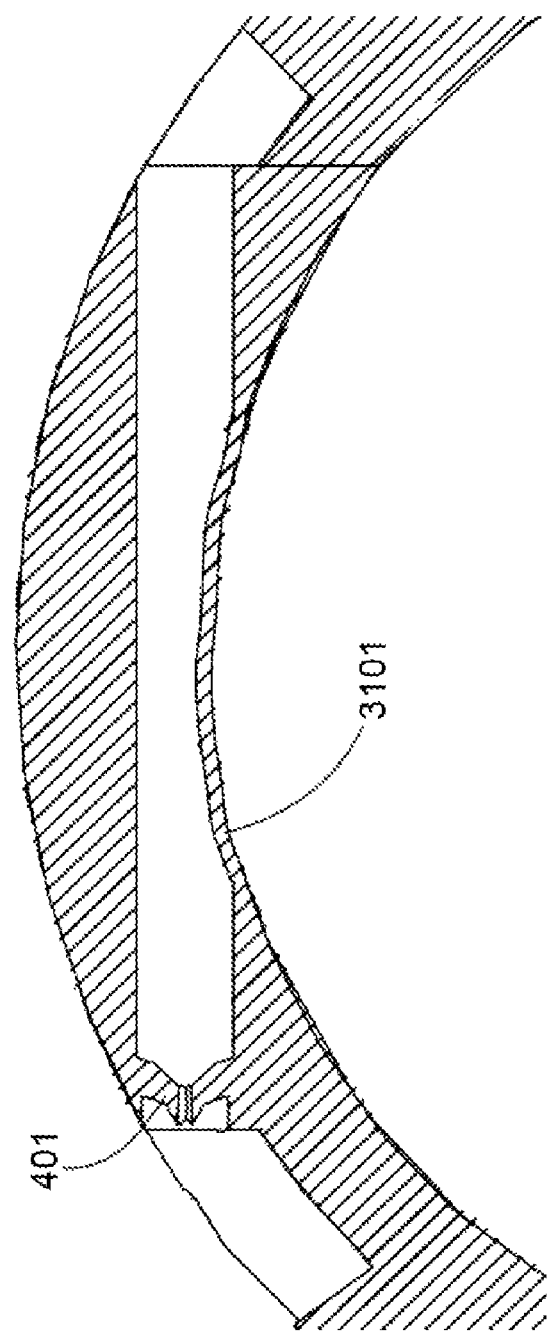
FIG. 41 shows a side cross-section view of the pressure compensation and ventable valve components at a given pressure range depicted at flow D in FIGS. 29 and 30.

FIG. 41 shows a side cross-section view of the pressure compensation and ventable valve components at a given pressure range depicted at flow D in FIGS. 29-32. This corresponds to the pressure range shown in FIG. 34 (also see FIG. 38) with slight positive water flow from the drip emitter.

Figure 42:
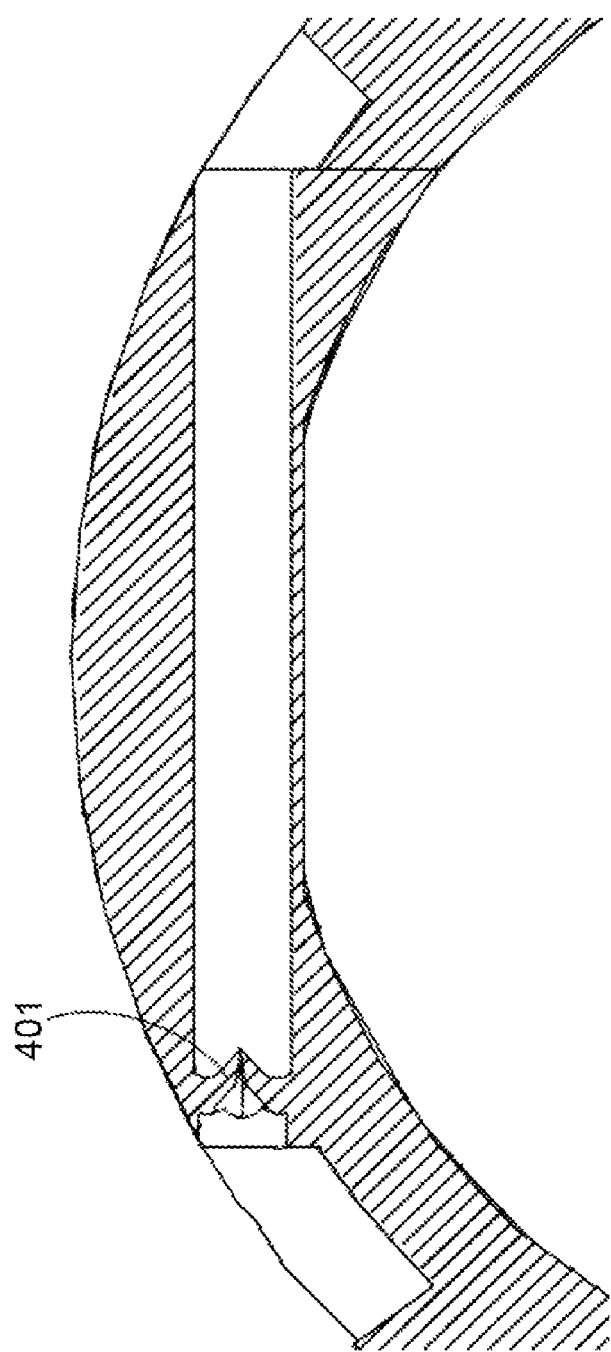
FIG. 42 shows a side cross-section view of the pressure compensation and ventable valve components at a given pressure range depicted at flow B in FIGS. 29 and 30.

FIG. 42 shows a side cross-section view of the pressure compensation and ventable valve components at a given pressure range depicted at flow B in FIGS. 29-32. This corresponds to the pressure range shown in FIG. 35 for a ventable embodiment at the point of allowing air to enter the drip emitter.

Figure 43:
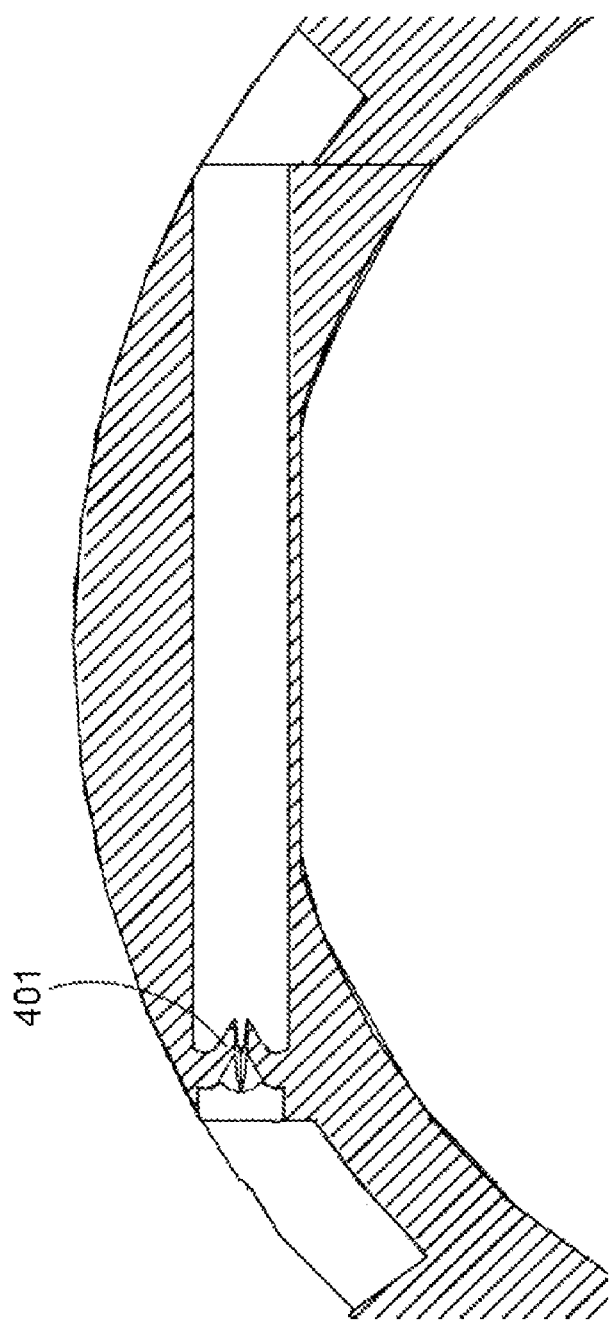
FIG. 43 shows a side cross-section view of the pressure compensation and ventable valve components at a given pressure range depicted at flow A in FIGS. 29 and 30.

FIG. 43 shows a side cross-section view of the pressure compensation and ventable valve components at a given pressure range depicted at flow A in FIGS. 29-32. This corresponds to the pressure range shown in FIG. 36 for a ventable embodiment with air entering the drip emitter.

Figure 44:
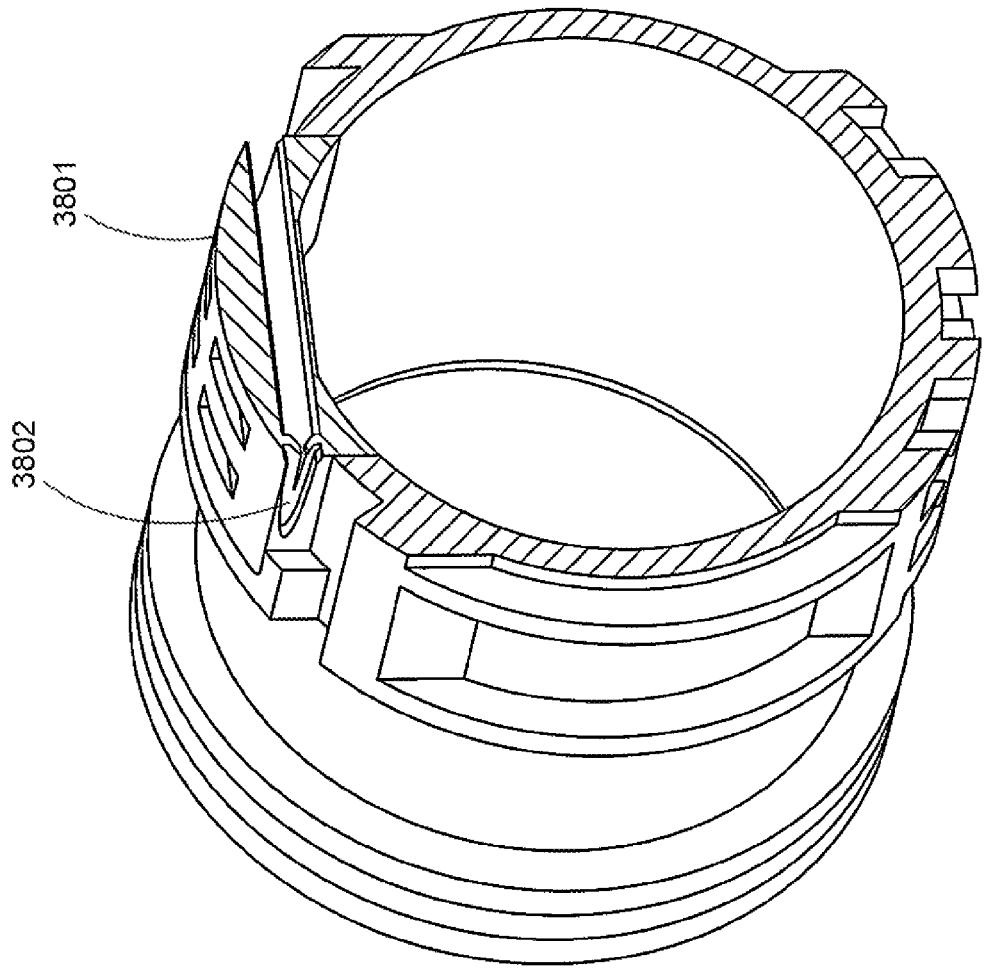
FIG. 44 shows a perspective end view of a non-drain valve showing flaps pointing inward under no pressure.

FIG. 44 shows a perspective end view of an anti-siphon water retainment valve embodiment 3801 showing flaps 3802 pointing outwardly (to the left in the figure) under no pressure. This embodiment allows for no entry of air under negative pressure if the flaps are long, if the flaps are short, then the valve can be vented. (See flow area A of FIG. 31). By constructing the flaps slightly shorter, the flaps are able to flip direction, which creates a ventable embodiment of the water retention valve that allows for rolling up the enclosing pipe for example by allowing air to enter the water retention valve when for example a low pressure is applied to the water in the enclosing pipe. (See flow area A of FIG. 32).

Figure 45:
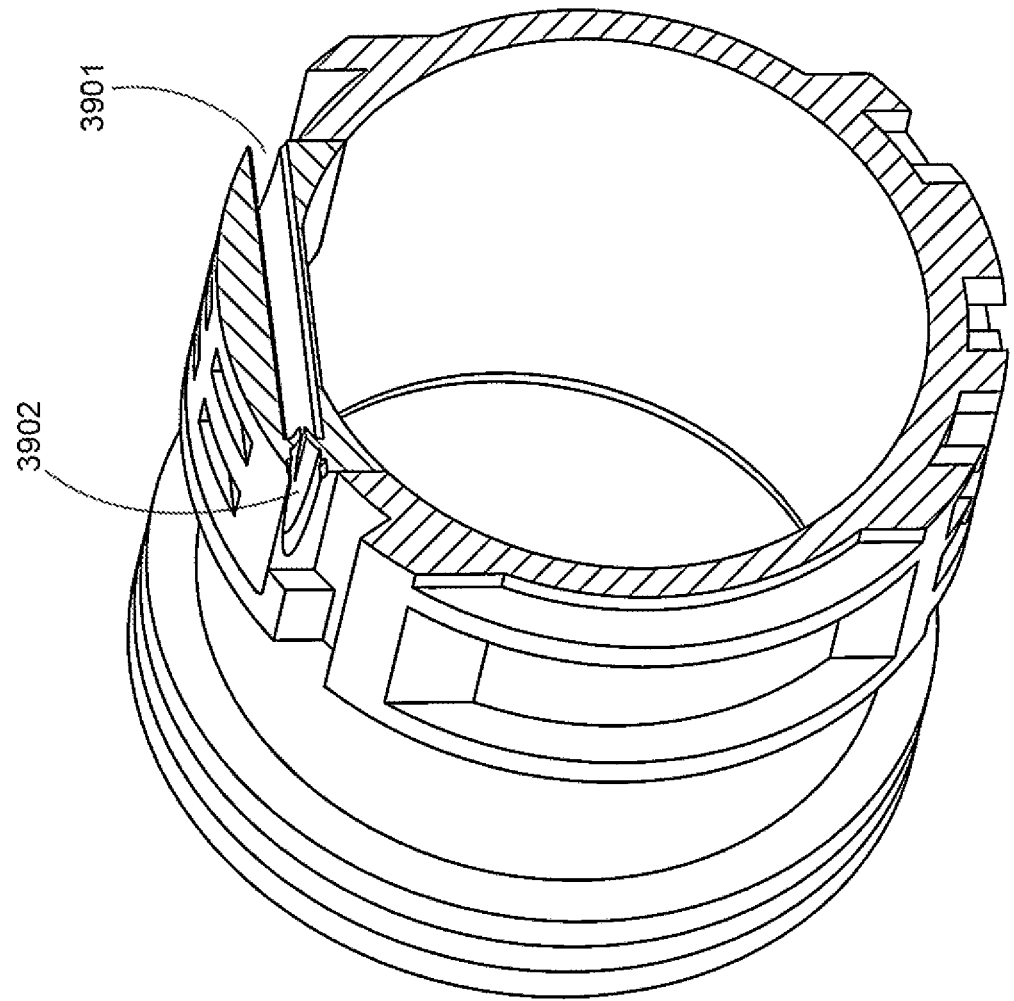
FIG. 45 shows a perspective end view of a non-drain valve showing flaps pointing outward under no pressure.

FIG. 45 shows a perspective end view of a non-drain water retainment valve embodiment 3901 showing flaps 3902 pointing inwardly (to the right in the figure) under no pressure. Depending on the construction of the flaps, i.e., whether slightly touching or not under zero pressure difference between internal drip emitter pressure and external atmospheric pressure, (see flow areas in FIGS. 29A-B).

Figure 46:
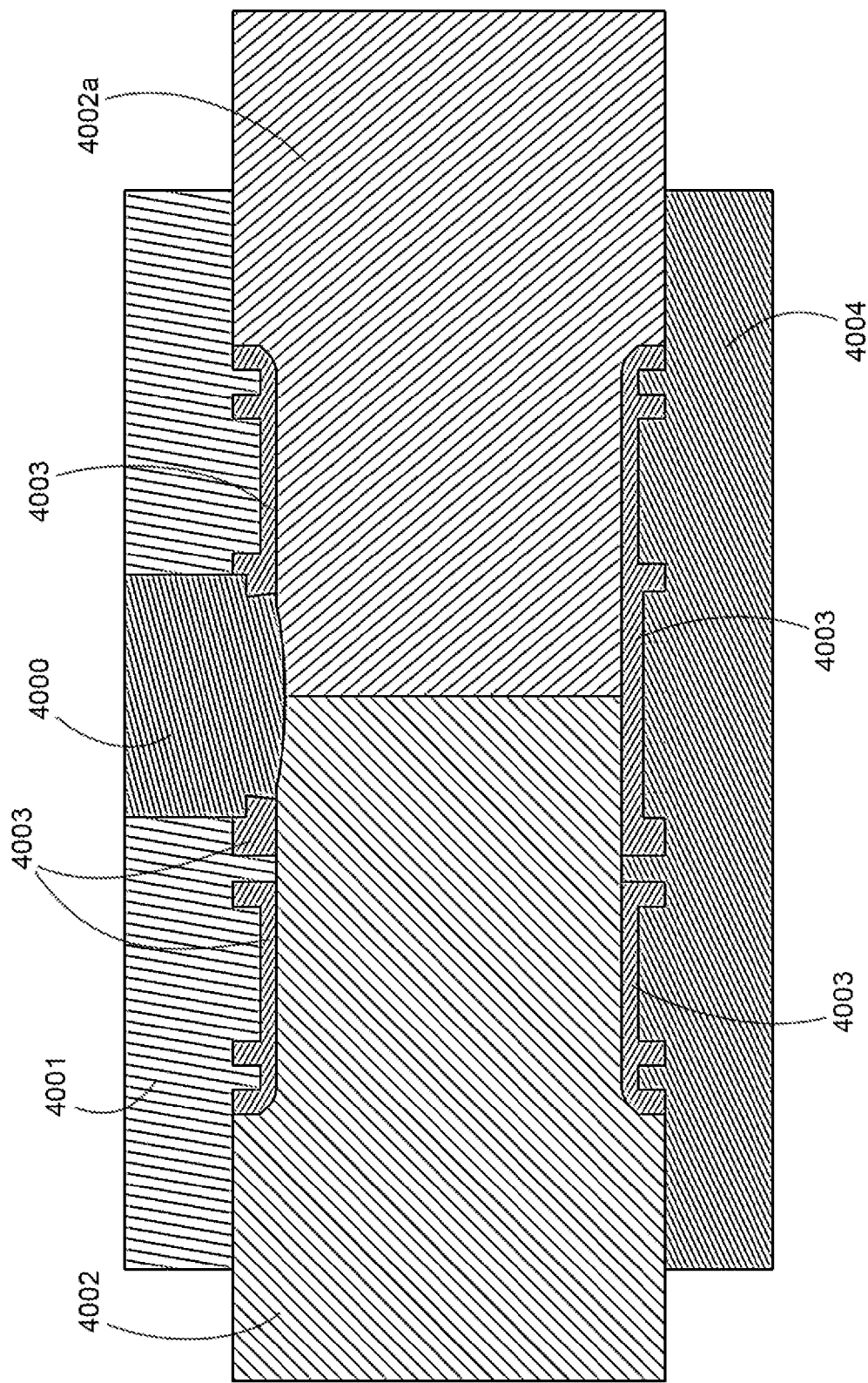
FIG. 46 shows a side cross-section view of an injection mold for manufacture of an embodiment of the invention.

FIG. 46 shows a side cross-section view of an injection mold for manufacture of an embodiment of the invention. In this view, drip emitter content 4003 is shown as injected into injection mold with bottom 4004, elements 4002 and 4002*a* and injection mold top 4001 that form the remainder of mold for the exterior of drip emitter content 4003. Water retainment valve place holder 4000 creates a void in which a water retainment valve may be formed using the same injection mold with a second injection.

Figure 47:
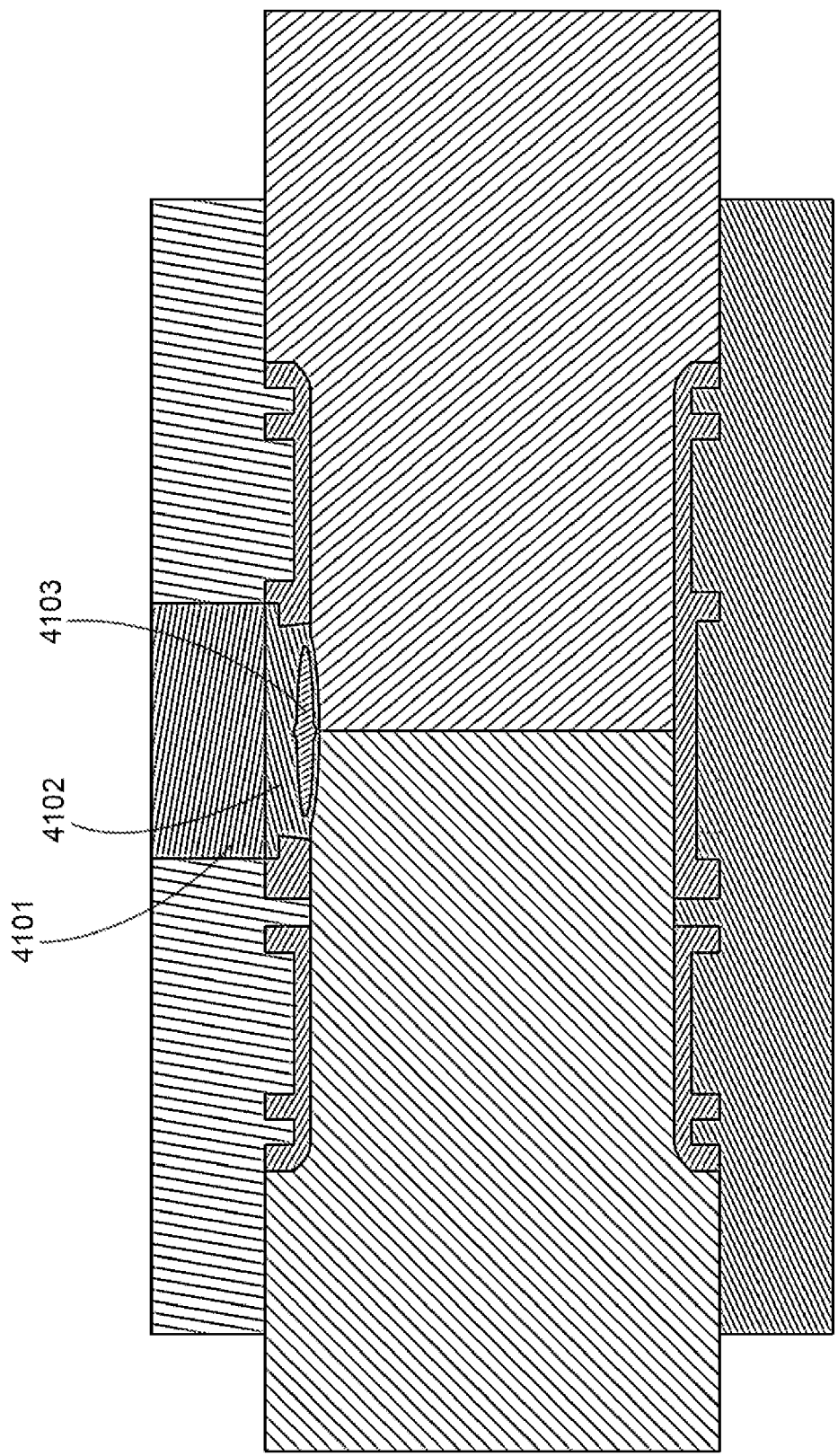
FIG. 47 shows an opposing side cross-section view with respect to FIG. 40 of an injection mold for manufacture of an embodiment of the invention.

FIG. 47 shows an opposing side cross-section view with respect to FIG. 46 of an injection mold for manufacture of an embodiment of the invention. In this view, water retainment valve injection mold top 4101 replaces water retainment valve place holder 4000 for the second injection. As shown, water retainment valve content 4102 is injected into the mold wherein the material may be elastomeric for example. Block 4103 prohibits water retainment valve content 4102 from an internal portion of the water retainment valve.

Figure 48:
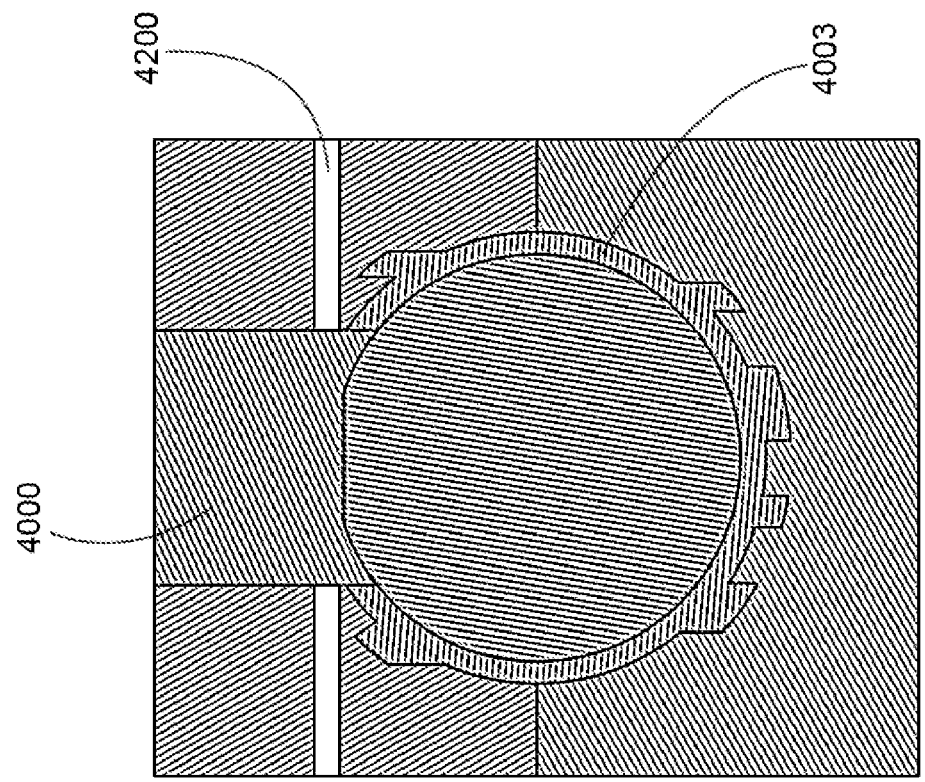
FIG. 48 shows an end cross-section view of an injection mold for manufacture of an embodiment of the invention.

FIG. 48 shows an end cross-section view of an injection mold for manufacture of an embodiment of the invention. In this embodiment, water retainment valve place holder 4000 is in place for the first injection of drip emitter content 4003.

Figure 49:
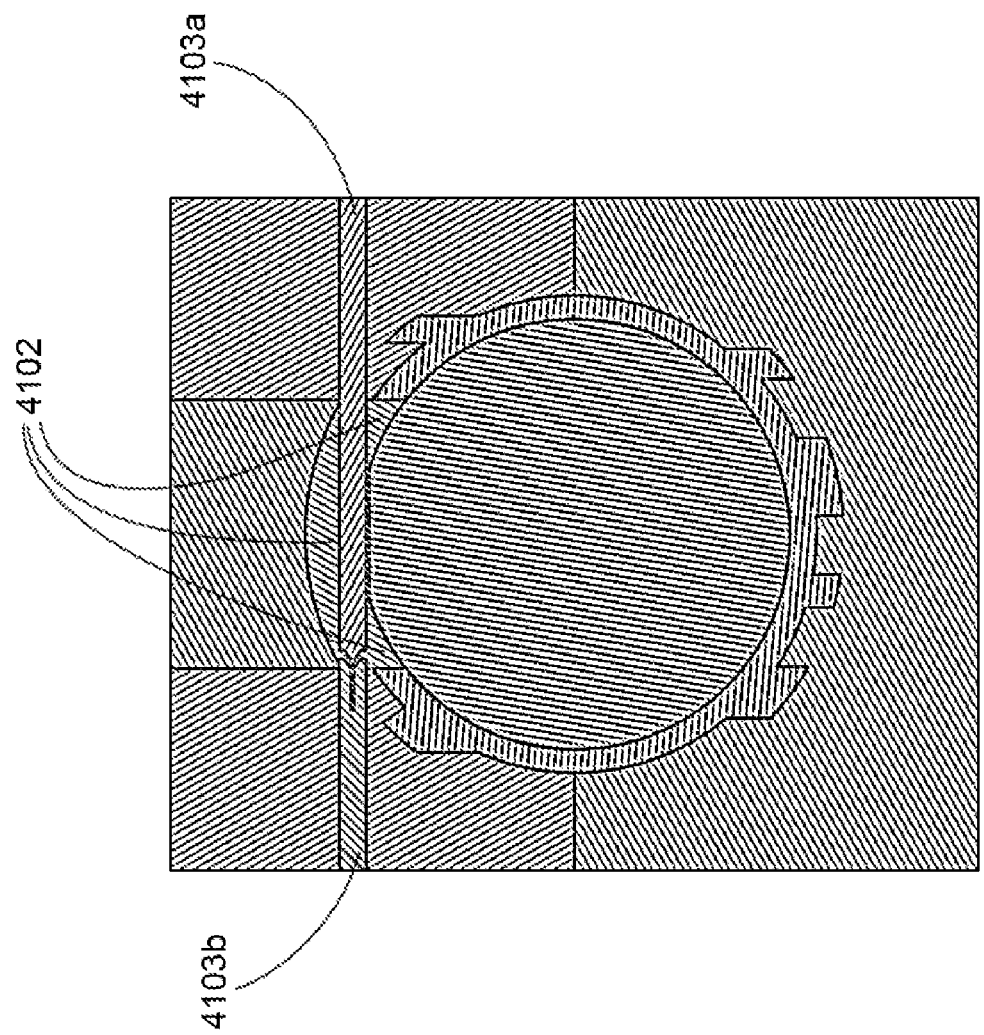
FIG. 49 shows an end cross-section view of an injection mold for manufacture of an embodiment of the invention showing an insert for creation of an embodiment of the pressure compensated ventable valve.

FIG. 49 shows an end cross-section view of an injection mold for manufacture of an embodiment of the invention showing an insert for creation of an embodiment of the pressure compensated ventable valve. In this view, block 4103*a* and 4103*b* are shown in cross section which create a void which is the internal portion of pressure compensation and water retainment valve 4102.

Figure 50:
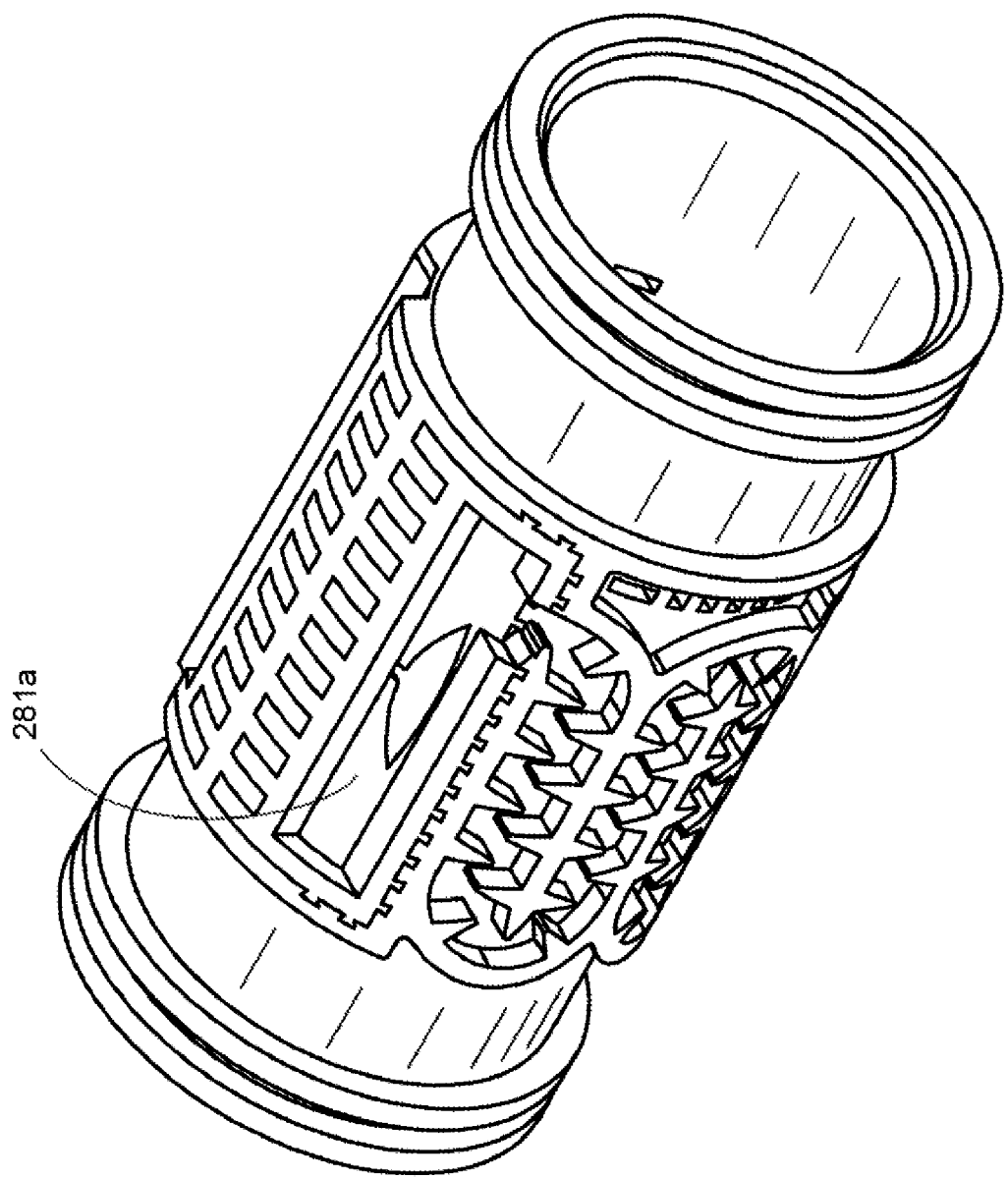
FIG. 50 shows a perspective side view of an embodiment that enables mechanical engagement of the water retention valve with the drip emitter with area that holds the water retention valve visible.
Figure 57:
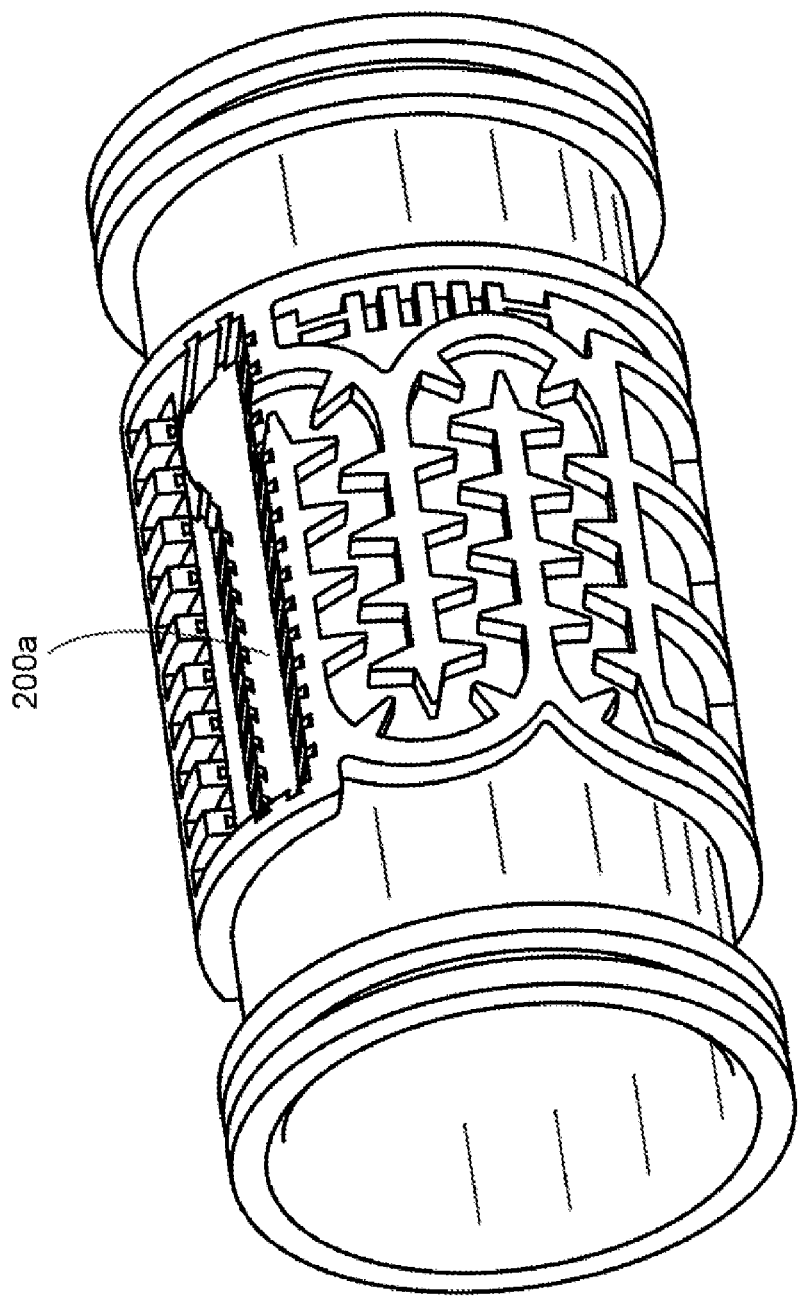
FIG. 57 shows an empty area that is configured as the water retainment valve slot.
Figure 60:
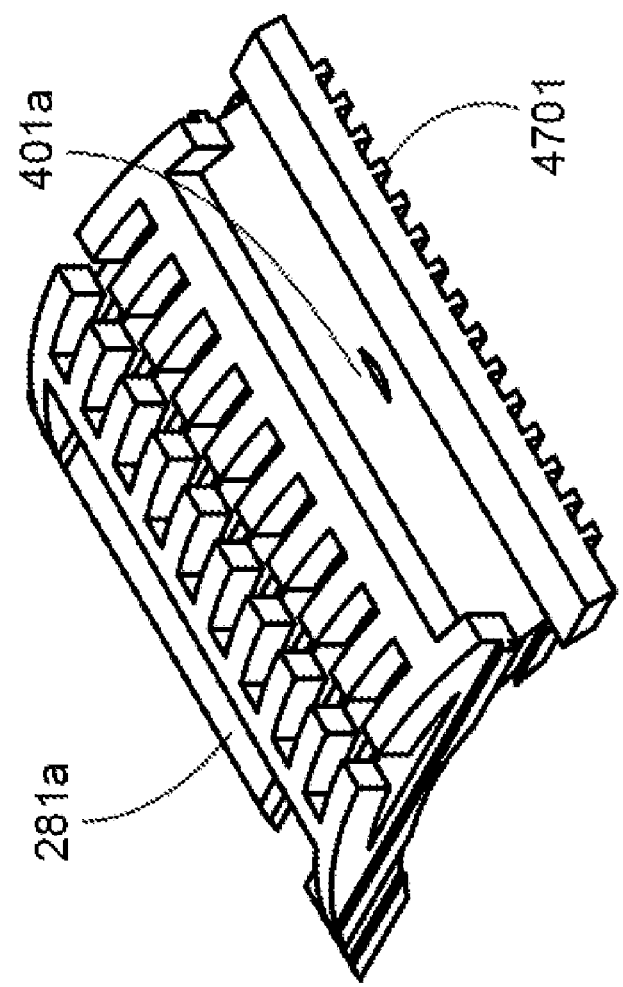
FIG. 60 shows a perspective view of an embodiment of mechanically engaged water retention valve having flaps.
Figure 61:
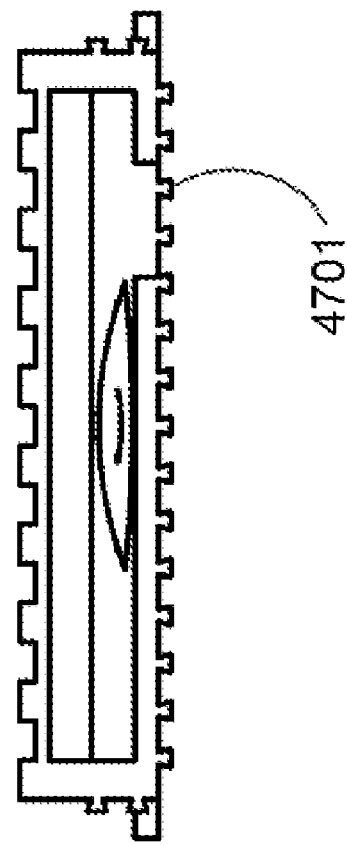
FIG. 61 shows a side view of the mechanically engaged water retention valve of FIG. 60.

FIG. 50 shows a perspective side view of an embodiment that enables mechanical engagement of the water retention valve with the drip emitter with area that holds the water retention valve visible. In this figure, water retainment valve 281*a* is mechanically engaged (as per the water retainment valve slot 200*a* as shown in FIG. 57) before enclosing the drip emitter in an enclosing pipe via for example teeth 4701 (as shown in FIG. 60-61).

Figure 51:
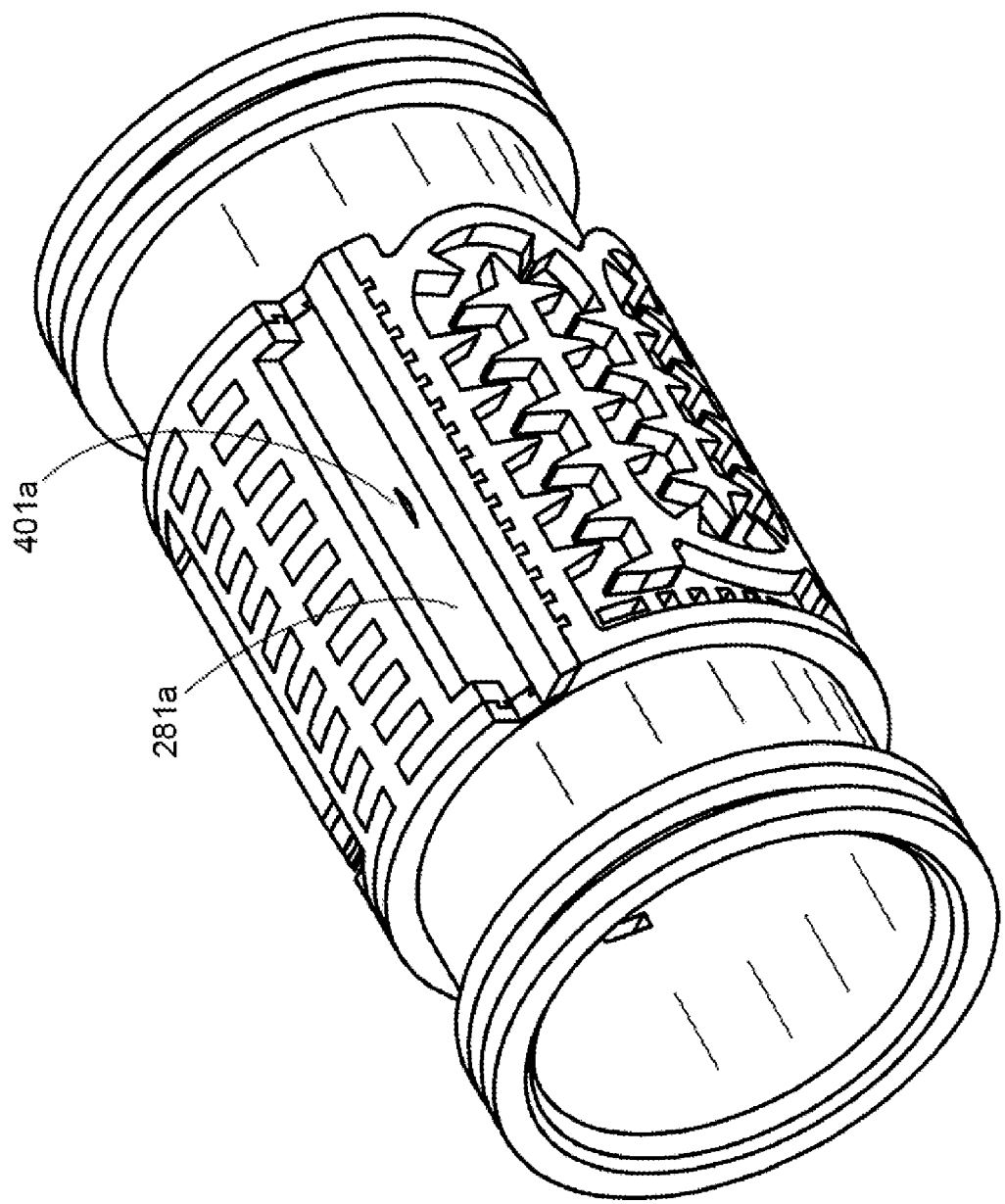
FIG. 51 shows a perspective view from a different angle with respect to FIG. 50.

FIG. 51 shows a perspective view from a different angle with respect to FIG. 50. In this figure, Flaps 401*a* are shown in water retention valve 281*a*.

Figure 52:
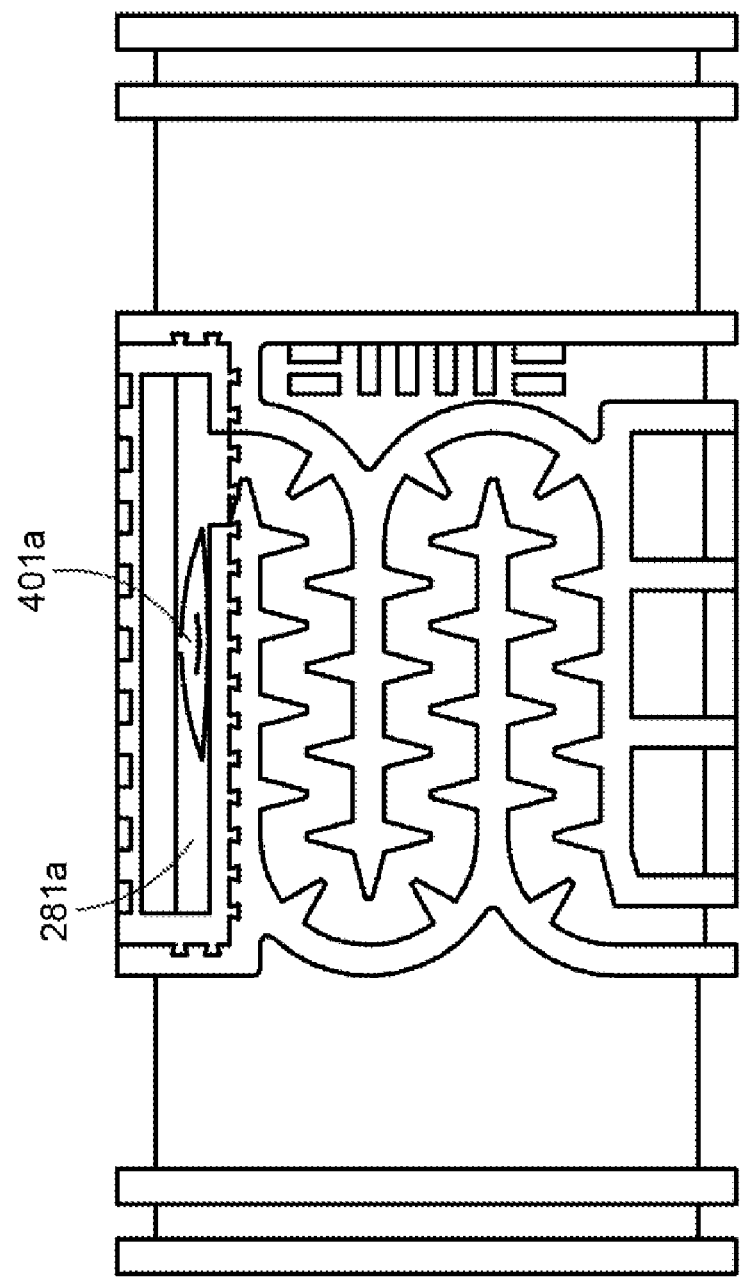
FIG. 52 shows a side view of an embodiment that enables mechanical engagement of the water retention valve with the drip emitter wherein the water retention valve is mechanically engaged to the drip emitter.

FIG. 52 shows a side view of an embodiment that enables mechanical engagement of the water retention valve with the drip emitter wherein the water retention valve is mechanically engaged to the drip emitter.

Figure 53:
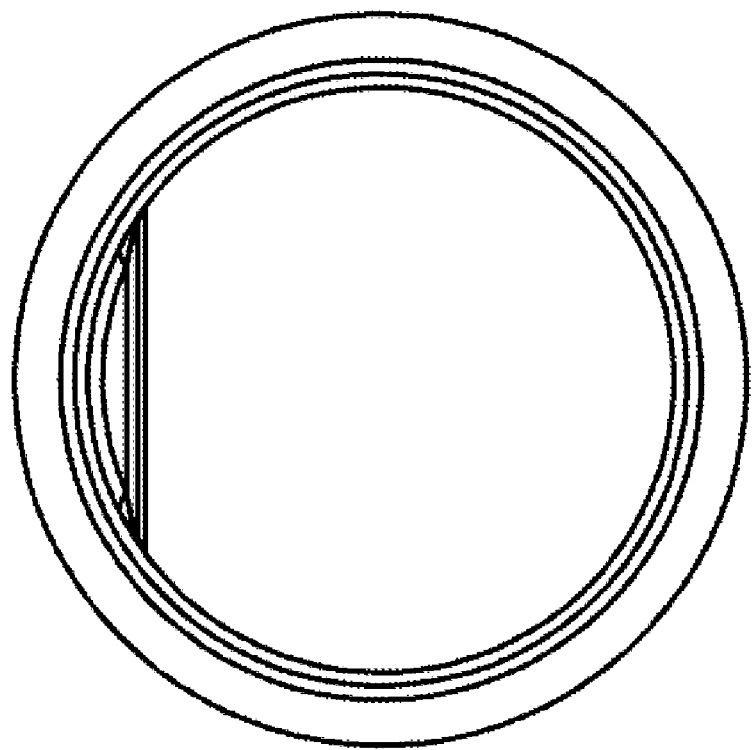
FIG. 53 shows an end view of the drip emitter with a mechanically engaged ventable embodiment of the water retention valve.

FIG. 53 shows an end view of the drip emitter with a mechanically engaged ventable embodiment of the water retention valve.

Figure 54:
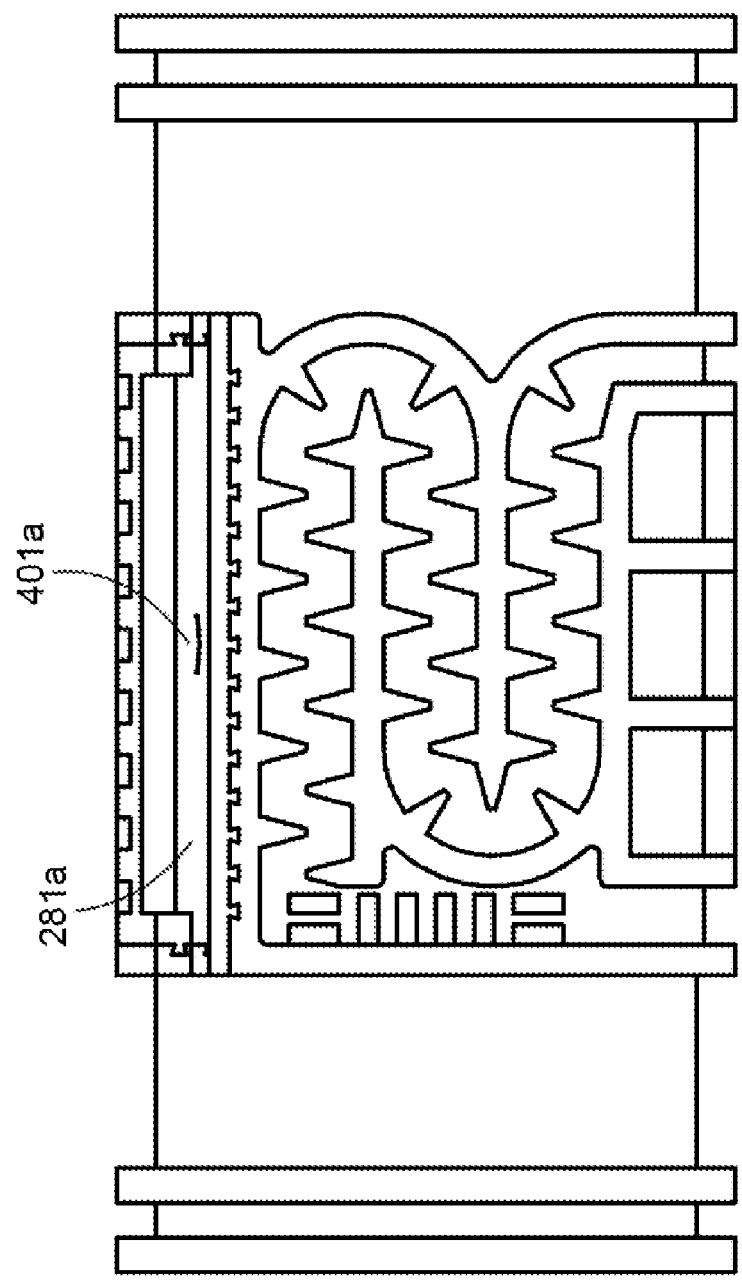
FIG. 54 shows a side view of the drip emitter with a mechanically engaged ventable embodiment of the water retention valve.

FIG. 54 shows a side view of the drip emitter with a mechanically engaged ventable embodiment of the water retention valve showing flaps 401*a*.

Figure 55:
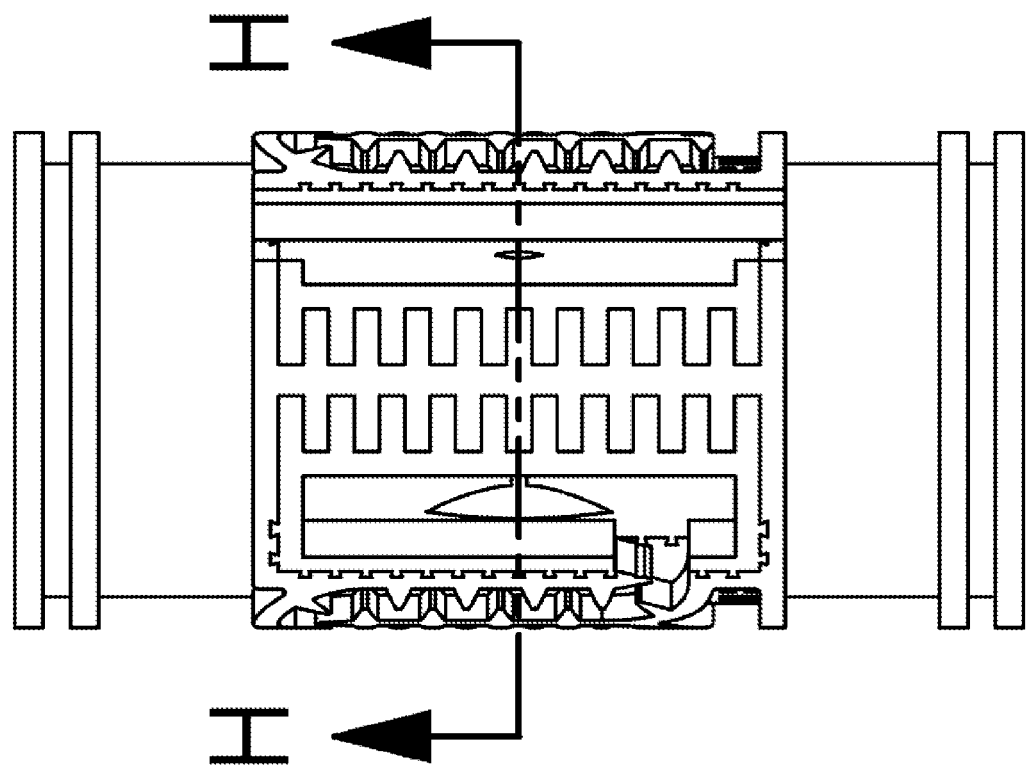
FIG. 55 shows a top view of the drip emitter with a mechanically engaged ventable embodiment of the water retention valve.

FIG. 55 shows a top view of the drip emitter with a mechanically engaged ventable embodiment of the water retention valve.

Figure 56:
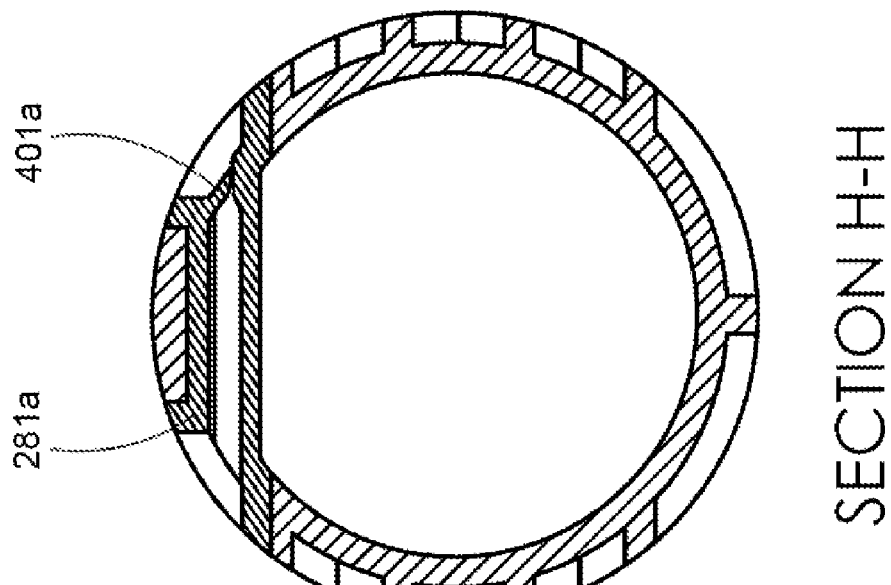
FIG. 56 shows a side cross-section view of the drip emitter along the section line of FIG. 55, with a mechanically engaged ventable embodiment of the water retention valve.

FIG. 56 shows a side cross-section view of the drip emitter along the section line of FIG. 55, with a mechanically engaged ventable embodiment of the water retention valve 281*a*, with water flow path where water moves from left to right in the figure during irrigation and exiting via flaps 401*a*.

FIG. 57 shows an empty area that is configured as water retainment valve slot 200*a*, into which water retainment valve is for example injected in.

Figure 58:
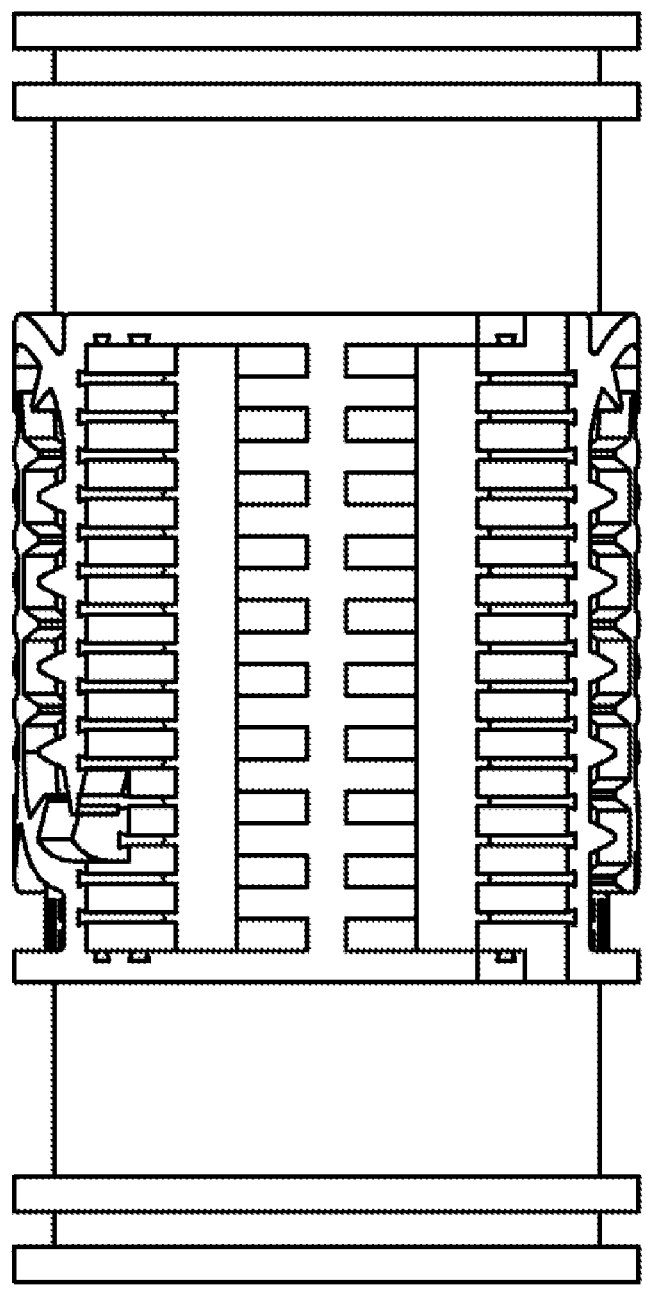
FIG. 58 shows a top view of FIG. 55 without the mechanically engaged water retention valve.

FIG. 58 shows a top view of FIG. 55 without the mechanically engaged water retention valve.

Figure 59:
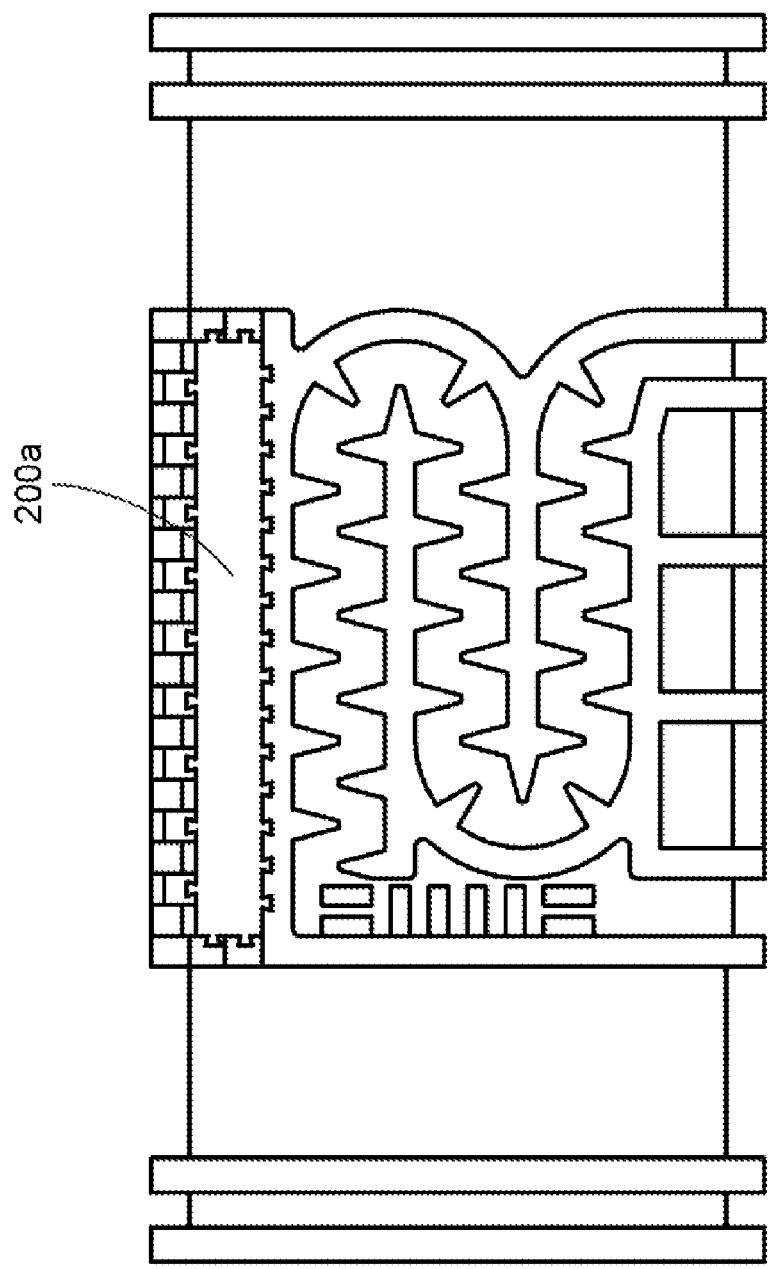
FIG. 59 shows a side view of the drip emitter showing the water retainment valve slot without a mechanically engaged water retention valve inserted.

FIG. 59 shows a side view of the drip emitter showing water retainment valve slot 200*a* without a mechanically engaged water retention valve inserted.

FIG. 60 shows a perspective view of an embodiment of mechanically engaged water retention valve 281*a* having flaps 401*a* and teeth 4701 for mechanical engagement with the drip emitter.

FIG. 61 shows a side view of the mechanically engaged water retention valve of FIG. 60 having teeth 4701 for mechanical engagement with the drip emitter.

Figure 62:
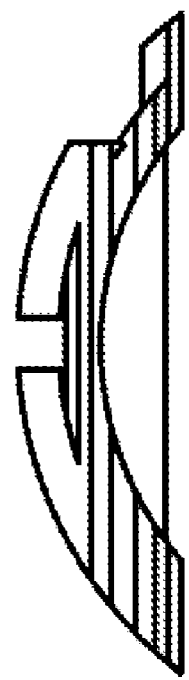
FIG. 62 shows a cross-section view of the mechanically engaged water retention valve of FIG. 61.

FIG. 62 shows an end view of the mechanically engaged water retention valve of FIG. 61.

Figure 63:
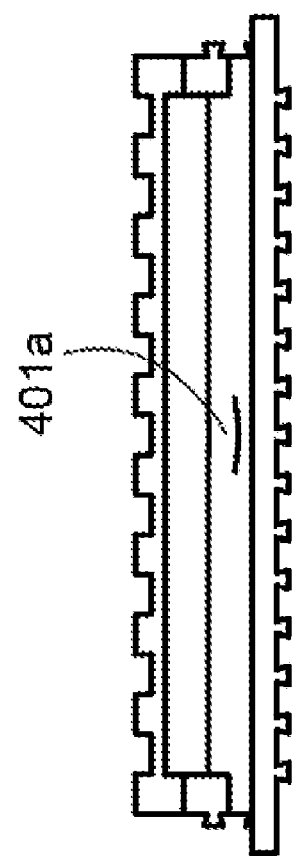
FIG. 63 shows an opposing side view of the mechanically engaged water retention valve of FIG. 61 showing flaps.

FIG. 63 shows an opposing side view of the mechanically engaged water retention valve of FIG. 61 showing flaps 401*a*.

Figure 64:
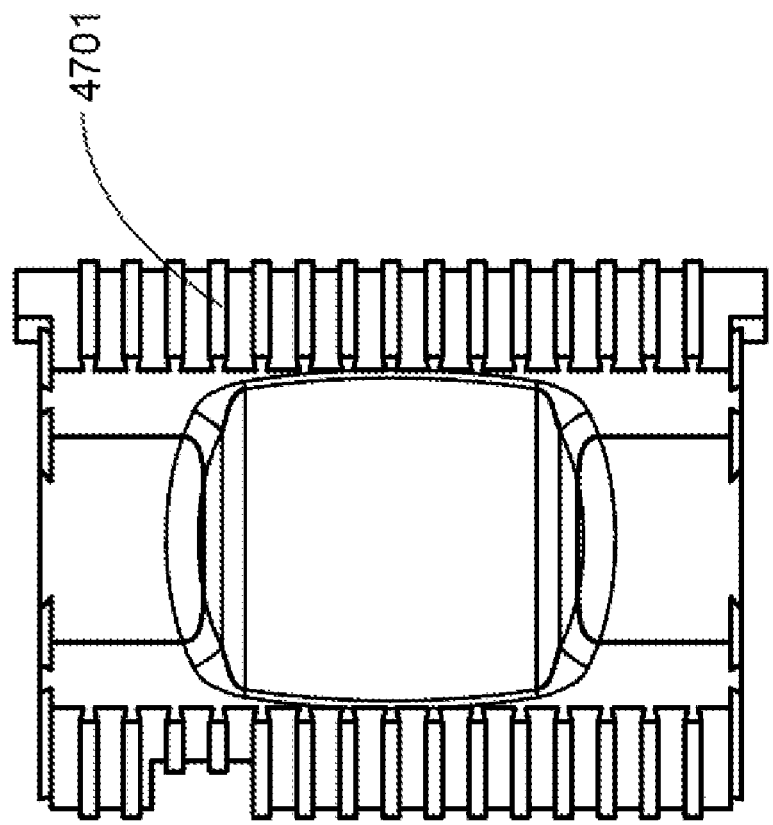
FIG. 64 shows a bottom view of the mechanically engaged water retention valve showing teeth for mechanical engagement to the drip emitter via water retainment valve slot as shown in FIG. 59.

FIG. 64 shows a bottom view of the mechanically engaged water retention valve showing teeth 4701 for mechanical engagement to the drip emitter via water retainment valve slot 200*a* as shown in FIG. 59 for example.

While the invention herein disclosed has been described by means of specific embodiments and applications thereof, numerous modifications and variations could be made thereto by those skilled in the art without departing from the scope of the invention set forth in the claims.

What is claimed is:

1. A method for producing a drip emitter comprising:
    selecting a first material for injection molding for an emitter body;
    selecting a second material for injection molding wherein said second material comprises an elastomeric material to effect regulation of the drip emitter;
    injecting an injection mold with a said first material and said second material in separate shots to form the drip emitter; and,
    cross-linking said second material once and only before inserting said drip emitter into a pipe to increase elasticity of said second material after injection but before said inserting said drip emitter into said pipe.

2. The method for producing the drip emitter of claim 1, further comprising: forming a mechanical engagement between said first material and said second material.

3. The method for producing the drip emitter of claim 1, further comprising:
    forming a mechanical engagement between said first material and said second material wherein said mechanical engagement comprises at least one interlocking element formed into said first material and corresponding at least one interlocking element formed into said second material.

4. The method for producing the drip emitter of claim 1, further comprising:
    forming a water retainment valve with said second material in a single mold.

5. The method for producing the drip emitter of claim 1, further comprising:
    forming a ventable, anti-siphon or non-drain water retainment valve with said second material in a single mold.

6. The method for producing the drip emitter of claim 1, further comprising:
    forming a water retainment valve with said second material in a single mold wherein said second material is configured to hold water internally within said second material and wherein said water inside said second material does not contact an outer pipe in which said second material is situated.

7. The method for producing the drip emitter of claim 1, further comprising:
    forming a ventable, anti-siphon or non-drain water retainment valve with said second material in a single mold wherein said second material is configured to pass water internally within said second material and wherein said water inside said second material does not contact an outer pipe in which said second material is situated.

8. A method for producing a drip emitter comprising:
    selecting a first material for injection molding for an emitter body;
    selecting a second material for injection molding wherein said second material comprises an elastomeric material to effect regulation of the drip emitter;
    injecting an injection mold with a said first material and said second material in separate shots to form the drip emitter;
    forming a water retainment valve, ventable, anti-siphon or non-drain water retainment valve with said second material in a single mold wherein said second material is configured to hold or pass water internally within said second material and wherein said water inside said second material does not contact an outer pipe in which said second material is situated; and,
    cross-linking said second material once and only before inserting said drip emitter into a pipe to increase elasticity of said second material after injection but before said inserting said drip emitter into said pipe.

* * * * *